(12) United States Patent
Harada

(10) Patent No.: US 12,260,139 B2
(45) Date of Patent: Mar. 25, 2025

(54) PRINTING APPARATUS

(71) Applicant: SEIKO EPSON CORPORATION, Tokyo (JP)

(72) Inventor: Takeshi Harada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 17/822,836

(22) Filed: Aug. 29, 2022

(65) Prior Publication Data

US 2023/0063866 A1 Mar. 2, 2023

(30) Foreign Application Priority Data

Aug. 31, 2021 (JP) ................................. 2021-140843

(51) Int. Cl.
*G06F 1/26* (2006.01)
*G06F 3/12* (2006.01)

(52) U.S. Cl.
CPC ............ *G06F 3/1279* (2013.01); *G06F 1/266* (2013.01); *G06F 3/1221* (2013.01); *G06F 3/1229* (2013.01); *G06F 3/128* (2013.01); *G06F 3/1293* (2013.01)

(58) Field of Classification Search
CPC ...... G06F 1/266; G06F 1/3284; G06F 3/1229; G06F 1/26; G06F 2213/0042; G06F 2213/3812; G06F 2213/4002; H05K 5/0217
See application file for complete search history.

(56) References Cited

U.S. PATENT DOCUMENTS

| | | | | |
|---|---|---|---|---|
| 6,718,408 B2 * | 4/2004 | Esterberg | ............. | G06F 1/1632 710/63 |
| 10,571,069 B2 * | 2/2020 | Mustafa | ............... | F16M 11/123 |
| 2004/0221180 A1 * | 11/2004 | Enami | .................... | G06F 1/266 713/300 |
| 2008/0176444 A1 * | 7/2008 | Chan | ...................... | G06F 1/266 439/505 |
| 2016/0181859 A1 * | 6/2016 | Makwinski | ........... | H02J 7/0049 320/108 |
| 2016/0253646 A1 * | 9/2016 | Shinmura | ............ | G07G 1/0027 705/21 |
| 2017/0368853 A1 | 12/2017 | Satake | | |
| 2022/0011829 A1 * | 1/2022 | Liang | .................... | G06F 1/1662 |
| 2022/0279084 A1 * | 9/2022 | Mori | .................. | H04N 1/00907 |

FOREIGN PATENT DOCUMENTS

JP 2017-226130 A 12/2017

* cited by examiner

*Primary Examiner* — Mandeep S Buttar
(74) *Attorney, Agent, or Firm* — Global IP Counselors, LLP

(57) ABSTRACT

There are provided a printing section that performs printing on a medium; a control section that controls drive of the printing section; a power supply connector that supplies electric power to the control section; a first receptacle connector that is electrically coupled to a first external device; and a second receptacle connector that is electrically coupled to a second external device, a plug of a USB-Type-C cable is configured to be physically inserted into the second receptacle connector, the plug is configured not to be physically inserted into the power supply connector, an insertion port of the first receptacle connector is arranged along a first connector surface, and an insertion port of the second receptacle connector is arranged along a second connector surface.

13 Claims, 27 Drawing Sheets

PRINTING APPARATUS

The present application is based on, and claims priority from JP Application Serial Number 2021-140843, filed Aug. 31, 2021, the disclosure of which is hereby incorporated by reference herein in its entirety.

BACKGROUND

1. Technical Field

The present disclosure relates to a printing apparatus.

2. Related Art

In the related art, a printing apparatus capable of printing on a medium such as paper is known. Such a printing apparatus is provided with a universal serial bus (USB) interface for coupling the printing apparatus to an external device or the like. The USB interface is equipped with, for example, a USB-Type-A receptacle connector for coupling the external device that transmits data that commands printing to be executed and the printing apparatus that receives this data and executes printing, a LAN receptacle connector for coupling the printing apparatus to a network, and the like.

Further, in recent years, there is an increasing demand for a printing apparatus capable of not only data communication with an external device or coupling to a network but also electric power exchange with the coupled external device. JP-A-2017-226130 discloses a printing apparatus capable of supplying electric power to a coupled external device via a USB-Type-C interface.

However, in the printing apparatus equipped with the USB-Type-C interface described in JP-A-2017-226130, there is a concern that the plug of the USB-Type-C cable can be erroneously inserted into another receptacle connector, for example, a USB-Type-A receptacle connector or a LAN receptacle connector.

SUMMARY

According to an aspect of the present disclosure, there is provided a printing apparatus including: a printing section that performs printing on a medium; a control section that controls drive of the printing section; a power supply connector that supplies electric power to the control section; a first receptacle connector that is electrically coupled to a first external device and configured to cause the first external device to communicate with the control section; and a second receptacle connector that is electrically coupled to a second external device and configured to cause the second external device to communicate with the control section, in which the first receptacle connector is a USB-Type-C receptacle connector, the second receptacle connector is a LAN or DK receptacle connector, a plug of a USB-Type-C cable is configured to be physically inserted into the second receptacle connector, the plug is configured not to be physically inserted into the power supply connector, an insertion port of the first receptacle connector is arranged along a first connector surface, and an insertion port of the second receptacle connector is arranged along a second connector surface different from the first connector surface.

DESCRIPTION OF EXEMPLARY EMBODIMENTS

Figure 1:
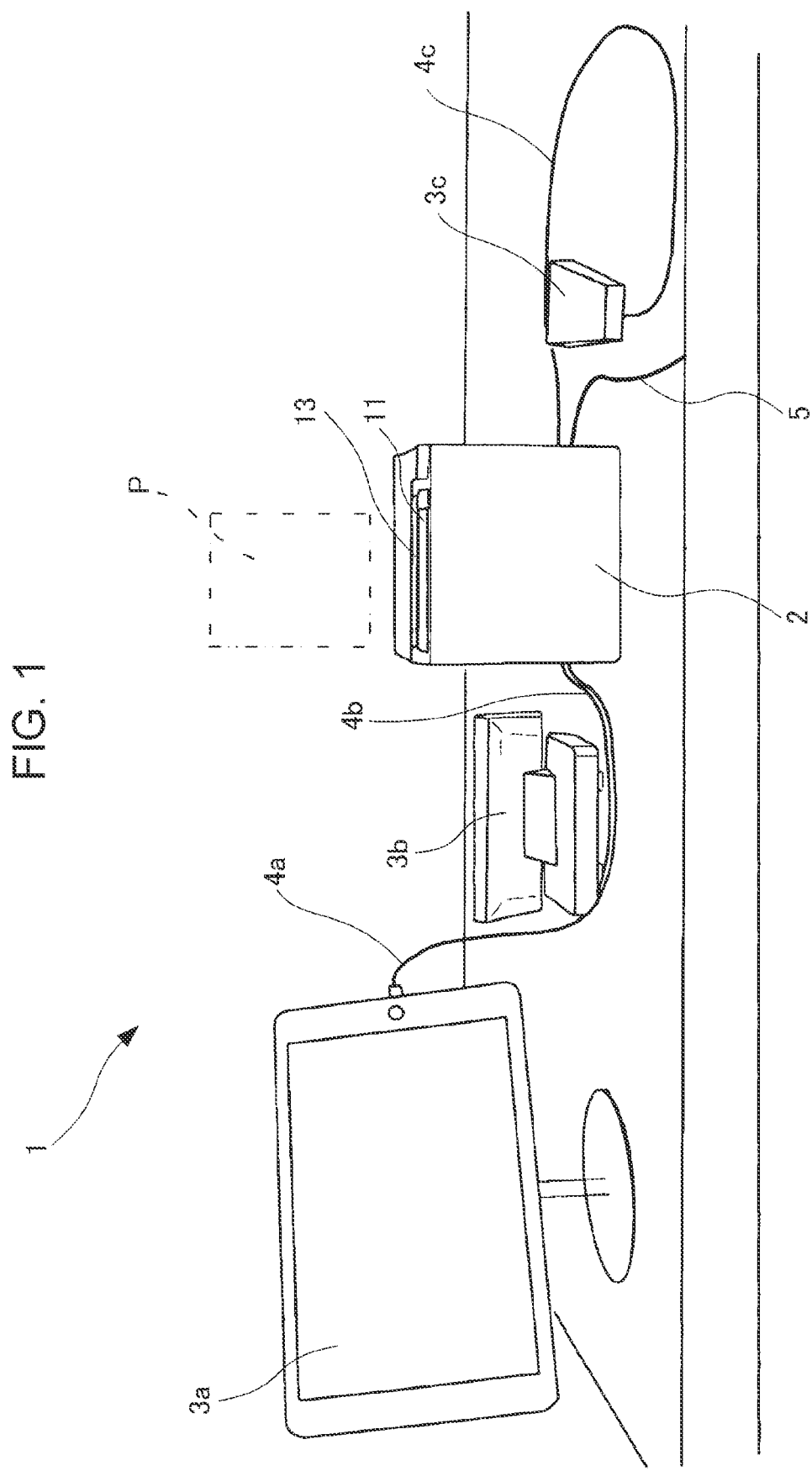
FIG. 1 is a view illustrating a schematic configuration of a printing system.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. In addition, not all of the configurations which will be described below are necessarily essential components of the present disclosure.

1. PRESENT EMBODIMENT

1-1. Schematic Configuration of Printing System

FIG. 1 is a view illustrating a schematic configuration of a printing system 1 according to the present embodiment. The printing system 1 is used in a store, for example, and has a function of performing accounting according to products and services purchased by a customer, a function of informing the customer of information related to accounting, and a function of issuing a receipt according to the accounting. For example, the printing system 1 is an example of a point of sale (POS) system.

The printing system 1 includes a printing apparatus 2, a smart device 3a, a customer display 3b, and a handy scanner 3c. The printing system 1 may have a configuration in which some of these elements are omitted or changed, or other elements are added.

The printing apparatus 2 is supplied with electric power by being coupled to, for example, a commercial AC power source (not illustrated) via a power cable 5. The printing apparatus 2 to which the electric power is supplied performs printing on a medium P, and the medium P is discharged from a medium discharge port 13. In other words, the printed recording part of the medium P is discharged from the medium discharge port 13.

The smart device 3a, the customer display 3b, and the handy scanner 3c are examples of external devices that can be coupled to the printing apparatus 2 via a USB interface 60 included in the printing apparatus 2, as will be described later. Specifically, the smart device 3a is coupled to the printing apparatus 2 via a USB cable 4a, the customer display 3b is coupled to the printing apparatus 2 via a USB cable 4b, and the handy scanner 3c is coupled to the printing apparatus 2 via a USB cable 4c.

Although FIG. 1 illustrates an example in which the smart device 3a, the customer display 3b, and the handy scanner 3c are coupled to the printing apparatus 2, the number of external devices that can be coupled to the printing apparatus 2 is not limited to three. For example, the number of external devices that can be coupled to the printing apparatus 2 depends on the USB standard. According to the USB standard, the maximum number of external devices that can be coupled is 127, and thus the maximum number of external devices that can be coupled to the printing apparatus 2 is 127.

The smart device 3a is a terminal that can be carried by the user. For example, the smart device 3a is a tablet terminal or a smartphone, and the smart device 3a includes a communication section that performs data communication according to a predetermined communication standard, and communicates with the printing apparatus 2 via this communication section.

Here, unless otherwise specified, the user refers to a salesclerk who provides products or services to customers, or a trader who installs the printing system 1 in the store, and sets external devices such as the printing apparatus 2 and the smart device 3a.

The smart device 3a includes a battery and operates by the electric power charged in the battery. The smart device 3a is supplied with electric power from the printing apparatus 2 to charge the battery. Further, the smart device 3a is equipped with various applications for generating commands, print data, and the like for controlling the printing apparatus 2. For example, the application mounted on such the smart device 3a is an application corresponding to the POS system.

The smart device 3a transmits a command related to control and a command related to printing to the printing apparatus 2. Upon receiving these commands, the printing apparatus 2 stores these commands in a receiver buffer (not illustrated).

The control-related command includes, for example, a setting command for instructing format setting and a status request command for instructing a request for information related to the state of the printing apparatus 2. In response to this status request command, for example, the printing apparatus 2 transmits information indicating that printing is completed to the smart device 3a.

The command related to printing includes, for example, a print command for instructing printing, a line feed command for instructing line feed, a line stack command for instructing line stack, a cutter command for instructing to cut the medium P, and the like. The command related to printing includes a command for instructing drive to any of a thermal head 21, a transport section 23, and a cutting section 24 illustrated in FIG. 2.

The smart device 3a generates print data such as letters and images to be printed by the printing apparatus 2. The smart device 3a transmits a print command including the generated print data to the printing apparatus 2 according to a predetermined communication standard. The printing apparatus 2 executes a print command and prints letters, images, and the like on the medium P based on the print data.

The customer display 3b can be used, for example, by placing the customer display 3b on a counter table in a store. The customer who purchased the product at the store can confirm the price displayed on the customer display 3b and recognize the payment amount. Further, the customer display 3b may display the product name purchased by the customer, the payment method, the date and time of purchase, the name of the store where the customer purchased, and the like.

For example, when accounting and payment of purchased items by the customer himself or herself, such as a so-called self-checkout, the salesclerk who is the user may omit the customer display 3b from the printing system 1. In this case, it is preferable that the content displayed on the customer display 3b be displayed on the smart device 3a.

For example, it is preferable that the product name purchased by the customer, the payment method, the date and time of purchase, the name of the store where the customer purchased, and the like be displayed on the smart device 3a. In this manner, the salesclerk who is the user can reduce the power consumption of the printing system 1 by omitting the customer display 3b and reducing the number of external devices depending on the situation, and can simplify the configuration of the printing system 1.

The handy scanner 3c operates by receiving electric power supplied from the printing apparatus 2. The printing apparatus 2 inputs information related to the image scanned by the handy scanner 3c.

For example, the user scans a barcode attached to the product using the handy scanner 3c. Information related to the scanned image is output to the smart device 3a via the printing apparatus 2. The smart device 3a can acquire information related to a product, information related to the price, and the like.

Further, for example, a salesclerk who is a user scans a barcode presented by a customer by a smartphone or the like using the handy scanner 3c. Information related to the scanned image is output to the smart device 3a via the printing apparatus 2.

The smart device 3a can acquire information related to a payment method, information related to the payment amount, and the like. Based on these pieces of information, the smart device 3a may complete the payment of the fee via the online payment service and display the information related to the payment completion on the customer display 3b via the printing apparatus 2. Accordingly, the customer to confirm that the payment is completed.

1-2. Function of Printing System

Figure 2:
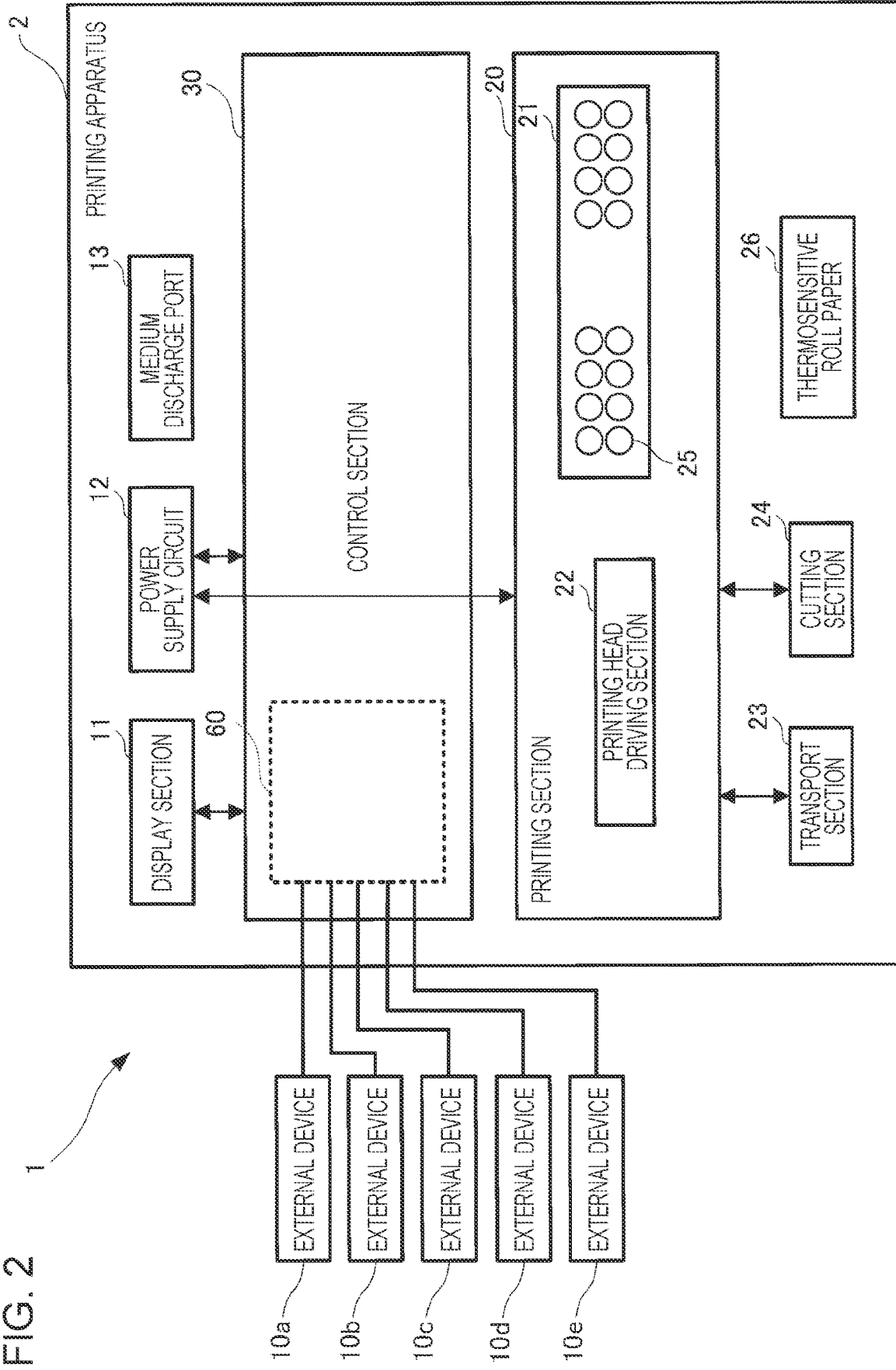
FIG. 2 is a block diagram of the printing system.

The functional configuration of the printing system 1 will be described with reference to FIG. 2. FIG. 2 is a block diagram of the printing system 1.

The printing system 1 includes an external device 10a, an external device 10b, an external device 10c, an external device 10d, an external device 10e, and the printing apparatus 2. The smart device 3a, the customer display 3b, and the handy scanner 3c described above are examples of the external device 10a, the external device 10b, the external device 10c, the external device 10d, and the external device 10e.

The printing apparatus 2 includes a display section 11, a power supply circuit 12, a medium discharge port 13, a printing section 20, and a control section 30.

The display section 11 includes, for example, a plurality of LEDs. The display section 11 is electrically coupled to the control section 30 and is controlled by the control section 30. The display section 11 displays, for example, information related to the state of the printing apparatus 2 by blinking the LED. The display section 11 may be a liquid crystal display device.

The power supply circuit 12 can supply electric power to the display section 11, the printing section 20, and the control section 30. The power supply circuit 12 is coupled to, for example, a commercial AC power source, and can convert the electric power supplied from the commercial AC power source into appropriate electric power and supply the converted electric power to each section.

The power supply circuit 12 includes, for example, a DC-DC converter, a resistance element, a switching element, a transistor, and the like. The power supply circuit 12 can supply electric power to the external device 10a, the external device 10b, the external device 10c, the external device 10d, and the external device 10e electrically coupled to the printing apparatus 2 via the USB interface 60. For example, the power supply circuit 12 can supply electric power to the smart device 3a, the customer display 3b, and the handy scanner 3c.

The printing section 20 includes the thermal head 21 and a printing head driving section 22. Further, the printing section 20 is electrically coupled to the transport section 23 and the cutting section 24. The transport section 23 has a transport roller (not illustrated), and the cutting section 24 has a cutter including a first blade and a second blade. The first blade is a movable blade that moves between the standby position and the cutting position, and the second blade is a fixed blade that engages with the first blade that moves to the cutting position to cut the recording paper. The printing section 20 is electrically coupled to the power supply circuit 12 and operates by receiving electric power supplied from the power supply circuit 12. Further, the printing section 20 is controlled by the control section 30. Further, the printing section 20 performs printing on the medium P based on the print data output from the smart device 3a, which is an example of the external device, for example. As described above, an example of an electronic device including the printing section 20 that performs printing on the medium P is the printing apparatus 2.

The thermal head 21 has a large number of heat generating elements 25. A large number of heat generating elements 25 are arranged in a direction orthogonal to the transport direction of thermosensitive roll paper 26 which is the medium P. The heat generating element 25 is energized to apply heat to the printed surface of the thermosensitive roll paper 26. Accordingly, the thermal head 21 can print letters, images, and the like on the thermosensitive roll paper 26. The part drawn out from the thermosensitive roll paper 26 may be described as recording paper. Further, the printing section 20 is not limited to printing by the thermal head 21, and may perform printing by an ink jet method, an impact dot matrix method, or a laser method. The medium P is not limited to the thermosensitive roll paper 26, but may be a sheet paper, a label paper, or the like.

The printing head driving section 22 is controlled by the control section 30 to control the energization of the thermal head 21 to the heat generating element 25. The transport section 23 is controlled by the control section 30 to rotate the transport roller to transport the thermosensitive roll paper 26. The cutting section 24 is controlled by the control section 30 and drives the first blade to slide toward the second blade to cut the thermosensitive roll paper 26.

Figure 3:
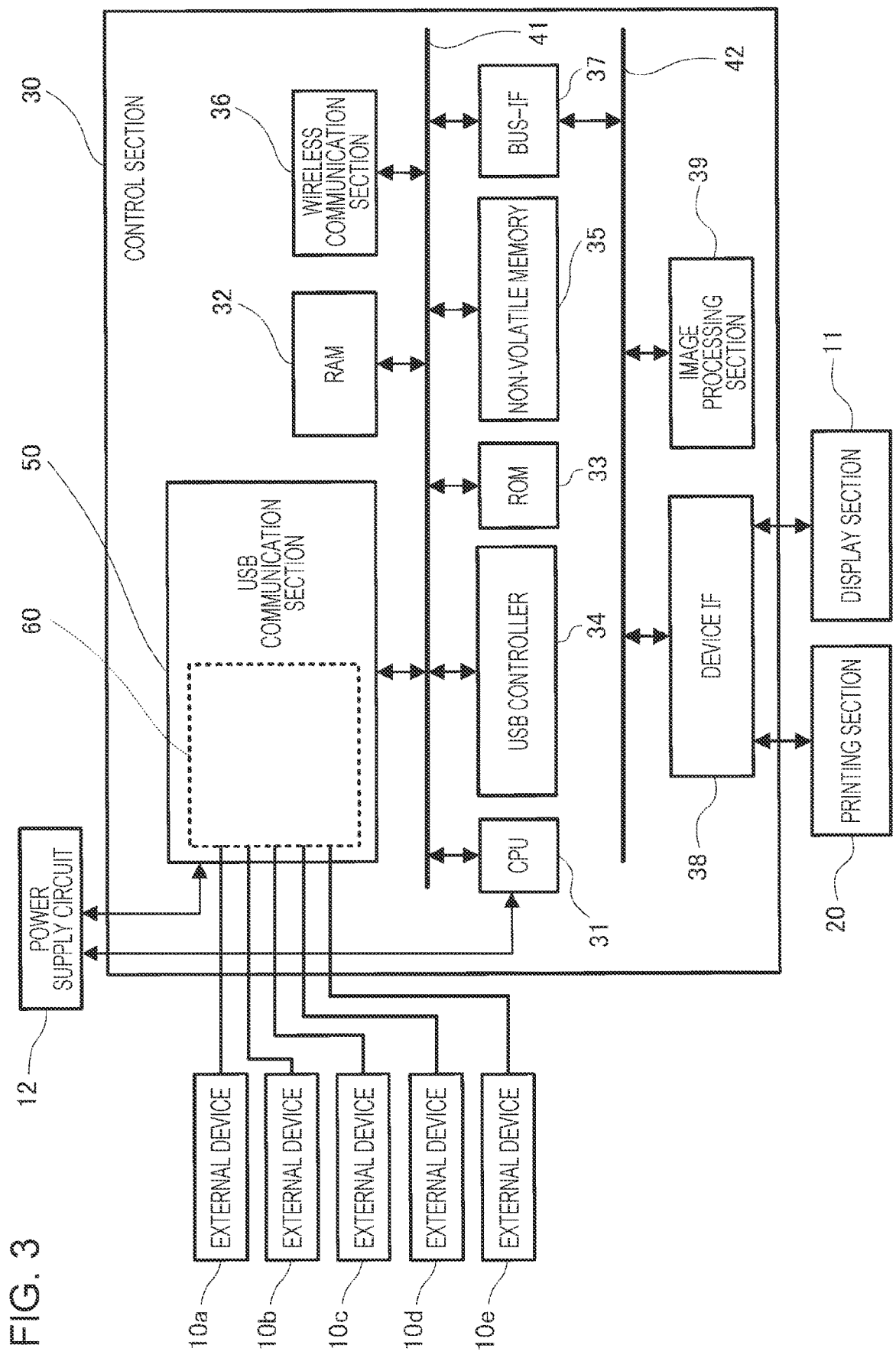
FIG. 3 is a block diagram of a control section of a printing apparatus.

FIG. 3 is a block diagram of the control section 30 of the printing apparatus 2. As illustrated in FIG. 3, the control section 30 includes a central processing unit (CPU) 31, a random access memory (RAM) 32, a read only memory (ROM) 33, a USB controller 34, a non-volatile memory 35, a wireless communication section 36, a USB communication section 50, a BUS-IF 37, a device IF 38, and an image processing section 39. The CPU 31 is an example of a control circuit. Although the CPU is exemplified as an example of the control circuit, the control circuit may be configured to include hardware such as field programmable gate array (FPGA) in place of the CPU or in addition to the CPU.

The CPU 31 performs the main control of the printing apparatus 2. The CPU 31 is electrically coupled to the RAM 32, the ROM 33, the USB controller 34, the non-volatile memory 35, the wireless communication section 36, the USB communication section 50, and the BUS-IF 37 via a system bus 41.

The RAM 32 is a memory that can be read and written at any time to provide a work area of the CPU 31. The RAM 32 can also be used as an image memory for temporarily storing image data. The ROM 33 is a boot ROM and stores a boot program of the system. The non-volatile memory 35 stores system software, set value data, and the like that need to be retained even after the power supply of the printing apparatus 2 is cut off.

The USB controller 34 controls the USB interface 60 via the system bus 41. In other words, the USB controller 34 controls the external device 10a, the external device 10b, the external device 10c, the external device 10d, and the external device 10e coupled to the USB interface 60. For example, the USB controller 34 may be configured to include hardware such as a system on a chip (SoC).

The wireless communication section 36 can be coupled to an external device by using wireless communication. The wireless communication section 36 can communicate with an external device according to a standard such as Wi-Fi (registered trademark) or Bluetooth (registered trademark). The BUS-IF 37 is an interface that electrically couples the system bus 41 and an image bus 42. The BUS-IF 37 can operate as a bus bridge that transforms the data structure.

In addition to the BUS-IF 37, the device IF 38 and the image processing section 39 are electrically coupled to the image bus 42. The device IF 38 is an interface that couples the control section 30, the printing section 20, and the display section 11. The device IF 38 can perform data synchronous and asynchronous conversion. The image processing section 39 can execute predetermined processing on the data related to printing output to the printing section 20.

1-3. USB Interface

Figure 4:
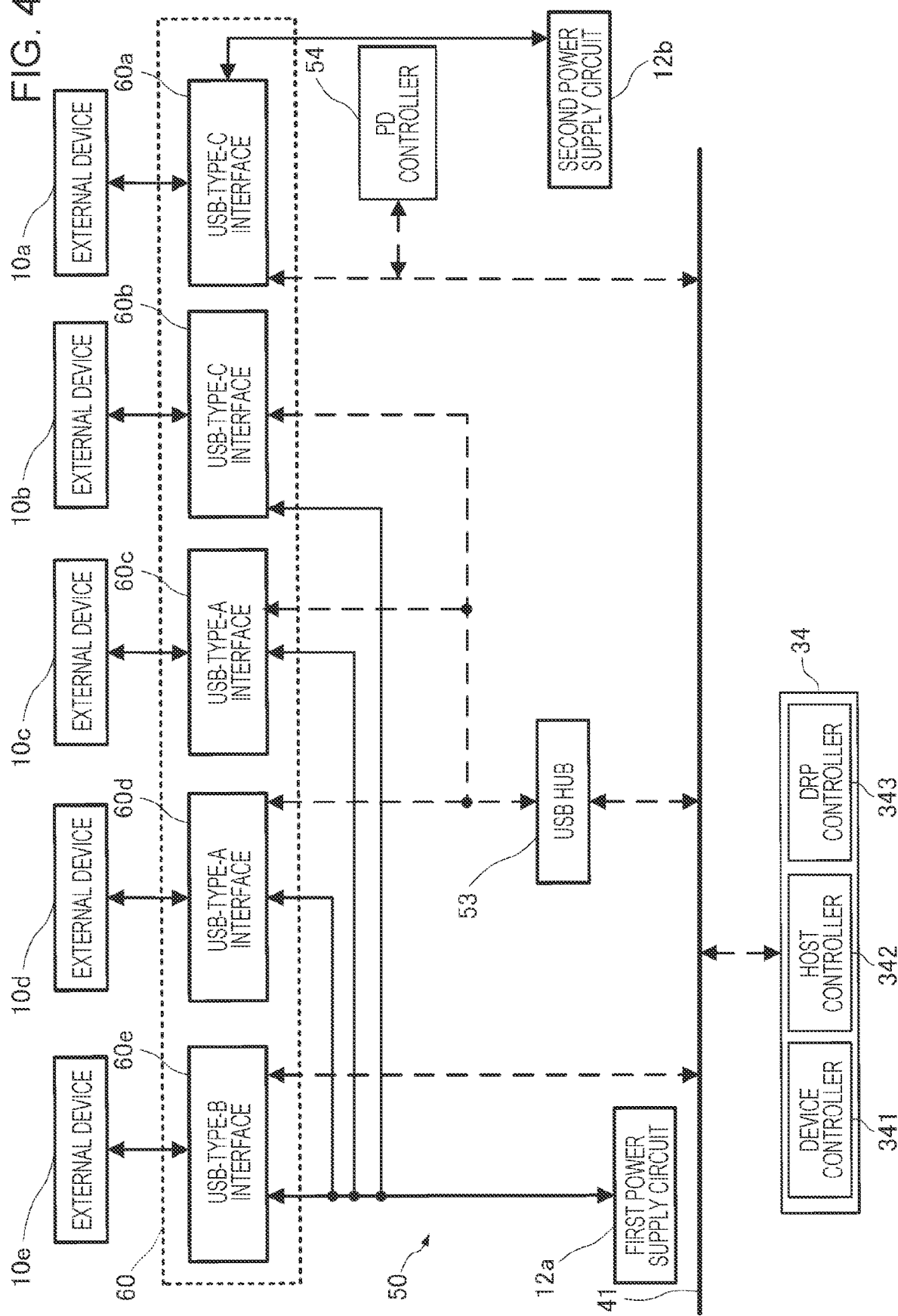
FIG. 4 is a block diagram of a USB controller and a USB interface.

FIG. 4 is a block diagram of the USB communication section 50 and the USB interface 60. FIGS. 5 to 9 are views illustrating each interface included in the USB interface 60. As illustrated in FIG. 4, the USB communication section 50 includes the USB interface 60, a USB hub 53, and a PD controller 54.

The USB hub 53 is electrically coupled to the USB interface 60. Further, the USB hub 53 receives an instruction from the USB controller 34 via the system bus 41 and operates between the USB controller 34 and the USB interface 60. For example, the USB hub 53 may be configured to include hardware such as an integrated circuit. Further, the USB hub 53 serves as a line concentrator or a relay device in the USB network.

The PD controller 54 performs a control to supply electric power corresponding to the USB power delivery (PD) standard described later to the external device 10a coupled to a USB-Type-C interface 60a.

Further, the USB interface 60 includes USB-Type-C interfaces 60a and 60b, USB-Type-A interfaces 60c and 60d, and a USB-Type-B interface 60e.

In FIG. 4, an example in which the USB-Type-C interface 60a is coupled to the external device 10a, the USB-Type-C interface 60b is coupled to the external device 10b, the USB-Type-A interface 60c is coupled to the external device 10c, the USB-Type-A interface 60d is coupled to the external device 10d, and the USB-Type-B interface 60e is coupled to the external device 10e is illustrated, but the present disclosure is not limited thereto. The USB interface 60 may include a USB interface of another standard such as mini-USB-Type-A or micro-USB-Type-A.

The power supply circuit 12 illustrated in FIG. 3 has a first power supply circuit 12a and a second power supply circuit 12b. The first power supply circuit 12a supplies electric power to the USB-Type-C interface 60b, the USB-Type-A interfaces 60c and 60d, and the USB-Type-B interface 60e. The first power supply circuit 12a may be configured to supply electric power to the USB hub 53. Further, the first power supply circuit 12a may be configured not to supply electric power to the USB-Type-B interface 60e.

On the other hand, the second power supply circuit 12b supplies electric power to the USB-Type-C interface 60a. The second power supply circuit 12b may be configured to supply electric power to the PD controller 54.

Figure 5:
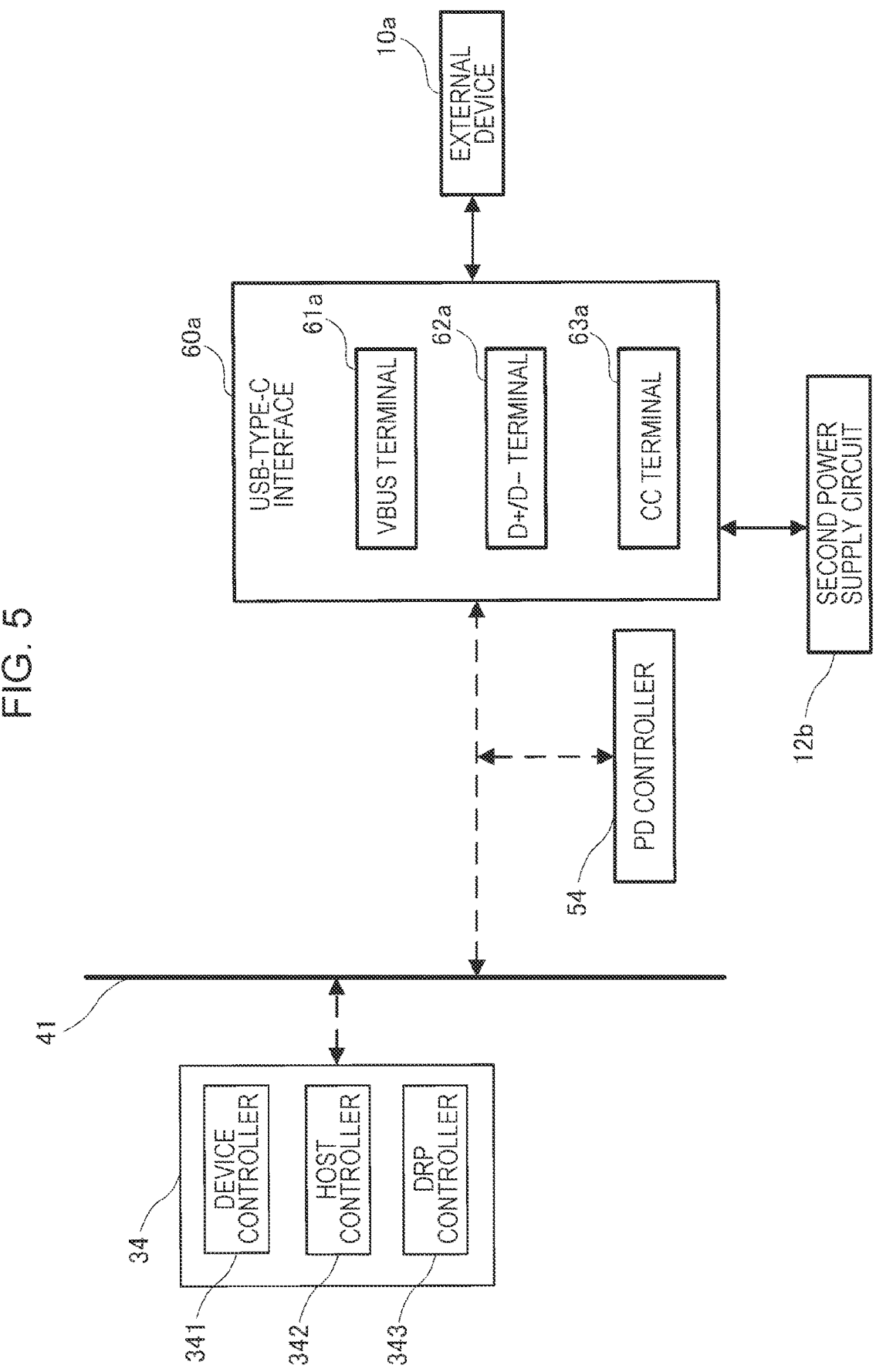
FIG. 5 is a block diagram of the USB controller and a USB-Type-C interface.

The USB-Type-C interface 60a will be described with reference to FIG. 5. FIG. 5 is a block diagram of the USB controller 34 and the USB-Type-C interface 60a.

The USB controller 34 includes a device controller 341, a host controller 342, and a dual role port (DRP) controller 343. The USB-Type-C interface 60a is controlled by the DRP controller 343 and the PD controller 54 of the USB controller 34 via the system bus 41.

The USB-Type-C interface 60a includes a VBUS terminal 61a, a D+/D− terminal 62a, and a configuration channel (CC) terminal 63a.

The DRP controller 343 controls data transmission/reception from the external device 10a coupled to the USB-Type-C interface 60a. The DRP controller 343 performs the data transmission control for transmitting data such as commands related to printing to the CPU 31 via the system bus 41.

The DRP controller 343 mediates mutual communication performed between the USB controller 34 and the USB interface 60, for example, in synchronous serial communication or the like. The synchronous serial communication may be, for example, inter-integrated circuit (I2C) communication.

The PD controller 54 can retain electric power profile setting information indicating the amount of electric power that can be supplied by the printing apparatus 2. The PD controller 54 can execute step-up processing or step-down processing on the electric power supplied from the second power supply circuit 12b based on the setting information of the electric power profile by using a regulator (not illustrated). Accordingly, the printing apparatus 2 can supply a desired voltage to the external device 10a via the VBUS terminal 61a.

The VBUS terminal 61a is a so-called power input/output terminal. The VBUS terminal 61a is a terminal for transmitting and receiving electric power to and from the external device 10a. Therefore, electric power can be received between the printing apparatus 2 and the external device 10a.

The D+/D− terminal 62a is a so-called data transmission/reception terminal. The D+/D− terminal 62 is a terminal for transmitting/receiving a data signal to and from the external device 10a. Therefore, data signals can be transmitted and received between the printing apparatus 2 and the external device 10a.

The CC terminal 63a is a so-called state identification terminal. The CC terminal 63a is a terminal that identifies whether the D+/D− terminal 62a is in a state where the data signal can be received from the external device 10a or is in a state where the data signal can be transmitted to the external device 10a. For example, the CC terminal 63a is a terminal that identifies whether the VBUS terminal 61a is in a state where electric power can be supplied from the external device 10a or is in a state where electric power can be supplied to the external device 10a. Therefore, the USB controller 34 can identify the state of the external device 10a.

Power delivery in the USB-Type-C interface 60a is a standard defined by USB Power Delivery. Hereinafter, USB Power Delivery will be abbreviated as USB PD. The second power supply circuit 12b can supply the electric power corresponding to the USB PD standard to the USB-Type-C interface 60a. For example, the second power supply circuit 12b generates a voltage different from 5 V, 9 V, and 12 V, and supplies a plurality of different voltages to the external device 10a. The second power supply circuit 12b may be configured to supply a constant current regardless of the voltage supplied to the external device 10a, or may be configured to supply a different current depending on the supplied voltage.

The USB-Type-C interface 60a transmits information related to electric power, direction, and function to be supplied or received between the printing apparatus 2 and the external device 10a before starting the USB PD. With USB PD, electric power can be supplied or received based on the contact between coupled devices.

The port that supplies electric power is a source, and the port that receives electric power is a sink. The device that functions as a source is a provider, and the device that functions as a sink is a consumer. The USB-Type-C interface 60a can change the amount of electric power supplied according to the situation, and can change the supply or reception of electric power. For example, when the printing apparatus 2 is a source, the external device 10a coupled to the USB-Type-C interface 60a is a sink. In addition, when the printing apparatus 2 is a sink, the external device 10a coupled to the USB-Type-C interface 60a is a source.

Next, an example of the power delivery processing in the USB-Type-C interface 60a will be described. The source checks the ID of the USB-Type-C cable coupled to the USB-Type-C interface 60a to confirm whether a current exceeding 3A can flow.

The source informs the sink of the available electric power profiles. The sink requests the desired profile by number from the available electric power profiles notified by the source. The source informs that the requested electric power profile is available. After this, the source turns on the VBUS terminal 61a and starts supplying electric power to the sink.

Figure 6:
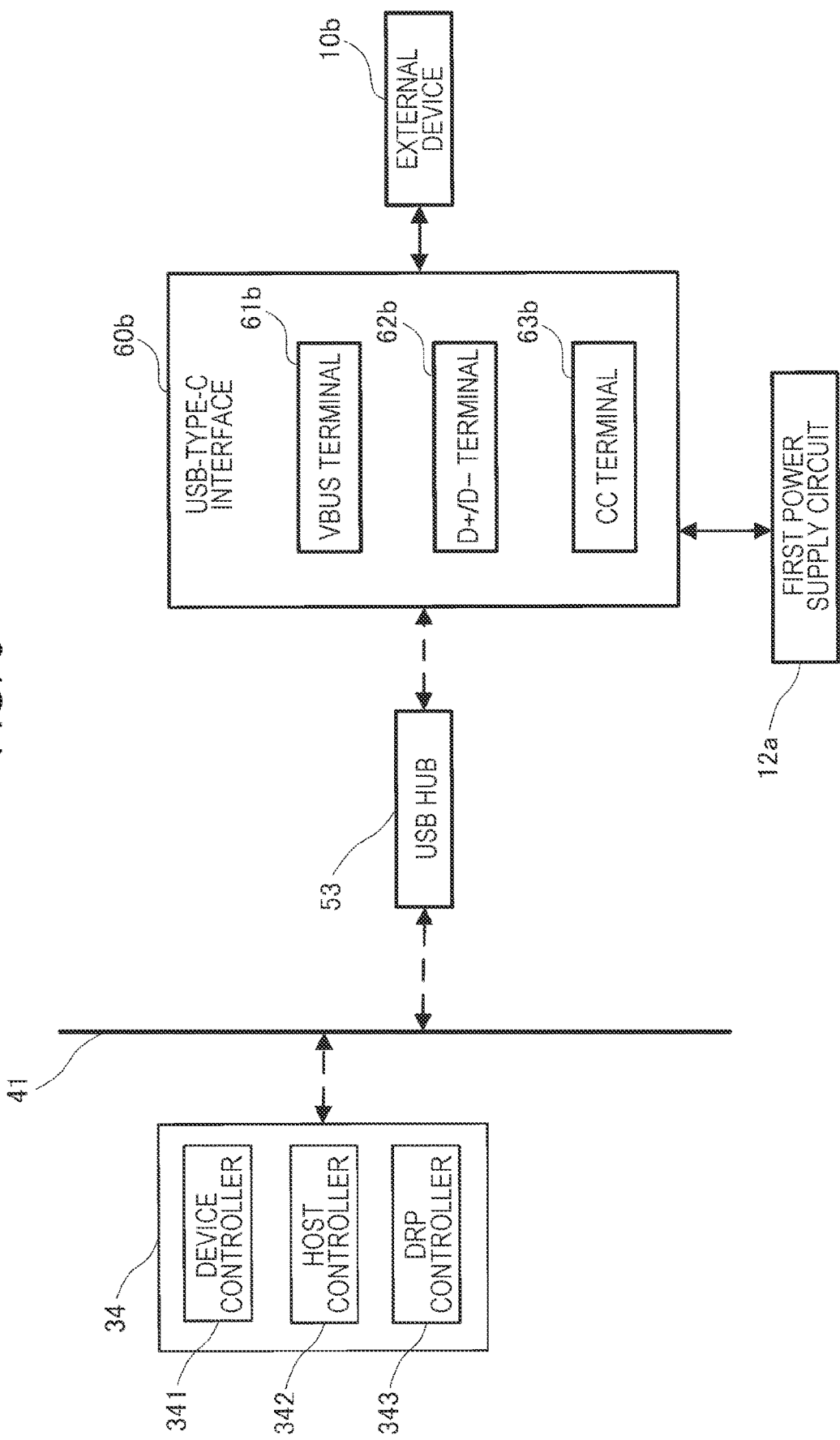
FIG. 6 is a block diagram of the USB controller and the USB-Type-C interface.

Next, the USB-Type-C interface 60b will be described with reference to FIG. 6. FIG. 6 is a block diagram of the USB controller 34 and the USB-Type-C interface 60b.

The USB-Type-C interface 60b includes a VBUS terminal 61b, a D+/D− terminal 62b, and a CC terminal 63b.

The configuration of the USB-Type-C interface 60b is the same as the configuration of the USB-Type-C interface 60a described above. However, unlike the USB-Type-C interface 60a, the USB-Type-C interface 60b is supplied with electric power not from the second power supply circuit 12b but from the first power supply circuit 12a.

Since the USB-Type-C interface 60b has the CC terminal 63b like the USB-Type-C interface 60a, it is possible to identify the state of the external device 10b coupled to the USB-Type-C interface 60b. Therefore, the USB-Type-C interface 60b can identify the state of the external device 10b, and can transfer electric power and transmit/receive data.

However, unlike the USB-Type-C interface 60a, the USB-Type-C interface 60b is supplied with electric power from the first power supply circuit 12a and is not controlled by the PD controller 54. Therefore, the electric power corresponding to the USB PD standard cannot be supplied to the external device 10b coupled to the USB-Type-C interface 60b. Further, the voltage that the first power supply circuit 12a can supply to the external device 10b via the USB-Type-C interface 60b is one type. For example, the first power supply circuit 12a generates a voltage of 5 V and supplies the generated voltage to the external device 10b. The first power supply circuit 12a may be configured to supply a constant current to the external device 10b, or may be configured to supply a different current depending on the external device 10b coupled to the USB-Type-C interface 60b. The electric power that can be supplied from the first power supply circuit 12a is smaller than that of the second power supply circuit 12b.

Since the USB-Type-C interface 60b supplies less electric power than the USB-Type-C interface 60a, for example, when an external device that corresponds to a certain USB PD is coupled to the USB-Type-C interface 60b, the external device operates in accordance with the electric power supplied from the USB-Type-C interface 60b. Therefore, it is preferable that the external device 10b coupled to the USB-Type-C interface 60b be a device that does not correspond to the USB PD.

The first power supply circuit 12a has advantages that the power consumption is small and the heat generation amount is small as compared with the second power supply circuit 12b that supplies electric power to the USB-Type-C interface 60a corresponding to the USB PD standard. Considering the power consumption and functions of an external device that may be coupled to the printing apparatus 2, it is preferable that at least one of the first power supply circuit 12a and the second power supply circuit 12b correspond to USB PD.

In other words, it is preferable that at least one of USB-Type-C receptacle connectors 320a and 320b correspond to the USB PD. When there are a plurality of receptacle connectors that correspond to USB-Type-C, it is preferable that at least one of the plurality of receptacle connectors correspond to the USB PD.

Further, it is preferable that at least one of the first power supply circuit 12a and the second power supply circuit 12b not correspond to the USB PD. It is preferable that at least one of the USB-Type-C receptacle connectors 320a and 320b not correspond to the USB PD. For example, the first power supply circuit 12a that does not correspond to the USB PD may supply electric power to, for example, the USB-Type-C receptacle connector 320b and USB-Type-A receptacle connectors 320c and 320d.

In such a configuration, since the first power supply circuit 12a that does not correspond to the USB PD supplies electric power to a plurality of types of receptacle connectors, the power supply circuit that supplies electric power to the receptacle connectors that do not correspond to USB PD can be commonly used. Accordingly, it is not necessary to increase the number of power supply circuits mounted on the substrate 300 illustrated in FIG. 17, and thus the configuration of the substrate 300 can be simplified. Further, by simplifying the configuration of the substrate 300, there is an effect that the heat generation amount in the substrate 300 is reduced.

For example, when accounting is performed according to a product or service purchased by a customer, the salesclerk may operate the external device 10a and the customer may operate the external device 10b. In general, the customer needs fewer operations than the salesclerk, such as selecting a payment method, and thus it is preferable that the customer operate an external device having a simpler function than the salesclerk. In other words, it is preferable that the customer operate the external device 10b and the salesclerk operate the external device 10a that consumes more power than the external device 10b.

Figure 7:
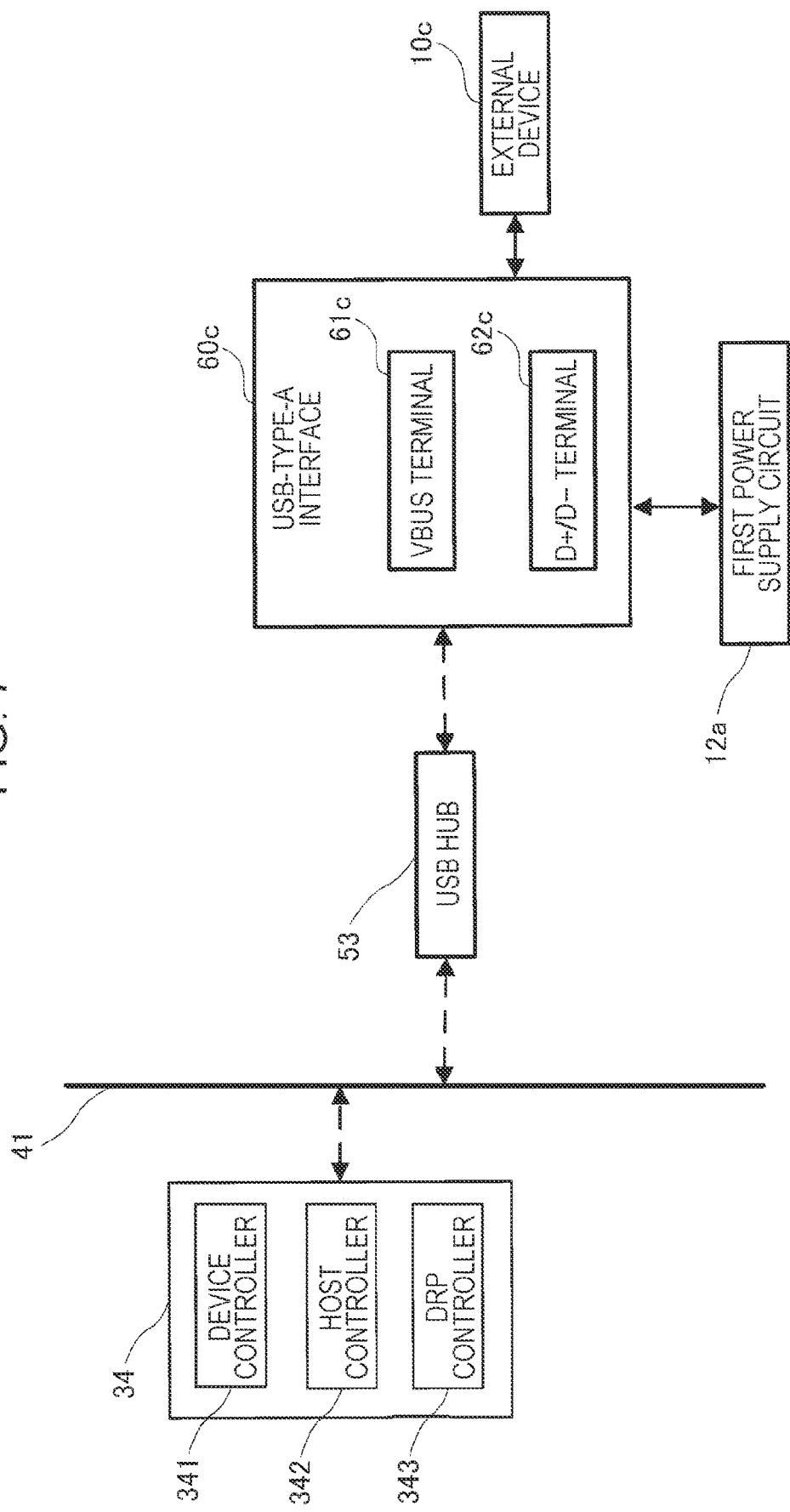
FIG. 7 is a block diagram of the USB controller and a USB-Type-A interface.

Next, the USB-Type-A interface 60c will be described with reference to FIG. 7. FIG. 7 is a block diagram of the USB controller 34 and the USB-Type-A interface 60c.

The USB-Type-A interface 60c includes the VBUS terminal 61c and a D+/D− terminal 62c. Unlike the above-described USB-Type-C interfaces 60a and 60b, the CC terminals 63a and 63b are omitted. Therefore, the USB-Type-A interface 60c does not have a function of identifying the state of the coupled external device 10c.

The USB-Type-A interface 60c is supplied with electric power from the first power supply circuit 12a, and supplies electric power to the external device 10c via the VBUS terminal 61c. For example, the voltage supplied to the USB-Type-A interface 60c by the first power supply circuit 12a is 5 V. Further, the USB-Type-A interface 60c transmits a signal to the external device 10c via the D+/D− terminal 62c.

The USB hub 53 electrically coupled to the USB-Type-A interface 60c is controlled by the host controller 342 of the USB controller 34 via the system bus 41. In other words, the USB-Type-A interface 60c is controlled by the host controller 342.

Figure 8:
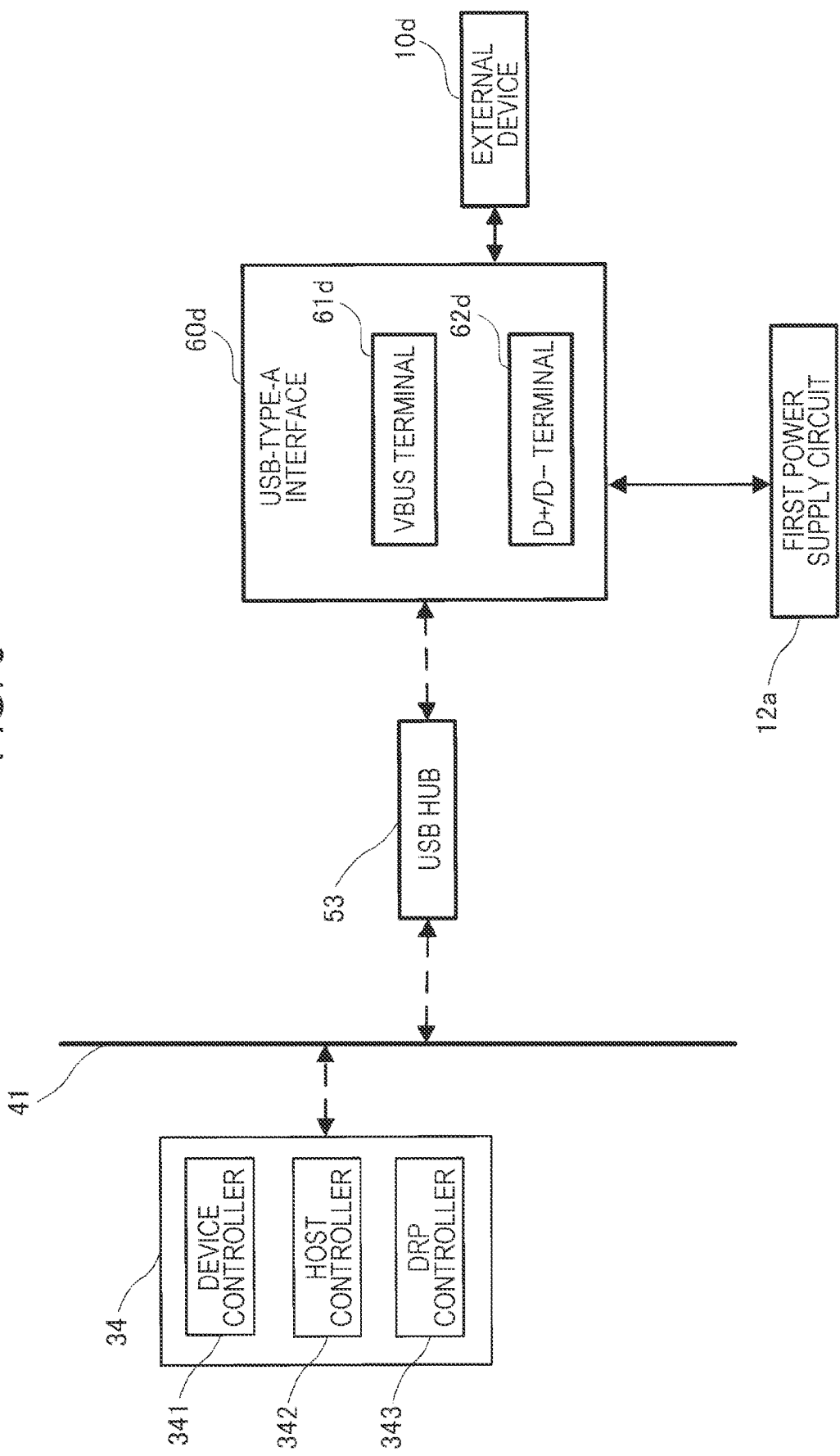
FIG. 8 is a block diagram of the USB controller and the USB-Type-A interface.

Since the USB-Type-A interface 60d illustrated in FIG. 8 has the same configuration as the USB-Type-A interface 60c illustrated in FIG. 7, the description thereof will be omitted.

Figure 9:
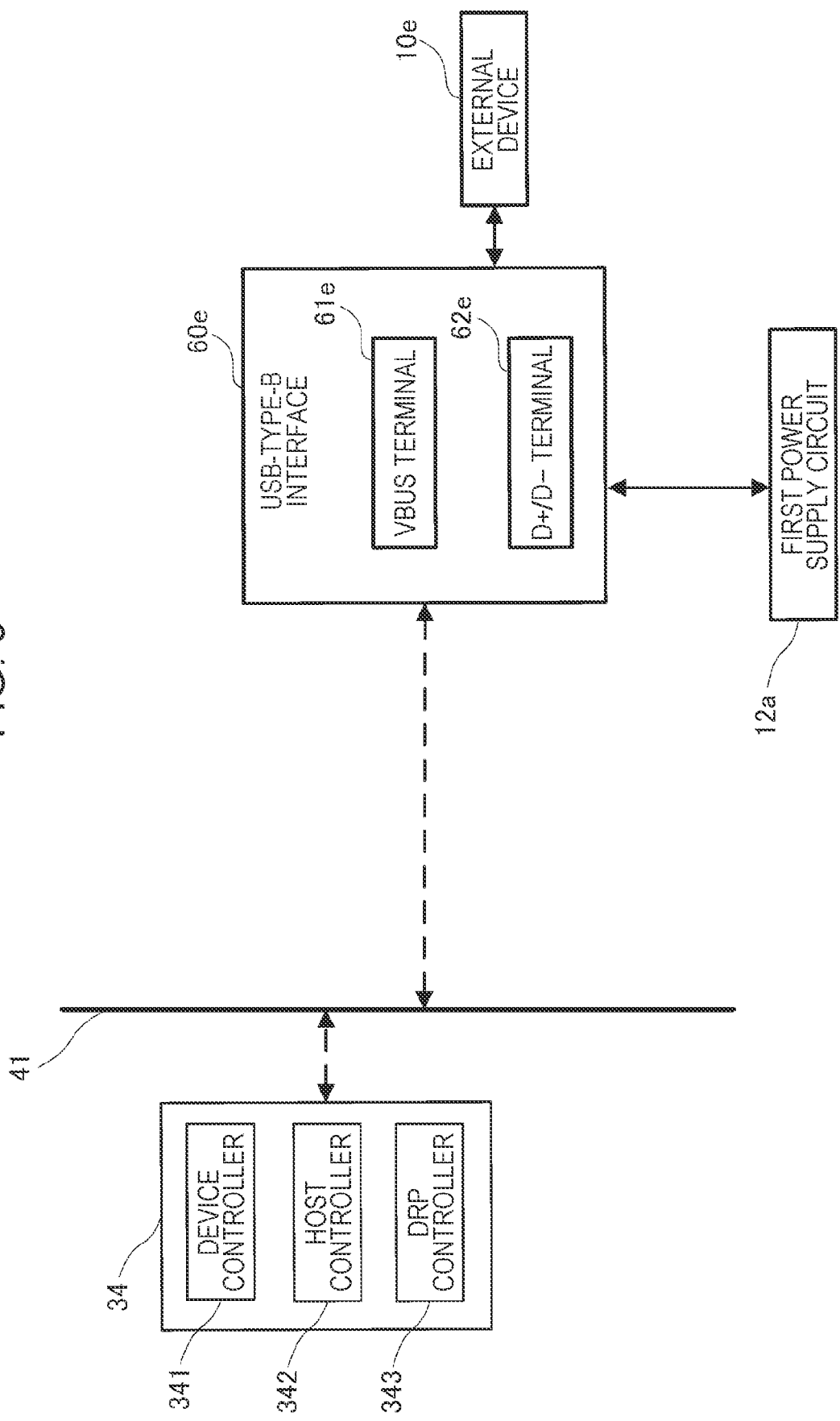
FIG. 9 is a block diagram of the USB controller and the USB-Type-B interface.

Next, the USB-Type-B interface 60e will be described with reference to FIG. 9. FIG. 9 is a block diagram of the USB controller 34 and the USB-Type-B interface 60e.

The USB-Type-B interface 60e includes a VBUS terminal 61e and a D+/D− terminal 62e. Unlike the above-described USB-Type-C interfaces 60a and 60b, the CC terminals 63a and 63b are omitted. Therefore, the USB-Type-B interface 60e does not have a function of identifying the state of the coupled external device 10e.

The USB-Type-B interface 60e is supplied with electric power from the first power supply circuit 12a, and supplies electric power to the external device 10e via the VBUS terminal 61e. For example, the voltage supplied to the USB-Type-B interface 60e by the first power supply circuit 12a is 5 V. Further, the USB-Type-B interface 60e transmits a signal to the external device 10e via the D+/D− terminal 62e.

The USB-Type-B interface 60e is controlled by the device controller 341 of the USB controller 34 via the system bus 41.

In other words, unlike the USB-Type-A interfaces 60c and 60d, the USB-Type-B interface 60e is controlled from the USB controller 34 without going through the USB hub 53. The USB-Type-B interface 60e may be configured to be controlled from the USB controller 34 via the USB hub 53.

1-4. Printing Apparatus

A schematic configuration of the printing apparatus 2 will be described with reference to FIGS. 10 to 12.

Figure 10:
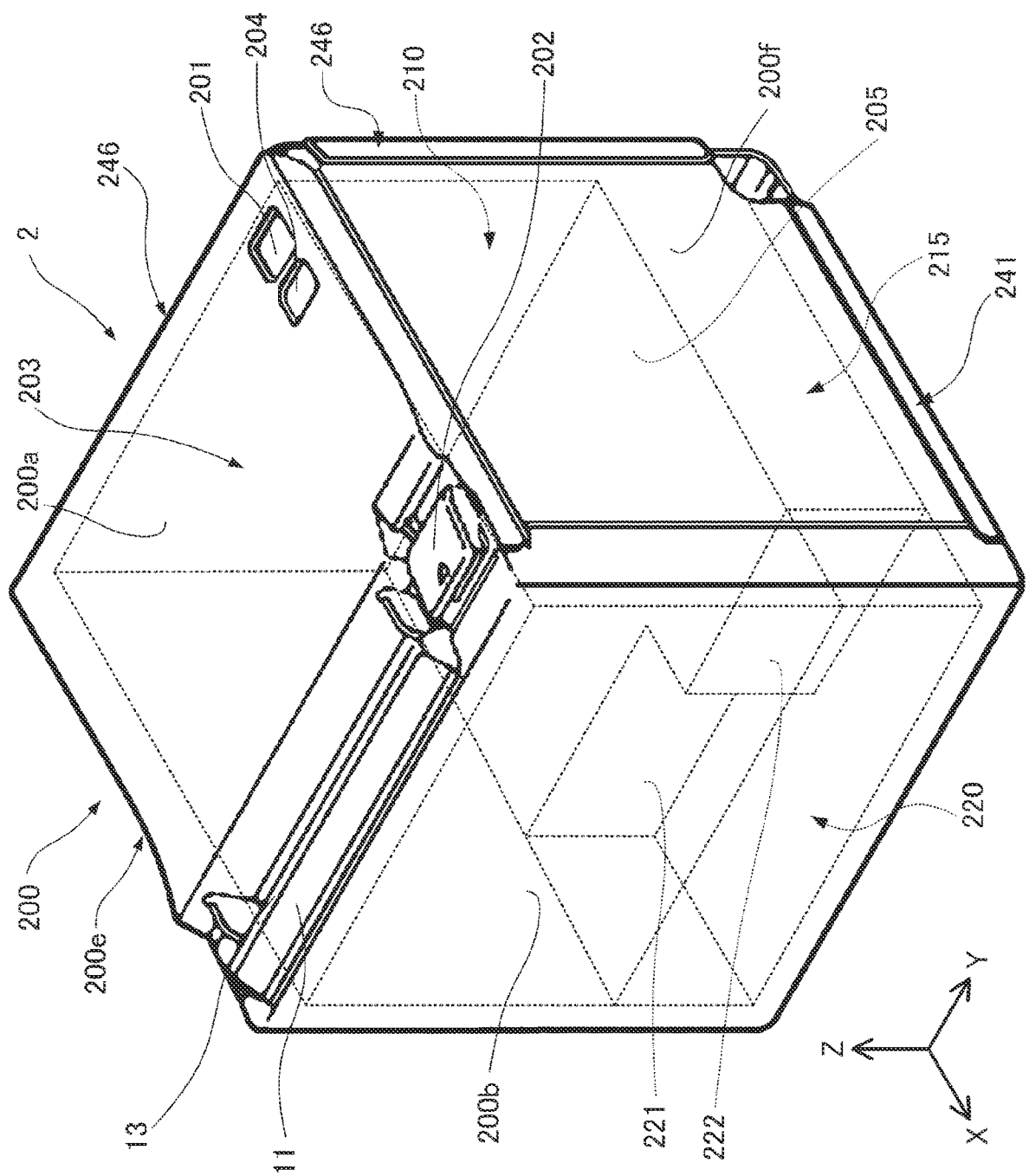
FIG. 10 is a perspective view of the printing apparatus.
Figure 11:
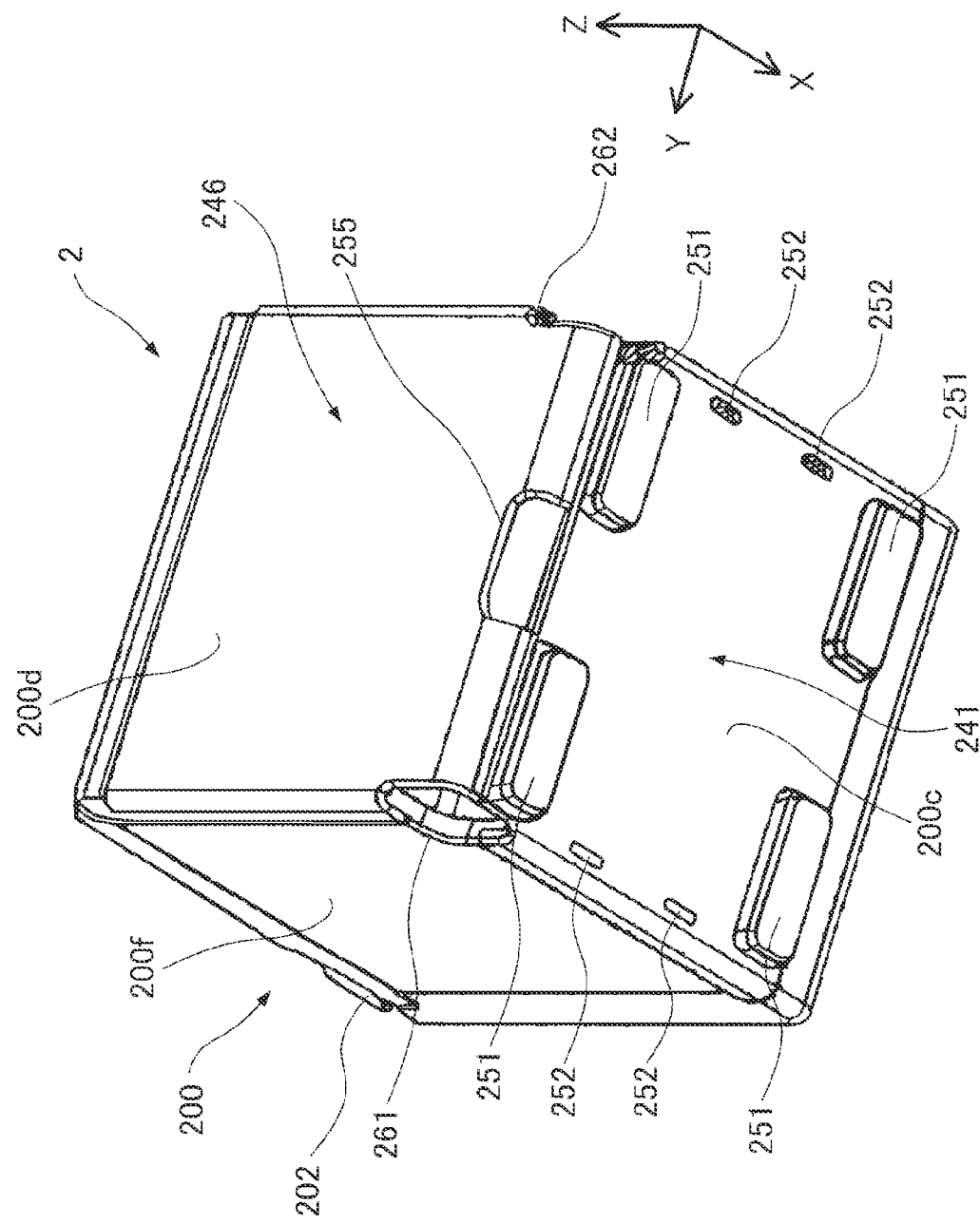
FIG. 11 is a perspective view of the printing apparatus when viewed from the back.
Figure 12:
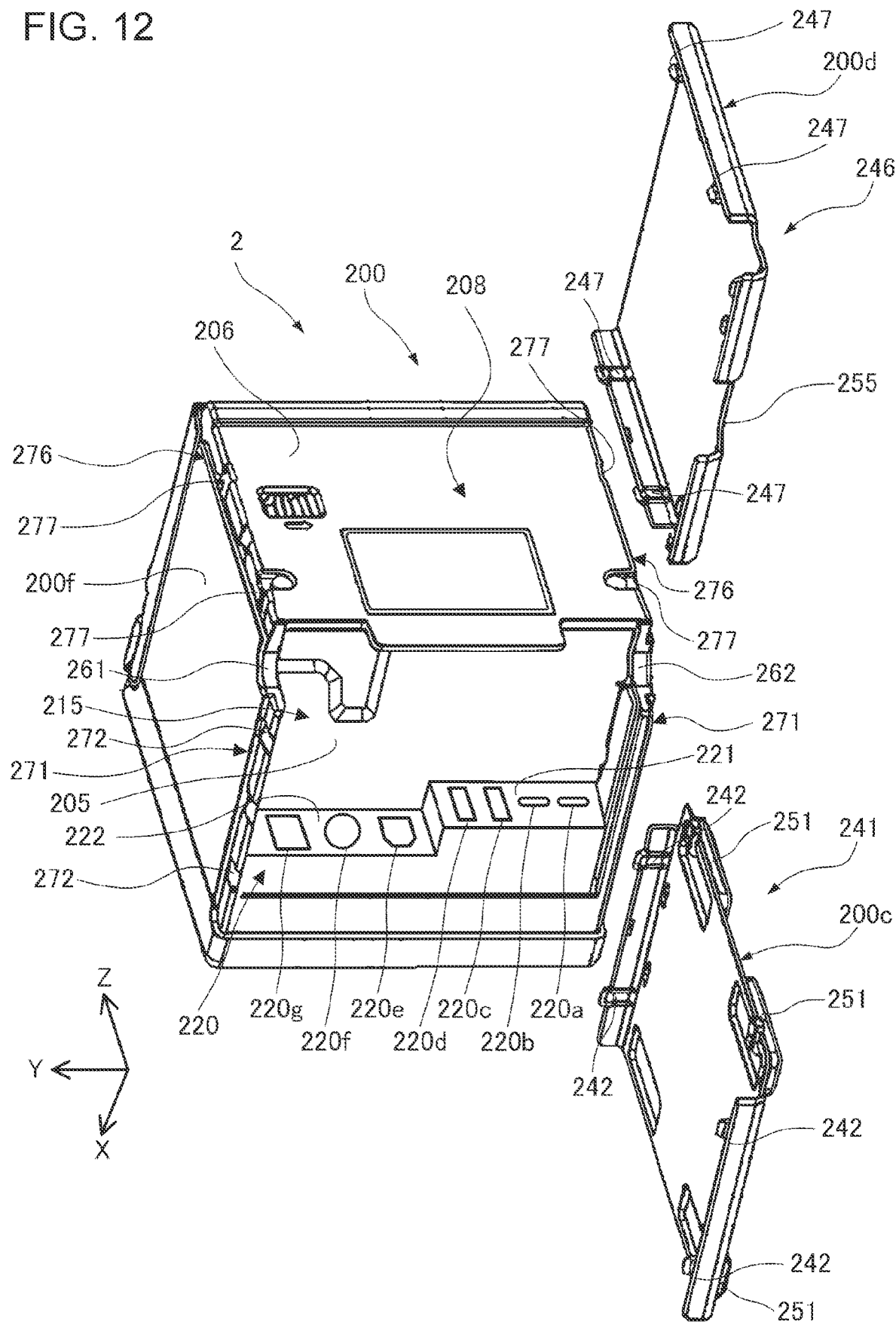
FIG. 12 is a perspective view of the printing apparatus with a bottom cover and a back cover removed.

In FIGS. 10 to 12, the +X direction is the front direction of the printing apparatus 2, the −X direction is the rear direction of the printing apparatus 2, the +Y direction is the right direction of the printing apparatus 2, the −Y direction is the left direction of the printing apparatus 2, the +Z direction is the upward direction of the printing apparatus 2, and the −Z direction is the downward direction of the printing apparatus 2.

The printing apparatus 2 is, for example, a thermal printer. As illustrated in FIG. 10, the printing apparatus 2 has a main body case 200 having a rectangular parallelepiped shape as a whole, excluding uneven portions such as buttons. As illustrated in FIG. 12, a bottom cover 241 and a back cover 246 of the printing apparatus 2 are attachable and detachable, and the main body frame 208 is covered with the bottom cover 241 and the back cover 246.

Inside the main body case 200, a printing section 20 illustrated in FIG. 2, a medium storage section 210 for storing the medium P, and a connector section 220 are provided. When the opening/closing door 203 is closed, the printed medium P is discharged from the medium discharge port 13 via a transport path formed between the opening/closing door 203 and the main body case 200.

The opening/closing door 203 constitutes the first case surface 200a of the main body case 200, and is coupled to be openable/closable behind the main body case 200. In FIG. 10, the first case surface 200a is the front surface of the main body case 200. The opening/closing door 203 is provided with, for example, a transport roller at the front end portion, and the transport roller is arranged to face the thermal head 21 provided in the main body case 200 when the opening/closing door 203 is closed. When the opening/closing door 203 is closed, the transport roller and the thermal head 21 are in a state of sandwiching the medium P, the medium P is transported by the rotation of the transport roller, and printing is performed on the printed surface of the medium P by the thermal head 21. The display section 11, the medium discharge port 13, a power switch 201, an opening/closing lever 202, and a feed switch 204 are provided on the first case surface 200a of the main body case 200. In other words, the display section 11, the medium discharge port 13, the power switch 201, the opening/closing lever 202, and the feed switch 204 are arranged on the first case surface 200a of the main body case 200.

Further, the connector section 220 is provided on a routing section 215 formed between a third case surface 200c and a first main body frame surface 205, facing a third case surface 200c of the main body case 200. In FIG. 10, the third case surface 200c is the bottom surface of the main body case 200. As will be described later, the connector section 220 includes a substrate 300 provided with various receptacle connectors. The substrate 300 is parallel to the third case surface 200c of the main body case 200. For example, the substrate 300 is coupled to the main substrate accommodated inside the main body case 200 and is arranged to be parallel to the third case surface 200c of the main body case 200.

The power switch 201 is a switch for turning on or off the power of the printing apparatus 2. As illustrated in FIG. 1, the printing apparatus 2 is coupled to a commercial AC power source via the power cable 5 and is supplied with electric power. The printing apparatus 2 performs printing on the medium P and communicates with an external device such as the smart device 3a while the power is on.

The opening/closing lever 202 is for opening and closing the opening/closing door 203. The user operates the opening/closing lever 202 to open the opening/closing door 203, and stores the thermosensitive roll paper 26, which is the medium P, in the medium storage section 210 provided in the main body case 200. The opening/closing door 203 seals the medium storage section 210 from above.

The feed switch 204 is a switch for feeding the thermosensitive roll paper 26 which is the medium P stored in the medium storage section 210. Specifically, the user can feed the thermosensitive roll paper 26 to a desired position by operating the feed switch 204. For example, the roll paper may be transported when the user is pressing the feed switch 204, and the transport of the roll paper may be stopped while the user is not pressing the feed switch 204.

The display section 11 may display, for example, information related to the communication state, information for prompting the replenishment of the medium P, and the like. Since the display section 11 has a role of notifying the user of the state of the printing apparatus 2, it is preferable that the display section 11 be provided at a position where the user easily visually recognizes the display section 11. For example, when the printing apparatus 2 is arranged such that a second case surface 200b of the main body case 200 faces the front surface, the user can easily visually recognize the display section 11 and the medium discharge port 13.

The medium discharge port 13 discharges, for example, the medium P on which letters, images, and the like are printed based on print data. As described above, for example, when the user is in the front direction of the printing apparatus 2 and the printing apparatus 2 is arranged such that the second case surface 200b of the main body case 200 faces the front surface, the printed surface of the medium P faces the user, and thus the user can confirm the content printed on the medium P while observing how the medium P is discharged from the medium discharge port 13. Therefore, the user can confirm the printed contents without waiting for the completion of the discharge of the medium P from the medium discharge port 13.

Therefore, it is preferable that the medium discharge port 13 be provided at a position where the user can easily visually recognize the medium discharge port 13, like the display section 11. Furthermore, it is more preferable that the medium discharge port 13 be provided near the display section 11 such that the user can visually recognize the medium discharge port 13 at the same time as the display section 11. Specifically, it is preferable that the medium discharge port 13 and the display section 11 be provided side by side on the first case surface 200a of the main body case 200, and the longitudinal direction of the medium discharge port 13 and the display section 11 be the Y direction which is the width direction of the main body case 200.

As illustrated in FIG. 11, the bottom cover 241 constituting the third case surface 200c of the main body case 200 is attachable and detachable and covers the routing section 215. The bottom cover 241 has a substantially rectangular shape. The bottom cover 241 has a plurality of elastic members 251 that serve as legs of the printing apparatus 2. Further, the bottom cover 241 has a plurality of holes 252. The hole 252 discharges water droplets that have entered the inside of the main body case 200 to the outside of the main body case 200. Further, the printing apparatus 2 can be used by hanging the printing apparatus 2 on a wall in addition to using by placing the printing apparatus 2 on a table, a floor, or the like. At this time, the hole 252 engages with a wall-hanging member (not illustrated), and the printing apparatus 2 is hung on the wall. As a result, the printing apparatus 2 can be used in a so-called wall-hanging state, and the table or floor can be widely used.

As illustrated in FIG. 11, the back cover 246 constituting a fourth case surface 200d of the main body case 200 is attachable and detachable and covers a second main body frame surface 206. In FIG. 10, the fourth case surface 200d is the back surface of the main body case 200. The back cover 246 has a substantially rectangular shape. The back cover 246 covers the main body frame 208 from the back. The back cover 246 has a cable draw-out port 255 for drawing out various cables coupling the printing apparatus 2 and various external devices.

As illustrated in FIG. 12, a fifth case surface 200e and a sixth case surface 200f of the main body case 200 are provided with a first attaching section 271 for mounting the bottom cover 241. In FIG. 10, the fifth case surface 200e is the left side surface of the main body case 200, and the sixth case surface 200f is the right side surface of the main body case 200. Similarly, the fifth case surface 200e and the sixth case surface 200f of the main body case 200 are provided with a second attaching section 276 for mounting the back cover 246.

The first attaching section 271 is formed at the lower end portions of the fifth case surface 200e and the sixth case surface 200f of the main body case 200. The first attaching section 271 is provided with a case-side engaging section 272. The bottom cover 241 is mounted to the main body case 200 by engaging the case-side engaging section 272 and a cover-side engaging section 242 provided on the bottom cover 241.

The second attaching section 276 is formed at the rear end portions of the fifth case surface 200e and the sixth case surface 200f of the main body case 200. The second attaching section 276 is provided with a case-side engaging section 277. The back cover 246 is mounted to the main body case 200 by engaging the case-side engaging section 277 and a cover-side engaging section 247 provided on the back cover 246.

Further, circular notch sections 261 and 262 are provided at the corners where the first attaching section 271 and the second attaching section 276 provided on the fifth case surface 200e and the sixth case surface 200f of the main body case 200 intersect with each other. Further, the notch sections 261 and 262 communicate with the routing section 215.

The routing section 215 is a space between the third case surface 200c of the main body case 200 and the first main body frame surface 205, and further, is a space defined by the fourth case surface 200d, the fifth case surface 200e, the sixth case surface 200f, and the connector section 220 of the main body case 200.

The routing section 215 is defined with reference to the X direction, the Y direction, and the Z direction illustrated in FIGS. 10 to 12. The X direction is defined as a direction from the back cover 246 to the first connector surface 221 and the second connector surface 222 of the connector section 220, the Y direction is defined as a direction from the fifth case surface 200e to the sixth case surface 200f of the main body case 200, and the Z direction is defined as a direction from the bottom cover 241 to the first main body frame surface 205. The first connector surface 221 or the second connector surface 222 is a flat plate surface, and is, for example, sheet metal. The flat plate surface is not limited to a flat plate made of metal such as sheet metal, and may be a flat plate made of resin or the like.

Various cables coupled to the connector section 220 are routed in the routing section 215. Then, various cables coupled to the connector section 220 are drawn out to the outside of the main body case 200 via the notch sections 261 and 262 or the cable draw-out port 255 provided in the back cover 246.

The printing apparatus 2 can be installed in the first posture in which the medium discharge port 13 of the medium P faces upward, or in the second posture in which the medium discharge port 13 of the medium P faces forward. In other words, in the first posture, the printed medium P is discharged from the medium discharge port 13 in the +Z direction, and in the second posture, the printed medium P is discharged from the medium discharge port 13 in the +X direction. Further, in the first posture, the first case surface 200a is the upper surface of the main body case 200, and in the second posture, the first case surface 200a is the front surface of the main body case 200.

Specifically, in the first posture, the connector section 220 is covered with the bottom cover 241 while in the second posture, the connector section 220 is covered with the back cover 246.

In both the first posture and the second posture, a plurality of elastic members 251 serving as legs of the printing apparatus 2 are arranged on the bottom surface of the printing apparatus 2, and thus the printing apparatus 2 can be stably installed. Further, since the plurality of elastic members 251 are not arranged on the back surface of the printing apparatus 2, the appearance of the printing apparatus 2 does not deteriorate. In a simpler configuration, only one of the bottom cover 241 and the back cover 246 that covers the connector section 220 may be attachable and detachable, and the other cover may be integrated with the main body case 200. In this case, in the first posture, the cover covering the connector section 220 is the bottom surface, and in the second posture, the cover covering the connector section 220 is the back surface.

As illustrated in FIG. 12, the connector section 220 has the first connector surface 221 and the second connector surface 222. The connector section 220 having the first connector surface 221 and the second connector surface 222 is formed of a flat plate, and the outer surface and the inner surface of the first connector surface 221 and the second connector surface 222 are formed to be flat. Here, unless otherwise specified, the flat plate is a sheet metal made of metal.

The first connector surface 221 is formed with openings 220a, 220b, 220c, and 220d, and the second connector surface 222 is formed with openings 220e, 220f, and 220g.

Figure 13:
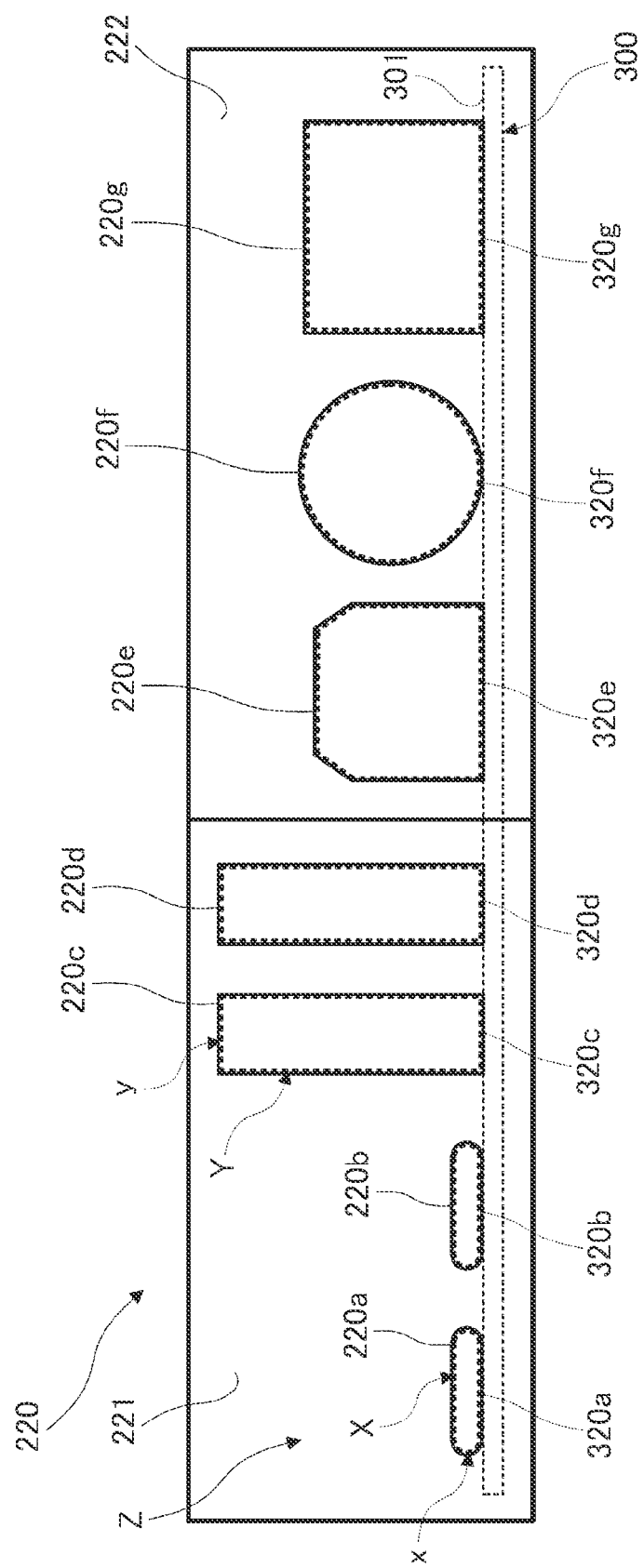
FIG. 13 is a plan view of a first connector surface and a second connector surface.

As illustrated in FIG. 13, openings corresponding to the USB-Type-C receptacle connector 320a and 320b, the USB-Type-A receptacle connector 320c and 320d, a USB-Type-B receptacle connector 320e, a power supply connector 320f, and a drawer kick (DK) receptacle connector 320g, which are mounted on the mounting surface 301 of the substrate 300, are formed on the first connector surface 221 and the second connector surface 222. The opening 220g may correspond to a local area network (LAN) receptacle connector.

The USB-Type-C receptacle connector 320a is electrically coupled to the external device 10a and can cause the external device 10a to communicate with the control section 30. Further, the USB-Type-C receptacle connector 320a is provided on the substrate 300, and the USB-Type-C receptacle connector 320a is mounted on the substrate 300 such that the outer circumference of the insertion port coincides with the inner circumference of the opening 220a. Accordingly, the concern that foreign matter such as dust and insects will enter the inside of the connector section 220 is reduced. The insertion port of the USB-Type-C receptacle connector 320a is arranged along the first connector surface 221.

The USB-Type-C receptacle connector 320b is electrically coupled to the external device 10b and can cause the external device 10b to communicate with the control section 30. Further, the USB-Type-C receptacle connector 320b is provided on the substrate 300, and the USB-Type-C receptacle connector 320b is mounted on the substrate 300 such that the outer circumference of the insertion port coincides with the inner circumference of the opening 220b. Accordingly, the concern that foreign matter such as dust and insects will enter the inside of the connector section 220 is reduced. The insertion port of the USB-Type-C receptacle connector 320b is arranged along the first connector surface 221. Further, the USB-Type-C receptacle connector 320b and the USB-Type-C receptacle connector 320a are arranged next to each other.

The USB-Type-C receptacle connectors 320a and 320b are provided with CC terminals, and unlike other USB standards, the master and the slave are not clearly fixed between the printing apparatus 2 and the external device 10a and 10b coupled to the printing apparatus 2. In other words, the printing apparatus 2 may receive a command from the external devices 10a and 10b to be operated, or may give a command to the external devices 10a and 10b to operate the external devices 10a and 10b. For example, the printing apparatus 2 may supply electric power to the external devices 10a and 10b. As described above, in the USB-Type-C standard, there is a possibility that the printing apparatus 2 may operate on either the master or the slave, and there is a possibility that the printing apparatus 2 operate as a master and a slave at the same time by providing a plurality of USB-Type-C receptacle connectors 320a and 320b, and thus the convenience of the user who uses the printing apparatus 2 is improved.

The USB-Type-A receptacle connector 320c is electrically coupled to the external device 10c and can cause the external device 10c to communicate with the control section 30. Further, the USB-Type-A receptacle connector 320c is provided on the substrate 300, and the USB-Type-A receptacle connector 320c is mounted on the substrate 300 such that the outer circumference of the insertion port coincides with the inner circumference of the opening 220c. Accordingly, the concern that foreign matter such as dust and insects will enter the inside of the connector section 220 is reduced. The insertion port of the USB-Type-A receptacle connector 320c is arranged along the first connector surface 221.

The USB-Type-A receptacle connector 320d is electrically coupled to the external device 10d and can cause the external device 10d to communicate with the control section 30. Further, the USB-Type-A receptacle connector 320d is provided on the substrate 300, and the USB-Type-A receptacle connector 320d is mounted on the substrate 300 such that the outer circumference of the insertion port coincides with the inner circumference of the opening 220d. Accordingly, the concern that foreign matter such as dust and insects will enter the inside of the connector section 220 is reduced. The insertion port of the USB-Type-A receptacle connector 320d is arranged along the first connector surface 221.

The USB-Type-B receptacle connector 320e is electrically coupled to the external device 10e and can cause the external device 10e to communicate with the control section 30. Further, the USB-Type-B receptacle connector 320e is provided on the substrate 300, and the USB-Type-B receptacle connector 320e is mounted on the substrate 300 such that the outer circumference of the insertion port coincides with the inner circumference of the opening 220e. Accordingly, the concern that foreign matter such as dust and insects will enter the inside of the connector section 220 is reduced. The insertion port of the USB-Type-B receptacle connector 320e is arranged along the second connector surface 222 which is different from the first connector surface 221.

The power supply connector 320f is coupled to a commercial AC power source (not illustrated) to supply electric power to the control section 30. Further, the power supply connector 320f is provided on the substrate 300, and the power supply connector 320f is mounted on the substrate 300 such that the outer circumference of the insertion port coincides with the inner circumference of the opening 220f. Accordingly, the concern that foreign matter such as dust and insects will enter the inside of the connector section 220 can be reduced. The insertion port of the power supply connector 320f is arranged along the second connector surface 222 which is different from the first connector surface 221.

The DK receptacle connector 320g is, for example, electrically coupled to a cash drawer 270 and causes the cash drawer 270 to communicate with the control section 30. Further, the DK receptacle connector 320g is provided on the substrate 300, and the DK receptacle connector 320g is mounted on the substrate 300 such that the outer circumference of the insertion port coincides with the inner circumference of the opening 220g. Accordingly, the concern that foreign matter such as dust and insects will enter the inside of the connector section 220 can be reduced. The insertion port of the DK receptacle connector 320g is arranged along the second connector surface 222 which is different from the first connector surface 221.

The inner circumferences of the openings 220a and 220b, the openings 220c and 220d, the openings 220e, the openings 220f, and the opening 220g are respectively designed to coincide with outer circumferences of the USB-Type-C receptacle connectors 320a and 320b, the USB-Type-A receptacle connectors 320c and 320d, the USB-Type-B receptacle connector 320e, the power supply connector 320f, and the DK receptacle connector 320g. Therefore, the outer circumference of the insertion port and the inner circumference of the opening coincide with each other, respectively. However, when an error occurs due to manufacturing, the inner circumferences of each opening and the outer circumferences of the connectors corresponding to the openings will substantially coincide with each other, but since it is not an error due to the design, the above-mentioned substantial coincidence will be included in the coincidence.

The opening 220a formed on the first connector surface 221 corresponds to the USB-Type-C receptacle connector 320a, the opening 220b formed on the first connector surface 221 corresponds to the USB-Type-C receptacle connector 320b, the opening 220c formed on the first connector surface 221 corresponds to the USB-Type-A receptacle connector 320c, and the opening 220d formed on the first connector surface 221 corresponds to the USB-Type-A receptacle connector 320d.

The opening 220e formed on the second connector surface 222 corresponds to the USB-Type-B receptacle connector 320e, the opening 220f formed on the second connector surface 222 corresponds to the power supply connector 320f, and the opening 220g formed on the second connector surface 222 corresponds to the DK receptacle connector 320g.

Further, the connector section 220 is provided on the first main body frame surface 205 inside the third case surface 200c constituting the bottom surface of the main body case 200. On the other hand, the medium discharge port 13 is provided on the first case surface 200a constituting the upper surface of the main body case 200. As described above, since the connector section 220 is provided inside the bottom cover 241 constituting the bottom surface of the main body case 200, which is the surface opposite to the upper surface of the main body case 200 in which the medium discharge port 13 is provided, the user cannot be visually recognized the medium P discharged upward from the medium storage section of the main body case 200 and the connector section 220 at the same time. In other words, the user cannot visually recognize the medium discharge port 13 and the connector section 220 at the same time.

In other words, in a state where the user can visually recognize the medium discharge port 13, the user cannot visually recognize the USB-Type-C receptacle connector 320a and 320b, the USB-Type-A receptacle connector 320c and 320d, the USB-Type-B receptacle connector 320e, the power supply connector 320f, and the DK receptacle connector 320g. In other words, the user cannot visually recognize the medium discharge port 13 and the first connector surface 221 and the second connector surface 222 at the same time.

When the normal printing apparatus 2 is used, the first main body frame surface 205 is often covered with the bottom cover 241, the connector section 220 is not exposed to the outside, and the user cannot visually recognize the connector section 220. However, when the bottom cover 241 is removed from the main body case 200, the connector section 220 is exposed to the outside, and the user can visually recognize the connector section 220.

1-5. Countermeasures Against Incorrect Insertion

Figure 18:
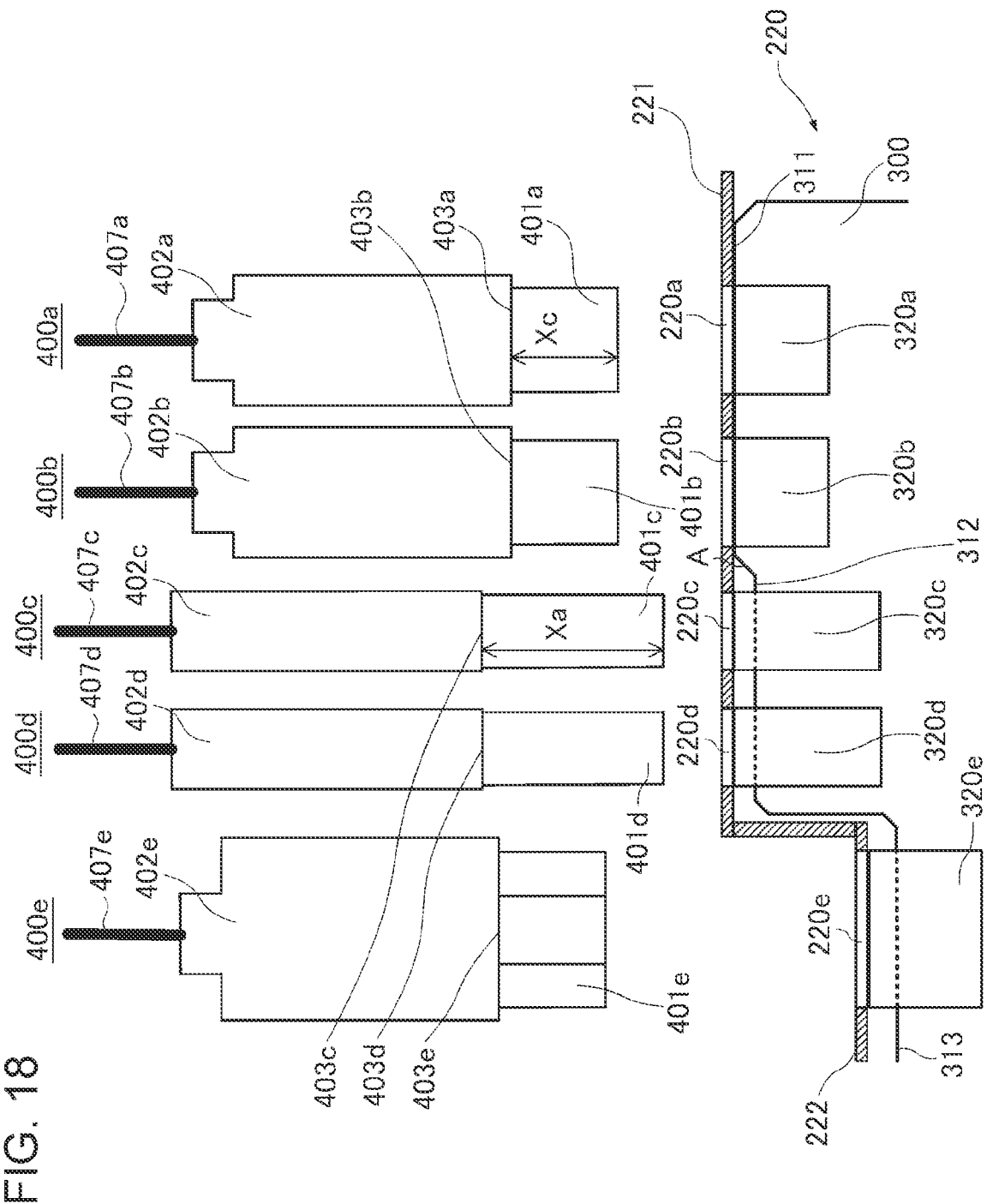
FIG. 18 is a view illustrating a USB-Type-A cable, a USB-Type-B cable, a USB-Type-C cable, and a connector section.

When the user uses, for example, a USB-Type-C cable 400a illustrated in FIG. 18 and couples the external device 10a to the printing apparatus 2, the user removes the bottom cover 241, and while visually recognizing the first connector surface 221 and the second connector surface 222, by inserting a plug 401a of the USB-Type-C cable 400a into the opening 220a of the first connector surface 221, the printing apparatus 2 is coupled to the external device 10a.

Specifically, the user puts the printing apparatus 2 in the second posture in which the first case surface 200a is the front surface of the main body case 200, then rotates the printing apparatus 2 to make the third case surface 200c face the user. Then, the user removes the cover of the printing apparatus 2, exposes the connector section 220, and couples the USB-Type-C cable 400a to the printing apparatus 2. In such a case, since the connector section 220 faces the routing section 215, the connector section 220 faces a direction orthogonal to the line of sight of the user, and it is difficult for the user to visually recognize the opening 220a of the first connector surface 221. As a result, the user inserts the cable into another opening, causing erroneous insertion.

Further, the user may couple the USB-Type-C cable 400b illustrated in FIG. 18 to the connector section 220 with the second case surface 200b of the printing apparatus 2 facing the user. In such a case, for example, another external device 10b may be newly coupled when the printing apparatus 2 is being used after the installation and initial setting of the printing apparatus 2 are completed.

In this case, the second case surface 200b of the printing apparatus 2 faces the user, and the user cannot visually recognize the first connector surface 221 and the second connector surface 222. Therefore, the user confirms the position of each connector while touching the first connector surface 221 and the second connector surface 222 by hand. In other words, the user couples each cable to the connector section 220 in a so-called fumbling state without visually observing the connector section 220. As a result, the user inserts the cable into another opening, causing erroneous insertion.

Since the connector section 220 has the first connector surface 221 and the second connector surface 222 different from the first connector surface 221, which are parallel to each other, even in a state where it is difficult for the user to visually recognize or in a fumbling state, the user can recognize the first connector surface 221 and the second connector surface 222 as different surfaces.

FIG. 13 is a plan view of the first connector surface 221 and the second connector surface 222 of the connector section 220. With reference to FIG. 13, the erroneous insertion that may occur when coupling each cable to the connector section 220 in a state where it is difficult for the user to visually recognize or in a fumbling state, and countermeasures thereof will be described.

The plugs 401a and 401b of the USB-Type-C cables 400a and 400b can be inserted into the USB-Type-C receptacle connectors 320a and 320b, whereby the printing apparatus 2 is coupled to cause the external devices 10a and 10b to communicate with each other.

Further, the plugs 401a and 401b of the USB-Type-C cables 400a and 400b can be inserted into the USB-Type-A receptacle connectors 320c and 320d, but the printing apparatus 2 cannot cause the external devices 10a and 10b to communicate with each other. In other words, the shapes of the plugs 401a and 401b of the USB-Type-C cables 400a and 400b are different from the shapes of the USB-Type-A receptacle connectors 320c and 320d, but the printing apparatus 2 can be physically coupled to the external devices 10a and 10b by using the USB-Type-C cables 400a and 400b. However, the printing apparatus 2 and the external devices 10a and 10b are not coupled to communicate with each other.

Further, the plugs 401a and 401b of the USB-Type-C cables 400a and 400b can be inserted into the USB-Type-B receptacle connector 320e, but the printing apparatus 2 cannot cause the external device 10a or the external device 10b to communicate with each other. In other words, the printing apparatus 2 can be physically coupled to the external device 10a or the external device 10b by using the USB-Type-C cables 400a and 400b, but the external devices 10a and 10b are not coupled to communicate with the printing apparatus 2.

As described above, since the shapes of the insertion ports are different, a state of being physically coupled and fixed is a state where the plugs 401a and 401b of the USB-Type-C cables 400a and 400b are erroneously inserted into the connector section 220. Such erroneous insertion may occur, for example, in the USB-Type-A receptacle connectors 320c and 320d, the USB-Type-B receptacle connector 320e, and the DK receptacle connector 320g.

When an erroneous insertion occurs, there is a concern about malfunction of the physically coupled external device, and failure or damage of the physically coupled external device. Similarly, there is a concern about malfunction, failure, and damage of the printing apparatus 2 to which these external devices are physically coupled. Furthermore, since there is a concern about damage to the receptacle connector into which the plugs 401a and 401b of the USB-Type-C cables 400a and 400b are erroneously inserted, the countermeasures described below will be taken.

Further, it is considered that there is a high possibility of occurrence of such an erroneous insertion in a receptacle connector larger than the insertion port of the USB-Type-C receptacle connectors 320a and 320b. Although depending on the shape of the insertion port of the receptacle connector, the larger the insertion port, the higher the concern about erroneous insertion.

The insertion port of the USB-Type-B receptacle connector 320e is smaller than the insertion port of the DK receptacle connector 320g. In addition, the insertion ports of the USB-Type-A receptacle connectors 320c and 320d are smaller than the insertion port of the DK receptacle connector 320g.

In other words, since the insertion port of the USB-Type-B receptacle connector 320e is smaller than the insertion port of the DK receptacle connector 320g, the concern about erroneous insertion into the USB-Type-B receptacle connector 320e is relatively smaller than the concern in the DK receptacle connector 320g.

Further, since the insertion ports of the USB-Type-A receptacle connectors 320c and 320d are smaller than the insertion port of the DK receptacle connector 320g or the USB-Type-B receptacle connector 320e, the concern about erroneous insertion into the USB-Type-A receptacle connector 320c and 320d is relatively smaller than the concern in the DK receptacle connector 320g or the USB-Type-B receptacle connector 320e.

The USB-Type-B receptacle connector 320e is arranged between the USB-Type-C receptacle connectors 320a and 320b and the DK receptacle connector 320g.

The concern about erroneous insertion into the USB-Type-B receptacle connector 320e is smaller than the concern about erroneous insertion into the DK receptacle connector 320g. In this manner, by arranging the USB-Type-B receptacle connector 320e with less concern about erroneous insertion between the USB-Type-C receptacle connectors 320a and 320b and the DK receptacle connector 320g, the concern about erroneous insertion into the DK receptacle connector 320g is reduced.

In addition, the USB-Type-A receptacle connectors 320c and 320d are arranged between the USB-Type-C receptacle connectors 320a and 320b and the DK receptacle connector 320g.

The concern about erroneous insertion into the USB-Type-A receptacle connectors 320c and 320d is smaller than the concern about erroneous insertion into the DK receptacle connector 320g. In this manner, by arranging the USB-Type-A receptacle connectors 320c and 320d with less concern about erroneous insertion between the USB-Type-C receptacle connectors 320a and 320b and the DK receptacle connector 320g, the concern about erroneous insertion into the DK receptacle connector 320g is reduced.

In addition, the USB-Type-A receptacle connectors 320c and 320d are arranged between the USB-Type-C receptacle connectors 320a and 320b and the USB-Type-B receptacle connector 320e.

The concern about erroneous insertion into the USB-Type-A receptacle connectors 320c and 320d is smaller than the concern about erroneous insertion into the USB-Type-B receptacle connector 320e. In this manner, by arranging the USB-Type-A receptacle connectors 320c and 320d with less concern about erroneous insertion between the USB-Type-C receptacle connectors 320a and 320b and the USB-Type-B receptacle connector 320e, the concern about erroneous insertion into the USB-Type-B receptacle connector 320e is reduced.

In other words, by arranging a receptacle connector with less concern about erroneous insertion between the USB-Type-C receptacle connectors 320a and 320b and the receptacle connector with a concern about erroneous insertion of the plugs 401a and 401b of the USB-Type-C cables 400a and 400b, it is possible to reduce the concern of erroneous insertion of the plugs 401a and 401b of the USB-Type-C cables 400a and 400b by the user.

Furthermore, it is preferable to arrange the power supply connector 320f which cannot be erroneously inserted, between the USB-Type-C receptacle connectors 320a and 320b and the receptacle connector with a concern about erroneous insertion of the plugs 401a and 401b of the USB-Type-C cables 400a and 400b.

Further, the long side X of the insertion port of the USB-Type-C receptacle connectors 320a and 320b and the long side Y of the insertion port of the USB-Type-A receptacle connectors 320c and 320d have different directions from each other. In other words, the extending direction of the long side X of the USB-Type-C receptacle connectors 320a and 320b is different from the extending direction of the long side Y of the USB-Type-A receptacle connectors 320c and 320d. When the extending direction of the long side X of the USB-Type-C receptacle connectors 320a and 320b is the same as the extending direction of the long side Y of the USB-Type-A receptacle connectors 320c and 320d, since the long side Y is longer than the long side X and the short side y is longer than the short side x, the plugs 401a and 401b of the USB-Type-C cables 400a and 400b can be inserted into the USB-Type-A receptacle connectors 320c and 320d, and there is a high concern about erroneous insertion. The long side X forming the insertion port of the USB-Type-C receptacle connectors 320a and 320b is a side extending in a direction parallel to the mounting surface 301 of the substrate 300, and the short side x is an arcuate side extending in the direction intersecting with the long side X.

The extending direction of the long side X of the USB-Type-C receptacle connectors 320a and 320b is different from the extending direction of the long side Y of the USB-Type-A receptacle connectors 320c and 320d, and accordingly, the concern about erroneous insertion is reduced. However, since there is a concern that the connector section 220 becomes large, it is desirable that the short side y of the USB-Type-A receptacle connectors 320c and 320d be arranged on the mounting surface 301 of the substrate 300, and the extending direction of the long side X of the USB-Type-C receptacle connectors 320a and 320b and the extending direction of the long side Y of the USB-Type-A receptacle connectors 320c and 320d be orthogonal to each other. In addition, a relationship in which the extending direction of the long side X of the USB-Type-C receptacle connectors 320a and 320b and the extending direction of the long side Y of the USB-Type-A receptacle connectors 320c and 320d intersect with each other may be employed.

In other words, it is desirable that the extending direction of the short side x of the USB-Type-C receptacle connectors 320a and 320b and the extending direction of the short side y of the USB-Type-A receptacle connectors 320c and 320d be orthogonal to each other or intersect with each other. Accordingly, the concern about erroneous insertion is greatly reduced.

The short side y of the USB-Type-A receptacle connectors 320c and 320d is shorter than the long side X of the USB-Type-C receptacle connectors 320a and 320b. Therefore, when the plugs 401a and 401b of the USB-Type-C cables 400a and 400b are at an angle that can be inserted into the USB-Type-C receptacle connectors 320a and 320b, that is, in a state where the longitudinal direction of the plugs 401a and 401b is parallel to the substrate 300, the concern about erroneous insertion into the USB-Type-A receptacle connectors 320c and 320d is extremely small.

Further, compared to a case where the USB-Type-C receptacle connectors 320a and 320b are mounted on the substrate 300 such that the long side X is in contact with the mounting surface 301 and mounted on the substrate 300 such that the short side x is in contact with the mounting surface 301, the USB-Type-C receptacle connectors 320a and 320b have a larger area in contact with the mounting surface 301 of the substrate 300. Therefore, the USB-Type-C receptacle connectors 320a and 320b are firmly fixed to the substrate 300. Therefore, the strength of the USB-Type-C receptacle connectors 320a and 320b against prying is increased.

In the connector section 220 illustrated in FIG. 13, the USB-Type-C receptacle connectors 320a and 320b are arranged, as it is said, to be horizontally placed with respect to the mounting surface 301, and the USB-Type-A receptacle connectors 320c and 320d are arranged, as it is said, to be vertically placed with respect to the mounting surface 301.

By arranging the connectors to be horizontally placed, the USB-Type-C receptacle connectors 320a and 320b are firmly fixed to the substrate 300 as described above. Further, by arranging the connectors to be vertically placed, the USB-Type-A receptacle connectors 320c and 320d can narrow the distance between the respective receptacle connectors as described above, such that the connector section 220 can be downsized.

On the contrary, plugs 401c and 401d of USB-Type-A cables 400c and 400d and a plug 401e of a USB-Type-B cable 400e are larger than the insertion ports of the USB-Type-C receptacle connectors 320a and 320b. Therefore, the plugs 401c and 401d of the USB-Type-A cables 400c and 400d and the plug 401e of the USB-Type-B cable 400e cannot be physically inserted into the USB-Type-C receptacle connectors 320a and 320b.

In view of these, as illustrated in FIG. 13, among the plurality of receptacle connectors provided in the connector section 220, it is preferable that the USB-Type-C receptacle connectors 320a and 320b having a small insertion port be arranged at the end portion Z of the plurality of connectors provided in the connector section 220. In other words, by arranging the USB-Type-C receptacle connectors 320a and 320b corresponding to the plugs 401a and 401b of the USB-Type-C cables 400a and 400b with a concern about erroneous insertion into a plurality of other receptacle connectors at the end portion Z of the first connector surface 221, even in a state where it is difficult for the user to visually recognize or in a fumbling state, the user can correctly recognize the positions of the USB-Type-C receptacle connectors 320a and 320b, and the concern about erroneous insertion is reduced. The end portion Z is an end portion in the −Y direction in the present embodiment.

The insertion port of the power supply connector 320f is circular, and the USB-Type-C receptacle connectors 320a and 320b, the USB-Type-A receptacle connectors 320c and 320d, the USB-Type-B receptacle connector 320e, and the DK receptacle connector 320g are rectangular. Here, it is assumed that the power supply connector 320f is circular, while the other receptacle connectors are rectangular because the others have corners.

Since the insertion port of the power supply connector 320f is circular, even in a state where it is difficult for the user to visually recognize or in a fumbling state, the user can correctly recognize the position of the power supply connector 320f. Further, since the shape of the unevenness of the insertion port of the power supply connector 320f is different from that of other receptacle connectors, the user can easily recognize the power supply connector 320f. In other words, even in a state where it is difficult to visually recognize or in a fumbling state, the user can correctly recognize the position of the power supply connector 320f, such that it becomes easy to recognize the position of each receptacle connector.

Further, the insertion port of the power supply connector 320f has a structure in which a plurality of recess portions for inserting the pins are provided according to the plurality of pins of the power cable 5, and the recess portions are sufficiently small, and thus each cable cannot be inserted into the insertion port of the power supply connector 320f. Therefore, even when each cable is inserted at the position of the power supply connector 320f by mistake, each cable is not inserted, and thus the user can recognize erroneous insertion.

A circular connector is not arranged on the first connector surface 221 and a rectangular connector is arranged on the second connector surface 222. The circular power supply connector 320f is arranged not on the first connector surface 221, but on the second connector surface 222. The rectangular USB-Type-C receptacle connectors 320a and 320b and the USB-Type-A receptacle connectors 320c and 320d are arranged on the first connector surface 221. By providing the power supply connector 320f that is easy for the user to recognize on the second connector surface 222, even in a state where it is difficult to visually recognize or in a fumbling state, the first connector surface 221 provided with the USB-Type-C receptacle connectors 320a and 320b can be recognized. Therefore, the concern about erroneous insertion is reduced.

For example, when the power supply connector 320f is arranged between the USB-Type-C receptacle connectors 320a and 320b and the DK receptacle connector 320g, the user can correctly recognize the position of the power supply connector 320f, and thus the concern about erroneous insertion into the DK receptacle connector 320g is reduced.

Figure 14:
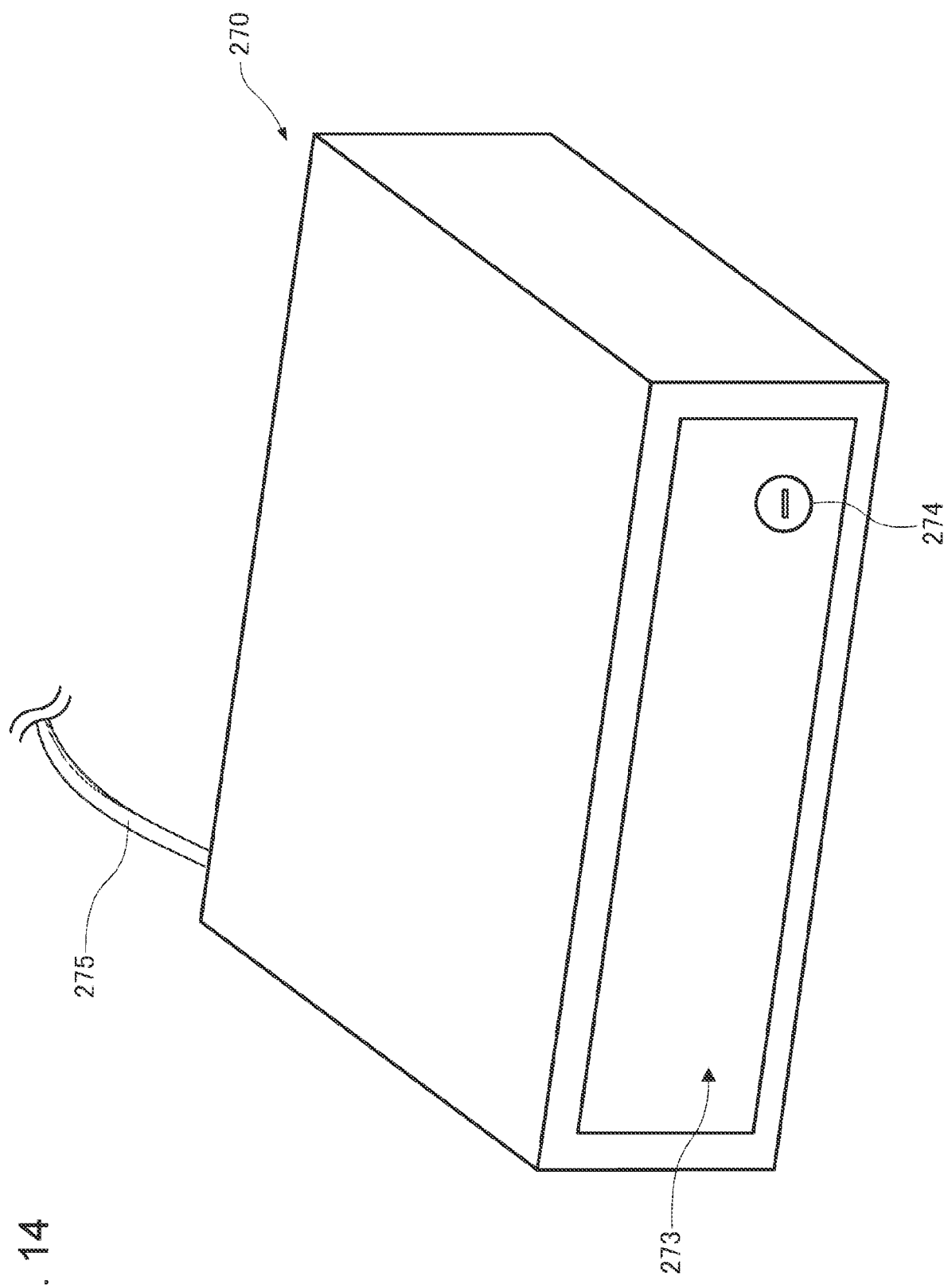
FIG. 14 is a perspective view of a cash drawer with a drawer tray closed.
Figure 15:
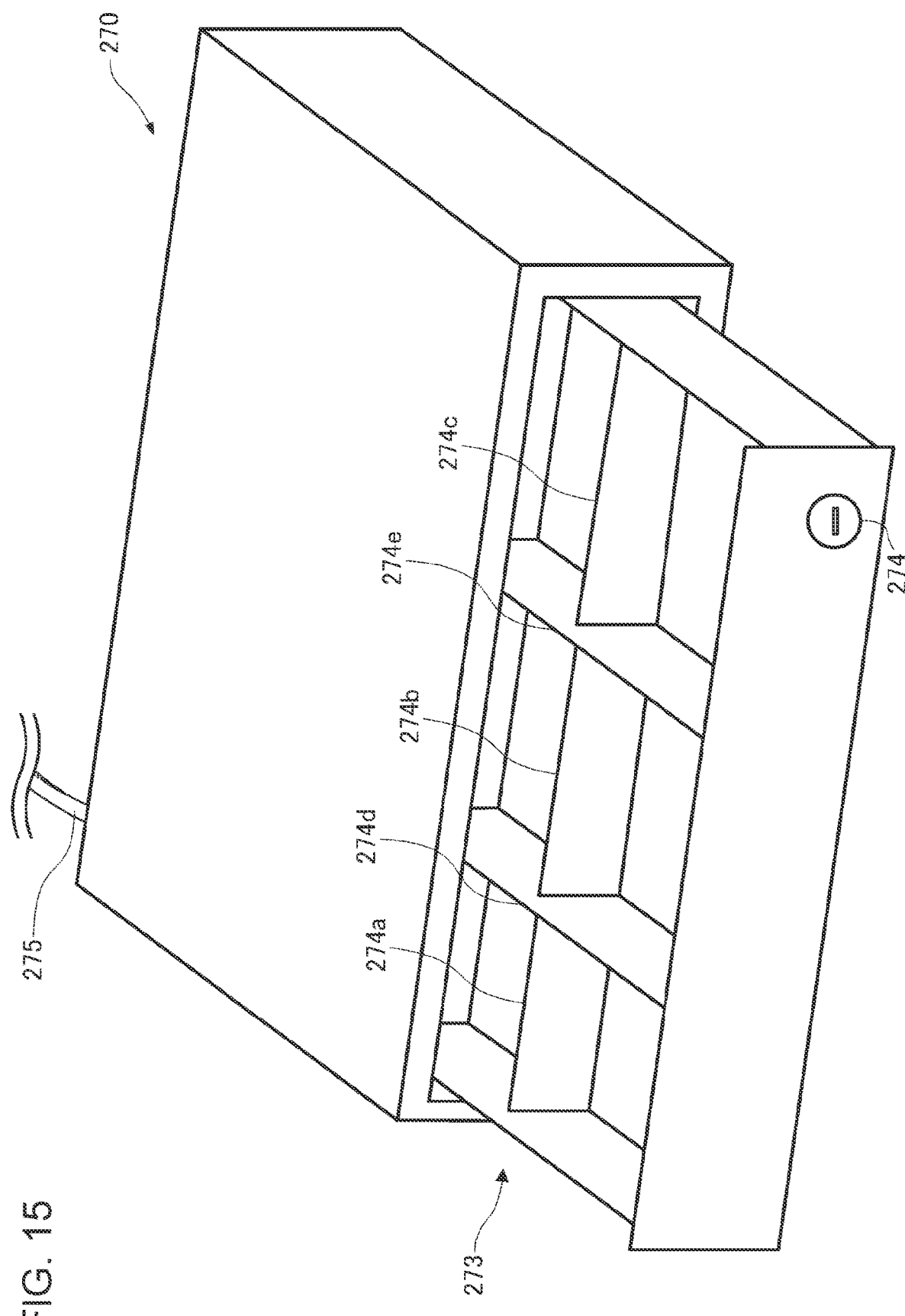
FIG. 15 is a perspective view of the cash drawer with the drawer tray opened.
Figure 16:
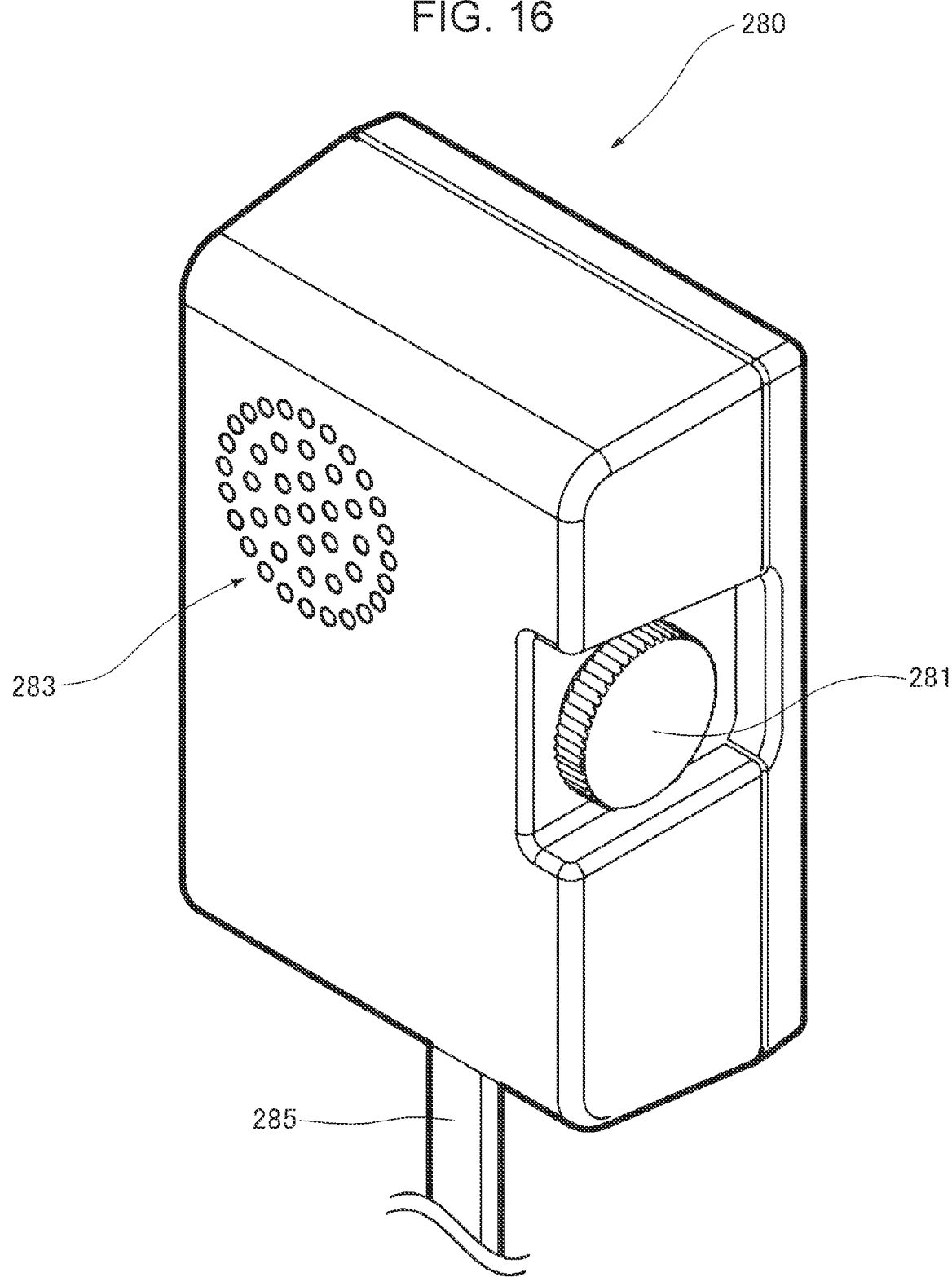
FIG. 16 is a perspective view of a buzzer.

FIGS. 14 and 15 are perspective views of the cash drawer 270. FIG. 14 is a perspective view of a drawer tray 273 of the cash drawer 270 in a closed state, and FIG. 15 is a perspective view of the drawer tray 273 of the cash drawer 270 in an open state. Further, FIG. 16 is a perspective view of a buzzer 280.

As illustrated in FIGS. 14 and 15, the cash drawer 270 includes a drawer tray 273 and a drawer kick cable 275. The drawer tray 273 is attached to the cash drawer 270 to be openable/closable. Cash and the like are stored in the drawer tray 273. Further, the inside of the drawer tray 273 is divided by the partition plates 274a, 274b, 274c, 274d, and 274e. For example, the partition plates 274a, 274b, 274c, 274d, and 274e may be removable. In this case, the internal division of the drawer tray 273 can be changed.

The drawer kick cable 275 is coupled to the DK receptacle connector 320g of the connector section 220. In other words, the cash drawer 270 is electrically coupled to the printing apparatus 2 via the drawer kick cable 275, and the cash drawer 270 can communicate with the control section 30 of the printing apparatus 2.

The cash drawer 270 coupled to the printing apparatus 2 is controlled by the printing apparatus 2. The printing apparatus 2 can control operations such as opening/closing and locking of the drawer tray 273. On the other hand, the user may be configured to close the drawer tray 273, operate a keyhole 274, and manually lock the drawer tray 273.

Further, the buzzer 280 illustrated in FIG. 16 can be coupled to the DK receptacle connector 320g of the connector section 220. The buzzer 280 includes a volume control knob 281, a speaker 283, and a drawer kick cable 285.

The buzzer 280 is electrically coupled to the printing apparatus 2 via the drawer kick cable 285, and the buzzer 280 can communicate with the control section 30 of the printing apparatus 2. Accordingly, for example, a sound is output from the speaker 283 at the time of printing by the printing apparatus 2, and the user can be notified that printing is in progress. The volume of the speaker 283 can be adjusted by the volume control knob 281. For example, the user can operate the volume control knob 281 to set an appropriate volume according to the surrounding environment. Further, the buzzer 280 may be set to play a melody as well as a buzzer sound.

Further, the DK receptacle connector 320g of the connector section 220 can be replaced with a LAN receptacle connector. In this case, a LAN cable can be coupled to the LAN receptacle connector, and the printing apparatus 2 can be coupled to a network device such as a network hub or a router. The DK receptacle connector 320g is an example of the LAN or DK receptacle connectors.

1-6. Substrate

Figure 17:
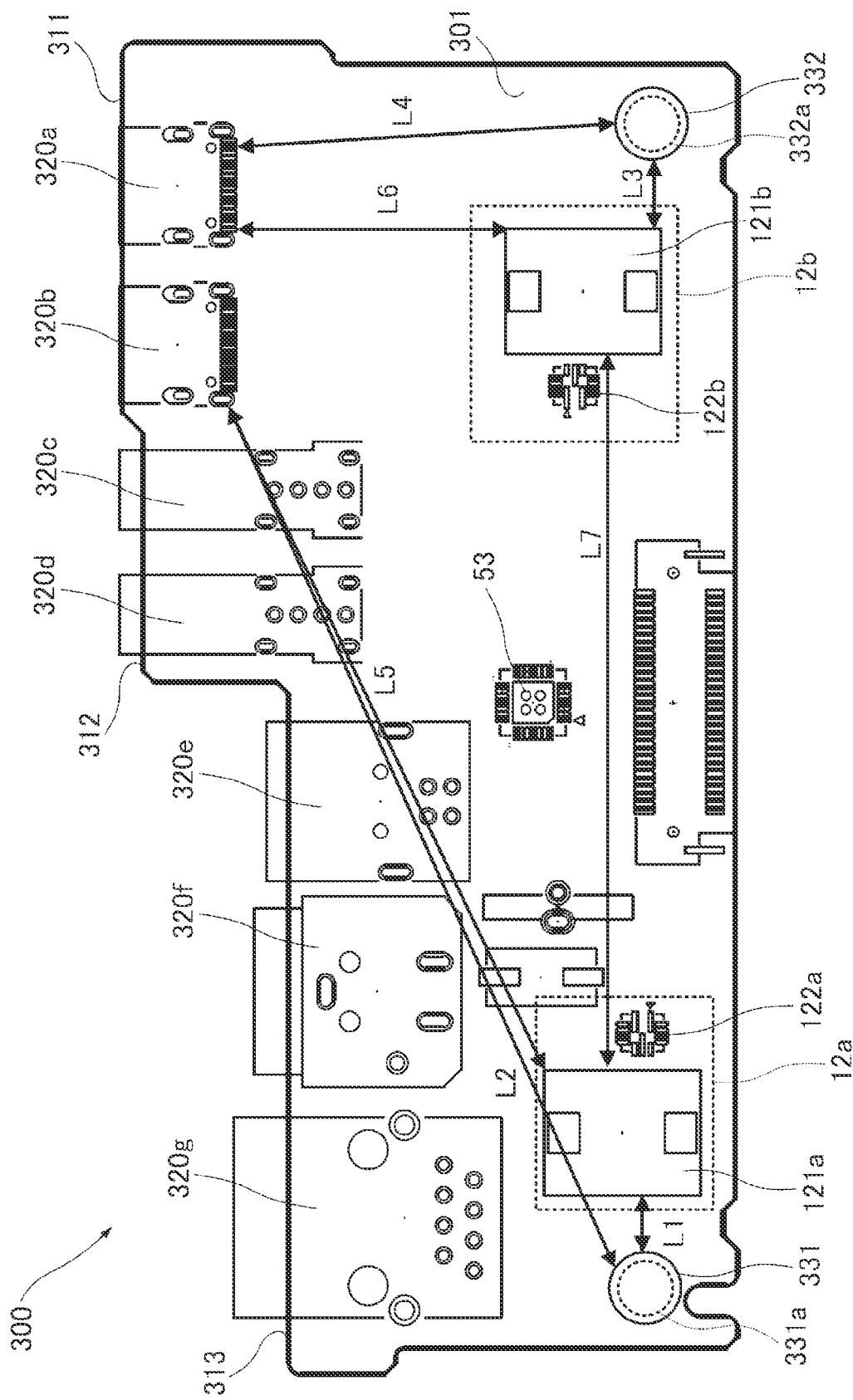
FIG. 17 is a schematic view of a substrate accommodated in a connector section.

The substrate 300 will be described with reference to FIG. 17. FIG. 17 is a view illustrating the substrate 300.

The substrate 300 includes the USB-Type-C receptacle connector 320a and 320b, the USB-Type-A receptacle connector 320c and 320d, the USB-Type-B receptacle connector 320e, the power supply connector 320f, the DK receptacle connector 320g, the first power supply circuit 12a, the second power supply circuit 12b, a first locking member 331, and a second locking member 332.

Further, the substrate 300 has a first side 311, a second side 312, and a third side 313 facing the inner surfaces of the first connector surface 221 and the second connector surface 222 of the connector section 220. Specifically, the substrate 300 faces the inner surfaces of the first connector surface 221 and the second connector surface 222, and the inner surfaces of the first connector surface 221 and the second connector surface 222 are orthogonal to the substrate 300.

The USB-Type-C receptacle connectors 320a and 320b are provided along the first side 311 of the substrate 300.

Further, the USB-Type-C receptacle connectors 320a and 320b can be coupled to the plugs 401a and 401b of the USB-Type-C cables 400a and 400b via the openings 220a and 220b provided on the first connector surface 221 of the connector section 220.

The USB-Type-A receptacle connectors 320c and 320d are provided along the second side 312 of the substrate 300. Further, the USB-Type-A receptacle connectors 320c and 320d can be coupled to the plugs 401c and 401d of the USB-Type-A cables 400c and 400d via the openings 220c and 220d provided on the first connector surface 221 of the connector section 220.

The USB-Type-B receptacle connector 320e is provided along the third side 313 of the substrate 300.

Further, the USB-Type-B receptacle connector 320e can be coupled to the plug 401e of the USB-Type-B cable 400e via the opening 220e provided on the second connector surface 222 of the connector section 220.

The power supply connector 320f is provided along the third side 313 of the substrate 300. Further, the power supply connector 320f can be coupled to the power cable 5 via the opening 220f provided on the second connector surface 222 of the connector section 220. In other words, the power supply connector 320f is a connector that supplies electric power to the control section 30 of the printing apparatus 2.

The DK receptacle connector 320g is provided along the third side 313 of the substrate 300. Further, the DK receptacle connector 320g can be coupled to the drawer kick cable 275 and 285 via the opening 220g provided on the second connector surface 222 of the connector section 220.

The first power supply circuit 12a includes a first coil 121a and a first integrated circuit 122a. The first integrated circuit 122a includes, for example, a DC-DC converter, a resistance element, a switching element, a transistor, and the like.

The first power supply circuit 12a converts the electric power supplied from the power supply connector 320f into appropriate electric power, and supplies electric power to the USB-Type-A receptacle connectors 320c and 320d, the USB-Type-B receptacle connector 320e, and the USB-Type-C receptacle connector 320b. In other words, the first coil 121a supplies the first electric power to the USB-Type-A receptacle connectors 320c and 320d, the USB-Type-B receptacle connector 320e, and the USB-Type-C receptacle connector 320b. The first electric power is, for example, a constant electric power and a 5 V voltage electric power. The second power supply circuit 12b includes a second coil 121b and a second integrated circuit 122b. The second integrated circuit 122b includes, for example, a DC-DC converter, a resistance element, a switching element, a transistor, and the like.

The second power supply circuit 12b converts the electric power supplied from the power supply connector 320f into appropriate electric power, and supplies the electric power to the USB-Type-C receptacle connector 320a. In other words, the second coil 121b supplies the USB-Type-C receptacle connector 320a with second electric power equal to or higher than the first electric power. The second electric power is, for example, variable power and is electric power having a voltage of 5 V, 9 V, or 12 V.

As described above, the USB hub 53 operates between the USB controller 34 and the USB interface 60, and is arranged between the first power supply circuit 12a and the second power supply circuit 12b on the substrate 300. In other words, the USB hub 53 is arranged between the first coil 121a and the second coil 121b. In other words, the USB hub 53 is arranged between the first power supply circuit 12a having a large heat generation amount and the second power supply circuit 12b. In other words, the USB hub 53 is arranged in the substrate 300 at a position where the influence of heat generation of the first power supply circuit 12a and the second power supply circuit 12b is small.

Further, the USB hub 53 controls the USB-Type-C receptacle connector 320b and the USB-Type-A receptacle connectors 320c and 320d according to the instruction of the USB controller 34. Further, the USB hub 53 serves as a line concentrator and a relay device for the USB-Type-C receptacle connector 320b and the USB-Type-A receptacle connectors 320c and 320d.

The first locking member 331 and the second locking member 332 are members for fixing the substrate 300 to the main body frame 208 inside the main body case 200. The first locking member 331 and the second locking member 332 engage with the engaged section of the main body frame 208 (not illustrated) through the holes 331a and 332a provided on the substrate 300. As a result, the connector section 220 accommodating the substrate 300 is fixed to the main body frame 208. For example, the first locking member 331 and the second locking member 332 are metal screws, and the substrate 300 is screwed to the main body frame 208.

It is preferable that the holes 331a and 332a be provided in the vicinity of the first coil 121a and the second coil 121b, respectively. The substrate 300 screwed to the main body frame 208 dissipates heat to the main body frame 208 via the screws which are the first locking member 331 and the second locking member 332, and heat is also dissipated from the screw head of the screws which are the first locking member 331 and the second locking member 332. Therefore, the first locking member 331 and the second locking member 332 are preferably screws having a large screw head. For example, it is preferable that the first locking member 331 and the second locking member 332 be round screws rather than so-called countersunk head screws.

Among the components mounted on the mounting surface 301 of the substrate 300, the heat generation amount of the first coil 121a and the second coil 121b is large, and thus it is preferable that the substrate 300 be screwed to the main body frame 208 in the vicinity of the first coil 121a and the second coil 121b. Further, since the substrate 300 is fixed to the metal main body frame 208 by the metal screws which are the first locking member 331 and the second locking member 332, there is an effect of eliminating static electricity charged on the substrate 300 and further, there is also an effect of fixing the potential of the substrate 300.

With reference to FIG. 17, the positional relationship of the components mounted on the substrate 300 will be described.

In the description, the distances L1 to L7 are defined as follows. Unless otherwise specified, the distances L1 to L7 are the shortest distances between members, respectively. The distance L1 is a distance from the first locking member 331 to the first coil 121a. A distance L2 is a distance from the first locking member 331 to the USB-Type-C receptacle connector 320b. A distance L3 is a distance from the second locking member 332 to the second coil 121b. A distance L4 is a distance from the second locking member 332 to the USB-Type-C receptacle connector 320a. A distance L5 is a distance from the first coil 121a to the USB-Type-C receptacle connector 320b. A distance L6 is a distance from the second coil 121b to the USB-Type-C receptacle connector 320a. The distance L7 is a distance from the first coil 121a to the second coil 121b.

The distance L1 from the first locking member 331 to the first coil 121a is shorter than the distance L2 from the first locking member 331 to the USB-Type-C receptacle connector 320b. The heat generation amount of the first coil 121a is larger than the heat generation amount of the USB-Type-C receptacle connector 320b. Therefore, by arranging the first coil 121a at a position closer to the first locking member 331 than the USB-Type-C receptacle connector 320b, there is an effect of heat dissipation of the substrate 300.

The distance L3 from the second locking member 332 to the second coil 121b is shorter than the distance L4 from the second locking member 332 to the USB-Type-C receptacle connector 320a. The heat generation amount of the second coil 121b is larger than the heat generation amount of the USB-Type-C receptacle connector 320a. Therefore, by arranging the second coil 121b at a position closer to the second locking member 332 than the USB-Type-C receptacle connector 320a, there is an effect of heat dissipation of the substrate 300.

The distance L1 is shorter than the distance L5 from the first coil 121a to the USB-Type-C receptacle connector 320b. As a result, the first locking member 331 dissipates more heat generated by the first coil 121a arranged closer than the heat generated by the USB-Type-C receptacle connector 320b. By arranging the first coil 121a, which generates a large heat generation amount, near the first locking member 331, the efficiency of heat dissipation of the substrate 300 is enhanced.

When the distance L5 is shorter than the distance L1, the heat generated by the first coil 121a, which is a heat source, and the USB-Type-C receptacle connector 320b will be dissipated by the first locking member 331, and thus there is a concern that the efficiency of heat dissipation of the substrate 300 deteriorates.

The distance L3 is shorter than the distance L6 from the second coil 121b to the USB-Type-C receptacle connector 320a. As a result, the second locking member 332 dissipates more heat generated by the second coil 121b arranged closer than the heat generated by the USB-Type-C receptacle connector 320a. By arranging the second coil 121b, which generates a heat generation amount, near the second locking member 332, the efficiency of heat dissipation of the substrate 300 is enhanced.

When the distance L6 is shorter than the distance L3, the heat generated by the second coil 121b, which is a heat source, and the USB-Type-C receptacle connector 320a will be dissipated by the second locking member 332, and thus there is a concern that the efficiency of heat dissipation of the substrate 300 deteriorates.

Further, the distance L6 is shorter than the distance L5. As described above, the USB-Type-C receptacle connector 320a corresponds to USB PD, and the USB-Type-C receptacle connector 320b does not correspond to USB PD. In other words, the power consumption of the second power supply circuit 12b is larger than the power consumption of the first power supply circuit 12a. Therefore, it is preferable that the distance L6 from the second coil 121b included in the second power supply circuit 12b to the USB-Type-C receptacle connector 320a be shorter than the distance L5 from the first coil 121a included in the first power supply circuit 12a to the USB-Type-C receptacle connector 320b. When electric power is supplied from the second power supply circuit 12b to the USB-Type-C receptacle connector 320a, the loss of electric power supplied from the second power supply circuit 12b is suppressed.

Further, the distance L4 is shorter than the distance L2. As mentioned above, the USB-Type-C receptacle connector 320a corresponds to USB PD, and the USB-Type-C receptacle connector 320b does not correspond to USB PD, and thus the heat generation amount of the USB-Type-C receptacle connector 320a is larger than the heat generation amount of the USB-Type-C receptacle connector 320b. Therefore, it is preferable that the distance L4 from the second locking member 332 to the USB-Type-C receptacle connector 320a be shorter than the distance L2 from the first locking member 331 to the USB-Type-C receptacle connector 320b, and the USB-Type-C receptacle connector 320a having a large heat generation amount, be arranged on the limited mounting surface 301 of the substrate 300 to more easily dissipate heat. As a result, there is an effect of heat dissipation of the entire substrate 300.

Further, the distance L1 is shorter than the distance L7. Therefore, the first locking member 331 can efficiently dissipate the heat generated by the first coil 121a while suppressing the influence of the heat generated by the second coil 121b on the USB hub 53.

Further, the distance L3 is shorter than the distance L7. Therefore, the second locking member 332 can efficiently dissipate the heat generated by the second coil 121b while suppressing the influence of the heat generated by the first coil 121a on the USB hub 53.

When the distance L7 is set to be large, that is, by separating the first coil 121a and the second coil 121b, which generate a large heat generation amount, among the components mounted on the substrate 300, the heat generation points on the substrate 300 are can be dispersed, and the efficiency of heat dissipation can be enhanced.

1-7. USB Cable

With reference to FIG. 18, how the USB-Type-C cables 400a and 400b, the USB-Type-A cables 400c and 400d, and the USB-Type-B cable 400e are being coupled to the connector section 220 will be described. FIG. 18 is a view illustrating the USB-Type-C cable 400a and 400b, the USB-Type-A cable 400c and 400d, the USB-Type-B cable 400e, and the connector section 220.

The USB-Type-C cable 400a includes the plug 401a, a covering section 402a, and a coupling cable 407a. The plug 401a is electrically coupled to the coupling cable 407a, and the coupling part thereof is covered with the covering section 402a. The plug 401a is exposed from the end portion 403a of the covering section 402a and is coupled to the USB-Type-C receptacle connector 320a. Specifically, the plug 401a of the USB-Type-C cable 400a is inserted into the USB-Type-C receptacle connector 320a via the opening 220a.

The USB-Type-C cable 400b includes the plug 401b, a covering section 402b, and a coupling cable 407b. The plug 401b is electrically coupled to the coupling cable 407b, and the coupling part thereof is covered with the covering section 402b. The plug 401b is exposed from the end portion 403b of the covering section 402b and is coupled to the USB-Type-C receptacle connector 320b. Specifically, the plug 401b of the USB-Type-C cable 400b is inserted into the USB-Type-C receptacle connector 320b via the opening 220b.

The USB-Type-A cable 400c includes the plug 401c, a covering section 402c, and a coupling cable 407c. The plug 401c is electrically coupled to the coupling cable 407c, and the coupling part thereof is covered with the covering section 402c. The plug 401c is exposed from the end portion 403c of the covering section 402c and is coupled to the USB-Type-A receptacle connector 320c. Specifically, the plug 401c of the USB-Type-A cable 400c is inserted into the USB-Type-A receptacle connector 320c via the opening 220c. The USB-Type-A cable 400d includes the plug 401d, a covering section 402d, and a coupling cable 407d. The plug 401d is electrically coupled to the coupling cable 407d, and the coupling part thereof is covered with the covering section 402d. The plug 401d is exposed from the end portion 403d of the covering section 402d and is coupled to the USB-Type-A receptacle connector 320d. Specifically, the plug 401d of the USB-Type-A cable 400d is inserted into the USB-Type-A receptacle connector 320d via the opening 220d.

The USB-Type-B cable 400e includes the plug 401e, a covering section 402e, and a coupling cable 407e. The plug 401e is electrically coupled to the coupling cable 407e, and the coupling part thereof is covered with the covering section 402e. The plug 401e is exposed from the end portion 403e of the covering section 402e and is coupled to the USB-Type-B receptacle connector 320e. Specifically, the plug 401e of the USB-Type-B cable 400e is inserted into the USB-Type-B receptacle connector 320e via the opening 220e.

A length Xc of the exposed part of the plugs 401a and 401b of the USB-Type-C cables 400a and 400b is shorter than a length Xa of the exposed part of the plugs 401c and 401d of the USB-Type-A cables 400c and 400d.

For example, when the USB-Type-A receptacle connectors 320c and 320d and the USB-Type-C receptacle connectors 320a and 320b are provided side by side along the same side, and the USB-Type-A receptacle connectors 320c and 320d are inserted into the USB-Type-A cables 400c and 400d, when the end portions 403c and 403d of the USB-Type-A cables 400c and 400d are in contact with the first connector surface 221, there is a concern that the plugs 401a and 401b of the USB-Type-C cables 400a and 400b cannot be inserted into the USB-Type-C receptacle connectors 320a and 320b.

This is because the length Xc of the exposed part of the plugs 401a and 401b of the USB-Type-C cables 400a and 400b is shorter and shorter than the length Xa of the exposed part of the plugs 401c and 401d of the USB-Type-A cables 400c and 400d, and due to this, the plugs 401a and 401b of the USB-Type-C cables 400a and 400b cannot be inserted into the USB-Type-C receptacle connectors 320a and 320b. In other words, there is a concern that the USB-Type-C cables 400a and 400b are in a so-called half-inserted state.

In order to reduce the possibility of the above-described half-inserted state, the USB-Type-C receptacle connectors 320a and 320b are arranged to be closer to the first connector surface 221 than the USB-Type-A receptacle connectors 320c and 320d. Specifically, the USB-Type-C receptacle connectors 320a and 320b are arranged along the first side 311 of the substrate 300, and the USB-Type-A receptacle connectors 320c and 320d are arranged along the second side 312 of the substrate 300.

When there is no step A between the first side 311 and the second side 312 of the substrate 300, the USB-Type-A receptacle connectors 320c and 320d are arranged at a position further from the first connector surface 221 than the USB-Type-C receptacle connectors 320a and 320b. In this case, a gap is created between the openings 220c and 220d and the USB-Type-A receptacle connectors 320c and 320d, and there is a concern that foreign matter such as dust and insects enters the connector section 220 through the gap and adheres onto the mounting surface 301 of the substrate 300.

Figure 19:
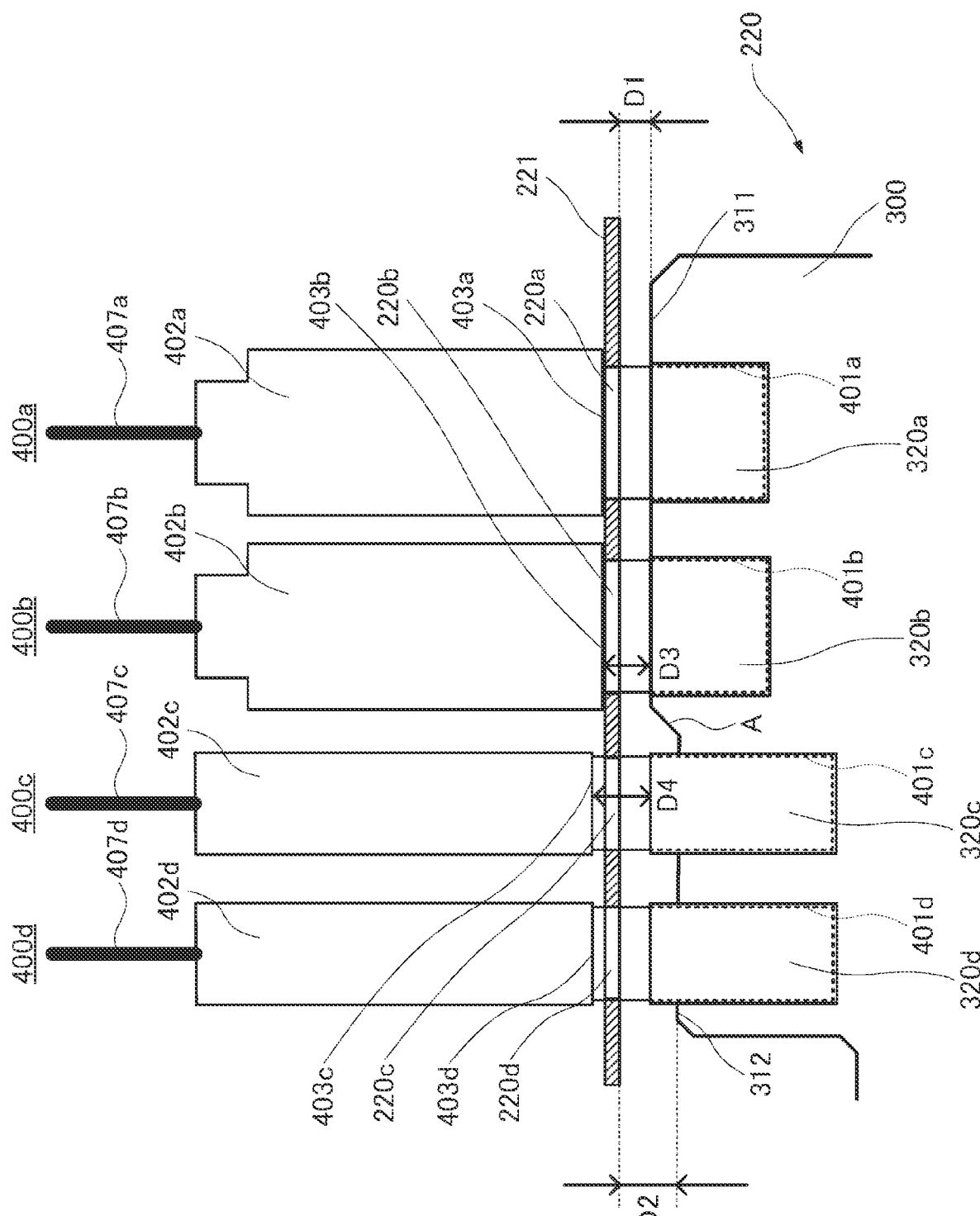
FIG. 19 is a view illustrating a state of being inserted into the USB-Type-A cable, the USB-Type-C cable, and the connector section in a first state.
Figure 20:
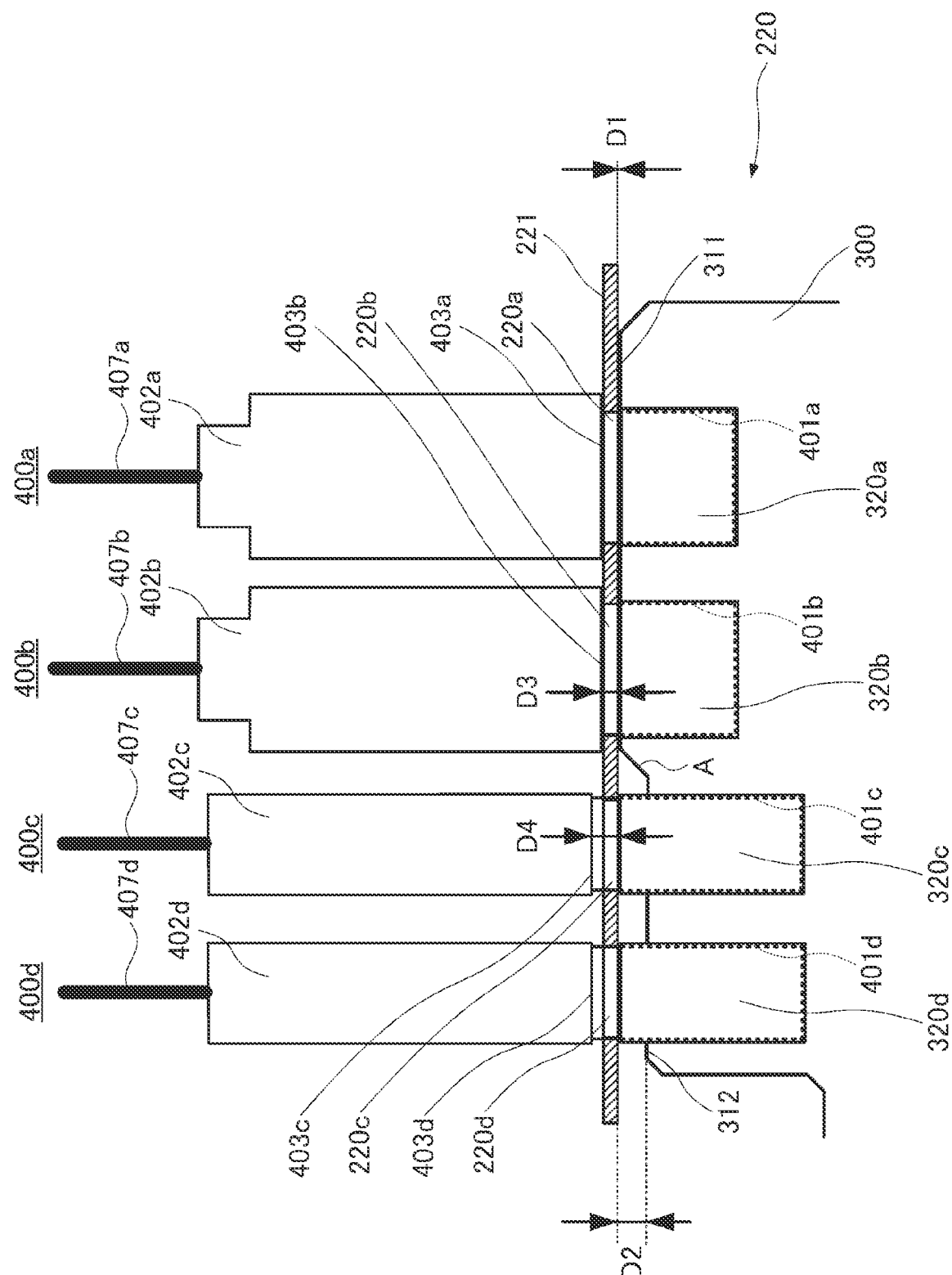
FIG. 20 is a view illustrating a state of being inserted into the USB-Type-A cable, the USB-Type-C cable, and the connector section in a second state.

By providing the step A between the first side 311 and the second side 312 of the substrate 300, the gap between the openings 220c and 220d and the USB-Type-A receptacle connectors 320c and 320d is reduced, and the insertion ports of the openings 220c and 220d and the USB-Type-A receptacle connectors 320c and 320d coincide with each other. Accordingly, the concern about adhesion on the mounting surface 301 of the substrate 300 is reduced. With reference to FIGS. 19 and 20, a case where the USB-Type-C cables 400a and 400b and the USB-Type-A cables 400c and 400d are inserted into the connector section 220 will be described. FIG. 19 illustrates a first state and FIG. 20 illustrates a second state. In addition, a direction in which the USB-Type-C cables 400a and 400b and the USB-Type-A cables 400c and 400d are inserted into the connector section 220 is set as a first direction.

In describing FIGS. 19 and 20, distances D1 to D4 are defined as follows. Unless otherwise specified, the distances D1 to D4 are the shortest distance therebetween. The distance D1 is a distance from the first side 311 of the substrate 300 to the inner surface of the first connector surface 221. The distance D2 is a distance from the second side 312 of the substrate 300 to the inner surface of the first connector surface 221. The distance D3 is a distance from the insertion port of the USB-Type-C receptacle connectors 320a and 320b to the end portions 403a and 403b of the USB-Type-C cables 400a and 400b. The distance D4 is a distance from the insertion port of the USB-Type-A receptacle connectors 320c and 320d to the end portions 403c and 403d of the USB-Type-A cables 400c and 400d.

As illustrated in FIG. 19, in the first state, the distance D1 from the inner surface of the first connector surface 221 to the first side 311 is shorter than the distance D2 from the inner surface of the first connector surface 221 to the second side 312, and the difference between the distance D2 and the distance D1 is equal to or greater than the difference between the distance D4 and the distance D3. Condition 1 is the relationship between the distances D1, D2, D3, and D4. In order to satisfy this condition 1, when the USB-Type-C receptacle connectors 320a and 320b and the USB-Type-A receptacle connectors 320c and 320d are arranged side by side, the concern about the above-described half-inserted state is reduced.

Further, as illustrated in FIG. 20, in the second state, the substrate 300 may be arranged to face the first connector surface 221 such that the first side 311 is in contact with the inner surface of the first connector surface 221. In this case, in addition to reducing the concern about the above-described half-inserted state, the alignment of the substrate 300 and the first connector surface 221 with reference to the first side 311 becomes easy.

Further, even when the end portions 403a and 403b of the USB-Type-C cables 400a and 400b and the end portions 403c and 403d of the USB-Type-A cables 400c and 400d may be in contact with the outer surface of the first connector surface 221. In this case, in addition to reducing the concern about the above-described half-inserted state, by inserting the USB-Type-C cables 400a and 400b and the USB-Type-A cables 400c and 400d into the connector section 220, the gaps between the openings 220a and 220b and the openings 220c and 220d are reduced, and thus the concern about foreign matter such as dust or insects entering the connector section 220 is reduced.

In the second state, the distance D1 from the inner surface of the first connector surface 221 to the first side 311 is zero, the difference between the distance D4 and the distance D3 is zero, and thus the difference between the distance D2 and the distance D1 is equal to or greater than the difference between the distance D4 and the distance D3.

Since the second state also satisfies the first condition, the same effect as that of the first state can be obtained. Since the USB-Type-C receptacle connectors 320a and 320b are smaller than other receptacle connectors such as the USB-Type-A receptacle connectors 320c and 320d, the ground contact area with the mounting surface 301 of the substrate 300 is also smaller than that of the USB-Type-A receptacle connectors 320c and 320d. Therefore, it is preferable that the entire USB-Type-C receptacle connectors 320a and 320b be arranged on the mounting surface 301 of the substrate 300. For example, when the USB-Type-C receptacle connectors 320a and 320b are arranged to protrude from the substrate 300, a sufficient ground contact area with the mounting surface 301 of the substrate 300 cannot be secured, and the USB-Type-C receptacle connectors 320a and 320b are vulnerable to an external force load due to prying or the like of the plugs 401a and 401b of the USB-Type-C cables 400a and 400b.

As illustrated in FIGS. 18 to 20, the insertion port of the USB-Type-C receptacle connectors 320a and 320b are arranged along the first side 311 of the substrate 300, and accordingly, the ground contact area between the USB-Type-C receptacle connectors 320a and 320b and the mounting surface 301 of the substrate 300 can be sufficiently secured. Therefore, by providing the step A between the first side 311 and the second side 312 of the substrate 300, and arranging the USB-Type-C receptacle connectors 320a and 320b along the first side 311 protruding from the second side 312, the USB-Type-C receptacle connectors 320a and 320b can shorten the distance between the insertion port and the first connector surface 221 while securing the ground contact area with the mounting surface 301 of the substrate 300, and as a result, the concern about the above-described state where the plugs 401a and 401b of the USB-Type-C cables 400a and 400b will be half-inserted into the USB-Type-C receptacle connectors 320a and 320b can be suppressed.

1-8. Fixing USB-Type-C Receptacle Connector

Figure 21:
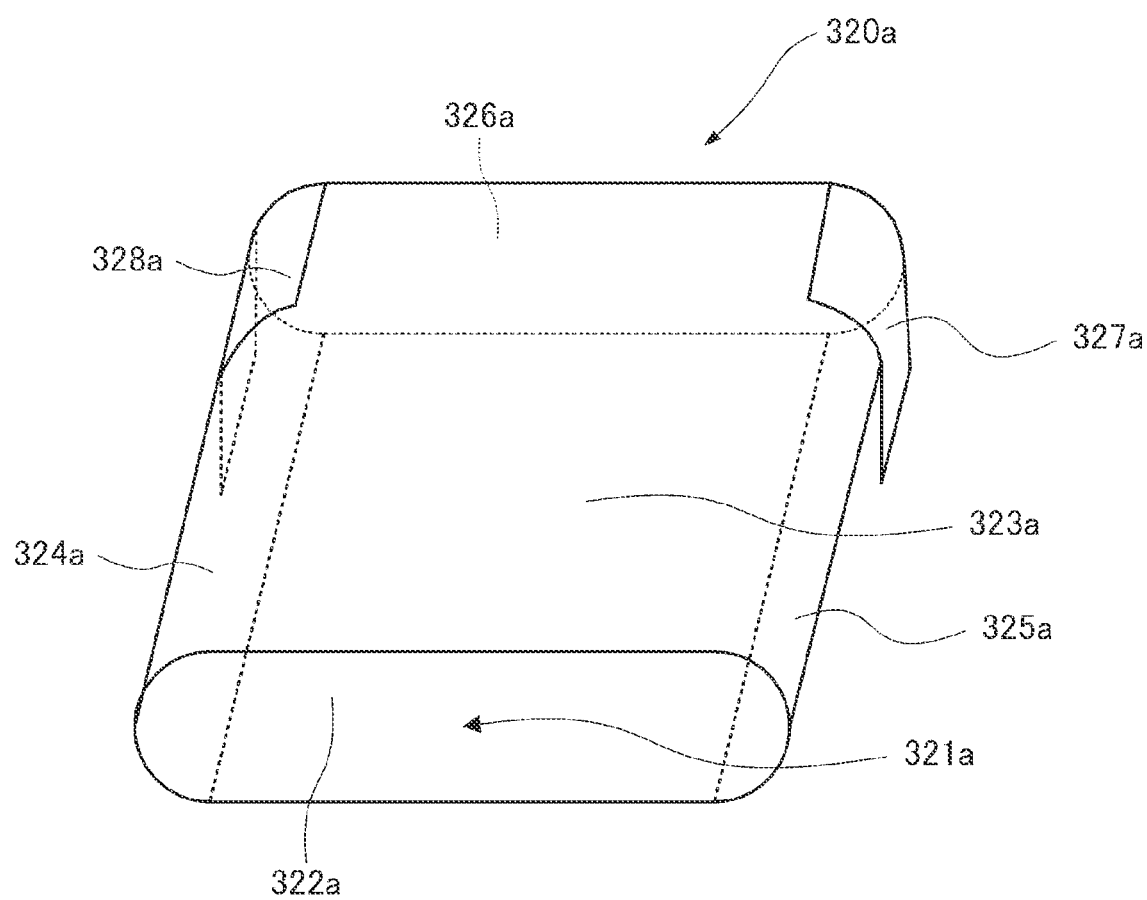
FIG. 21 is a perspective view of a USB-Type-C receptacle connector.
Figure 22:
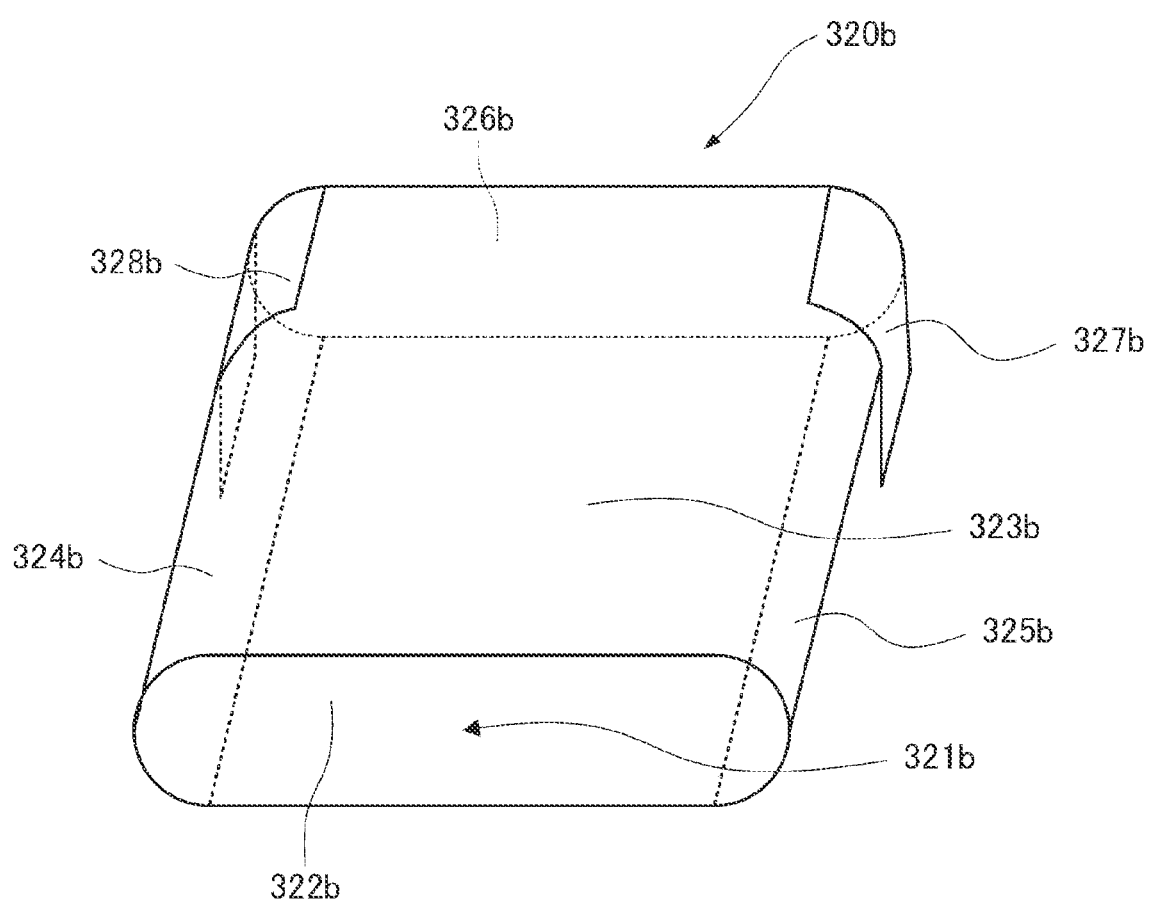
FIG. 22 is a perspective view of the USB-Type-C receptacle connector.

The USB-Type-C receptacle connector 320a will be described with reference to FIG. 21. FIG. 21 is a perspective view of the USB-Type-C receptacle connector 320a. The USB-Type-C receptacle connector 320b will be described with reference to FIG. 22. FIG. 22 is a perspective view of the USB-Type-C receptacle connector 320b. The USB-Type-C receptacle connector 320b has the same configuration as that of the USB-Type-C receptacle connector 320a.

The USB-Type-C receptacle connector 320a includes a first part 322a, a second part 323a, coupling parts 324a and 325a, and projection portions 327a and 328a.

The first part 322a is formed in a planar shape and constitutes the bottom surface of the USB-Type-C receptacle connector 320a. Further, the second part 323a is formed in a planar shape, faces the first part 322a, and constitutes the upper surface of the USB-Type-C receptacle connector 320a. The coupling parts 324a and 325a are curved and couple the first part 322a and the second part 323a, respectively. Further, the coupling parts 324a and 325a form the side surface of the USB-Type-C receptacle connector 320a.

Similar to the USB-Type-C receptacle connector 320a, the USB-Type-C receptacle connector 320b includes a third part 322b, a fourth part 323b, coupling parts 324b and 325b, and projection portions 327b and 328b.

The third part 322b is formed in a planar shape and constitutes the bottom surface of the USB-Type-C receptacle connector 320b. Further, the fourth part 323b is formed in a planar shape, faces the third part 322b, and constitutes the upper surface of the USB-Type-C receptacle connector 320b. The coupling parts 324b and 325b are curved and couple the third part 322b and the fourth part 323b, respectively. Further, the coupling parts 324b and 325b form the side surface of the USB-Type-C receptacle connector 320b.

Figure 23:
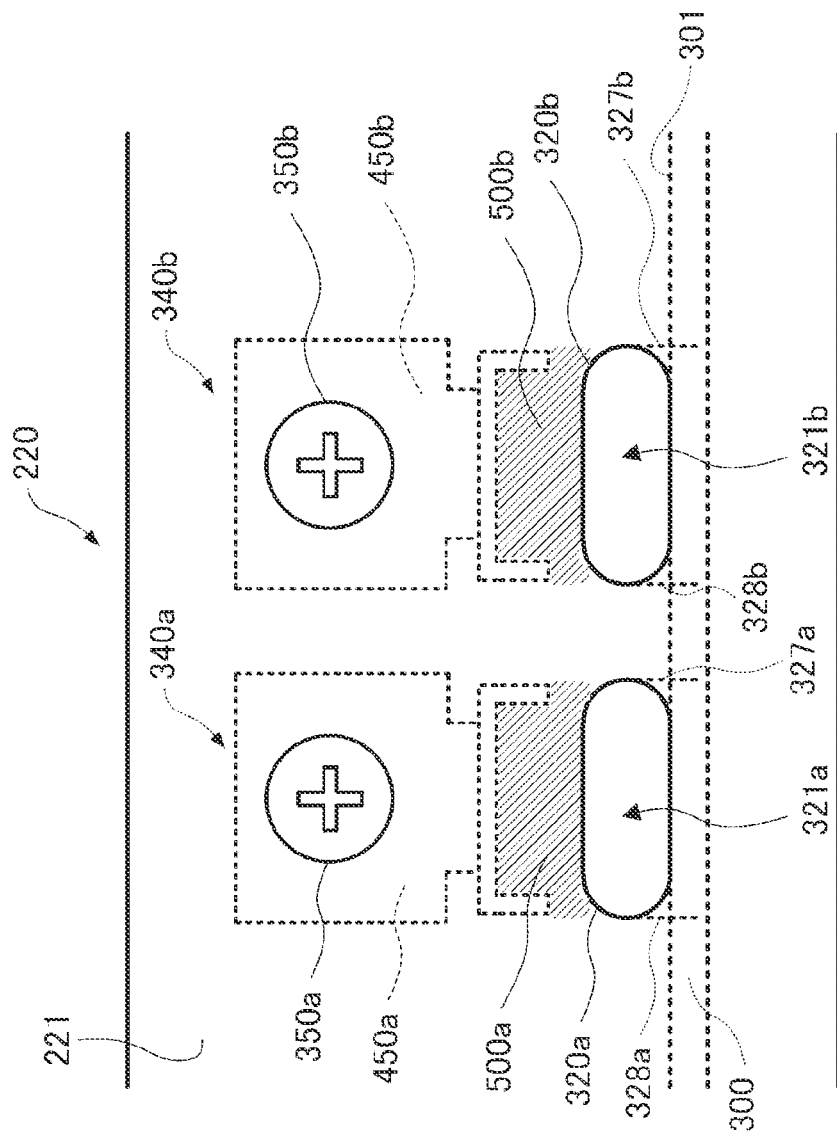
FIG. 23 is a view illustrating a fixing section when the first connector surface is viewed in a plan view.

When the USB-Type-C receptacle connector 320a is mounted on the substrate 300, the first part 322a constituting the bottom surface is in contact with the mounting surface 301 of the substrate 300, the second part 323a constituting the upper surface is pressed by a prevention section 340a illustrated in FIG. 23, and the USB-Type-C receptacle connector 320a is fixed not to be peeled off from the mounting surface 301.

When the USB-Type-C receptacle connector 320b is mounted on the substrate 300, the third part 322b constituting the bottom surface is in contact with the mounting surface 301 of the substrate 300, the fourth part 323b constituting the upper surface is pressed by a prevention section 340b illustrated in FIG. 23, and the USB-Type-C receptacle connector 320b is fixed not to be peeled off from the mounting surface 301.

Further, the USB-Type-C receptacle connector 320a has an opening 321a and a back surface 326a. The plug 401a of the USB-Type-C cable 400a is inserted through the opening 321a and is in contact with a pin (not illustrated) provided inside the USB-Type-C receptacle connector 320a. This pin is provided on the back surface 326a, for example, and is electrically coupled to and controlled by the USB controller 34. As a result, the external device 10a coupled to the printing apparatus 2 by the USB-Type-C cable 400a and the printing apparatus 2 can communicate with each other.

The projection portions 327a and 328a fix the USB-Type-C receptacle connector 320a to the mounting surface 301 of the substrate 300. For example, when the USB-Type-C receptacle connector 320a is mounted on the mounting surface 301 of the substrate 300, the first part 322a constituting the bottom surface and the mounting surface 301 may be fixed by a bonding agent such as an adhesive. However, the two projection portions 327a and 328a may be fixed by piercing the substrate 300. As a result, the USB-Type-C receptacle connector 320a is fixed to the substrate 300, and the concern about peeling from the substrate 300 is reduced.

The USB-Type-C receptacle connector 320a preferably has a plurality of projection portions. By having a plurality of projection portions included in the USB-Type-C receptacle connector 320a pierce the mounting surface 301, the concern that the USB-Type-C receptacle connector 320a will be peeled off from the substrate 300 is further reduced. The projection portions 327a and 328a are examples of the plurality of projection portions.

The prevention sections 340a and 340b will be described with reference to FIGS. 23 and 24.

FIG. 23 is a view illustrating the prevention sections 340a and 340b when the first connector surface 221 is viewed in a plan view. FIG. 24 is an exploded perspective view of the prevention section 340a and the USB-Type-C receptacle connector 320a.

As illustrated in FIG. 23, the prevention sections 340a and 340b are accommodated inside the connector section 220, and press and fix the USB-Type-C receptacle connectors 320a and 320b, respectively. Further, the projection portions 327a and 328a of the USB-Type-C receptacle connector 320a pierce into the substrate 300, and accordingly, the USB-Type-C receptacle connector 320a is fixed to the substrate 300. The prevention section 340a is an example of the first prevention section, and the prevention section 340b is an example of the second prevention section.

The prevention sections 340a and 340b include metal right angle members 450a and 450b and conductive soft gaskets 500a and 500b. The right angle members 450a and 450b are made of metal and are fixed to the first connector surface 221 by screws 350a and 350b. In other words, the right angle members 450a and 450b are screwed to the first connector surface 221. As a result, the potentials of the prevention sections 340a and 340b are fixed, and for example, there are the effect of removing static electricity charged on the USB-Type-C receptacle connectors 320a and 320b, and the effect of protecting the USB-Type-C receptacle connectors 320a and 320b from electromagnetic noise. The right angle member 450a is an example of a first right angle member, and the right angle member 450a is an example of a second right angle member.

The soft gaskets 500a and 500b are stretchable members such as sponges, and are bonded to the right angle members 450a and 450b by a bonding agent such as double-sided tape. The soft gaskets 500a and 500b illustrated in FIG. 23 block between the right angle members 450a and 450b and the USB-Type-C receptacle connectors 320a and 320b. In other words, the soft gaskets 500a and 500b are sandwiched between the right angle members 450a and 450b and the USB-Type-C receptacle connectors 320a and 320b, and are contracted more than in the normal state. The soft gasket 500a is an example of the first soft gasket, and the soft gasket 500b is an example of the second soft gasket.

Therefore, among the members included in the prevention sections 340a and 340b, the soft gaskets 500a and 500b press the USB-Type-C receptacle connectors 320a and 320b, and accordingly, the prevention sections 340a and 340b fix the USB-Type-C receptacle connectors 320a and 320b. Since the soft gasket 500a is a stretchable member, the USB-Type-C receptacle connector 320a can be installed without being damaged when the USB-Type-C receptacle connector 320a is pressed.

Figure 24:
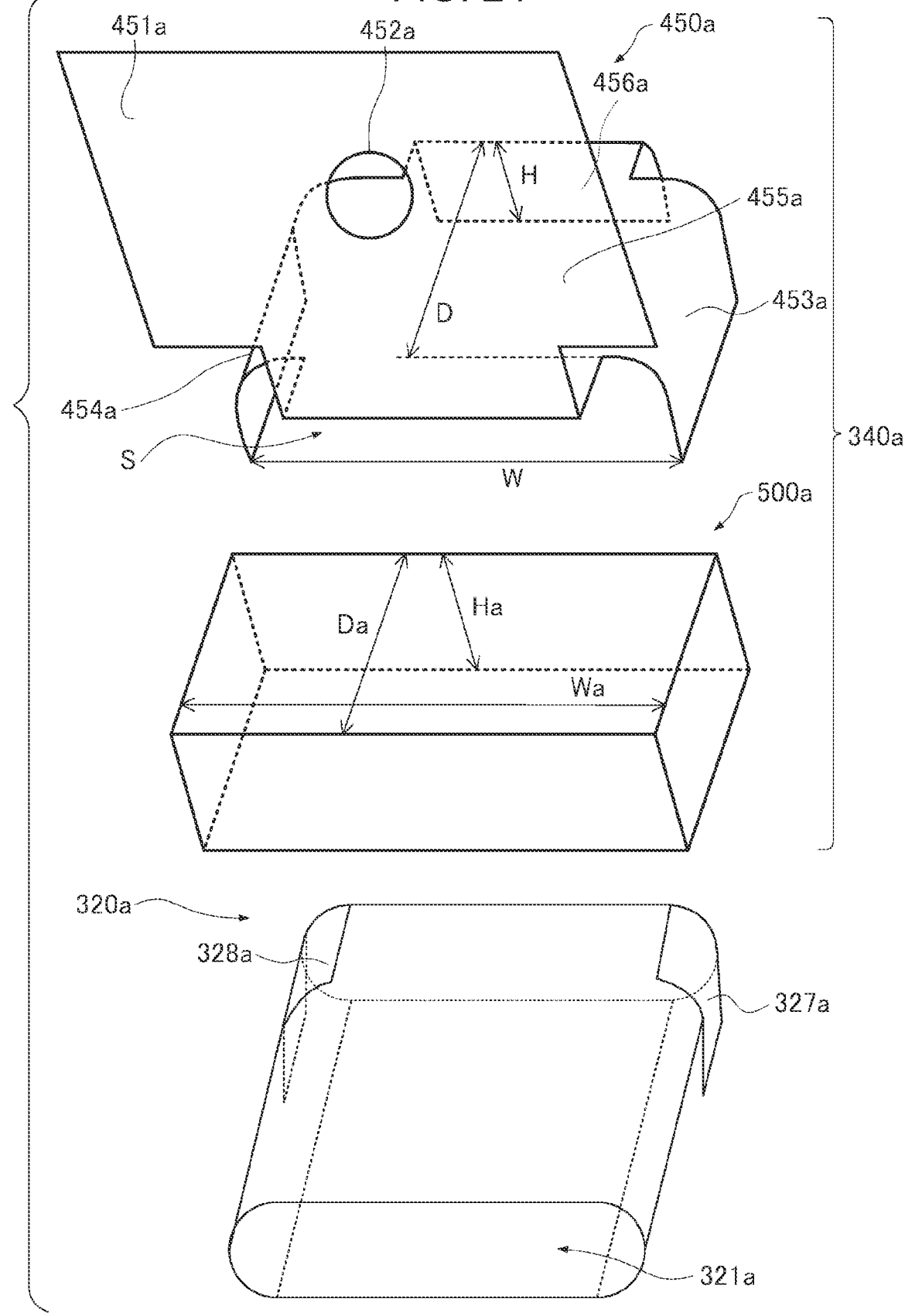
FIG. 24 is an exploded perspective view of the fixing section and the USB-Type-C receptacle connector.

FIG. 24 is an exploded perspective view of the prevention section 340a and the USB-Type-C receptacle connector 320a. Since the right angle member 450b has the same structure as that of the right angle member 450a, the description of the right angle member 450a will be used instead. The right angle member 450a has a bonding surface 451a, a screw hole 452a, side surfaces 453a and 454a, an upper surface 455a, and a back surface 456a.

The bonding surface 451a and the upper surface 455a are formed in a plate shape and form a right angle to each other. The screw hole 452a is provided on the bonding surface 451a, and the right angle member 450a is fixed to the first connector surface 221 by engaging the screw hole 452a with the screw 350a. In other words, the metal right angle member 450a is screwed to the first connector surface 221.

As described above, the soft gasket 500a has conductivity, and when the metal right angle member 450a is screwed to the first connector surface 221, the soft gasket 500a has the same potential as that of the first connector surface 221. Therefore, the potential of the USB-Type-C receptacle connector 320a pressed against the soft gasket 500a is stable and becomes strong against noise and static electricity.

In a state where the right angle member 450a is fixed to the first connector surface 221, the upper surface 455a is parallel to the mounting surface 301 of the substrate 300. In other words, the upper surface 455a is parallel to the first part 322a constituting the bottom surface and the second part 323a constituting the upper surface of the USB-Type-C receptacle connector 320a.

The soft gasket 500a is fitted into a space S defined by the side surfaces 453a and 454a, the upper surface 455a, and the back surface 456a of the right angle member 450a. As illustrated in FIG. 24, the size of the space S is approximately a width W, a depth D, and a height H.

Among the members included in the prevention section 340a, the soft gasket 500a presses the second part 323a constituting the upper surface of the USB-Type-C receptacle connector 320a, and accordingly, the prevention section 340a fixes the USB-Type-C receptacle connector 320a. Therefore, it is preferable that the soft gasket 500a be brought into contact with the second part 323a constituting the upper surface of the USB-Type-C receptacle connector 320a to increase the contact area. In other words, it is preferable that the soft gasket 500a not have a gap as much as possible between the soft gasket 500a and the second part 323a constituting the upper surface of the USB-Type-C receptacle connector 320a.

Specifically, it is preferable that the width Wa of the soft gasket 500a be larger than the width W of the space S, and the soft gasket 500a be compressed by the side surfaces 453a and 454a of the right angle member 450a. By increasing the area in which the soft gasket 500a presses the second part 323a constituting the upper surface of the USB-Type-C receptacle connector 320a in the width Wa direction, the soft gasket 500a firmly fixes the USB-Type-C receptacle connector 320a to the substrate 300.

Further, it is preferable that a height Ha of the soft gasket 500a be larger than the height H, and specifically, be in contact with at least the second part 323a constituting the upper surface of the USB-Type-C receptacle connector 320a. Since the soft gasket 500a contracts, it is preferable to increase the height Ha of the soft gasket 500a such that the soft gasket 500a can press the second part 323a constituting the upper surface of the USB-Type-C receptacle connector 320a.

It is preferable that a depth Da of the soft gasket 500a not become extremely large. When the depth Da of the soft gasket 500a is increased, the area where the soft gasket 500a presses the second part 323a constituting the upper surface of the USB-Type-C receptacle connector 320a can be increased in the depth Da direction. However, when the depth Da of the soft gasket 500a becomes extremely large, there is a concern that the compressed soft gasket 500a reaches the vicinity of the opening 321a of the USB-Type-C receptacle connector 320a, and thus it is preferable that the depth Da of the soft gasket 500a become as large as the depth D. More preferably, the soft gasket 500a has a size that fits in the space S.

In a state where the compressed soft gasket 500a reaches the vicinity of the opening 321a of the USB-Type-C receptacle connector 320a, there is a concern that the plug 401a of the USB-Type-C cable 400a comes into contact with the compressed soft gasket 500a. Since the potential of the plug 401a of the USB-Type-C cable 400a and the potential of the compressed soft gasket 500a are not always the same, for example, there is a concern about malfunction or failure of the external device 10a coupled by the USB-Type-C cable 400a.

2. MODIFICATION EXAMPLE

2-1. Modification Example 1

Figure 25:
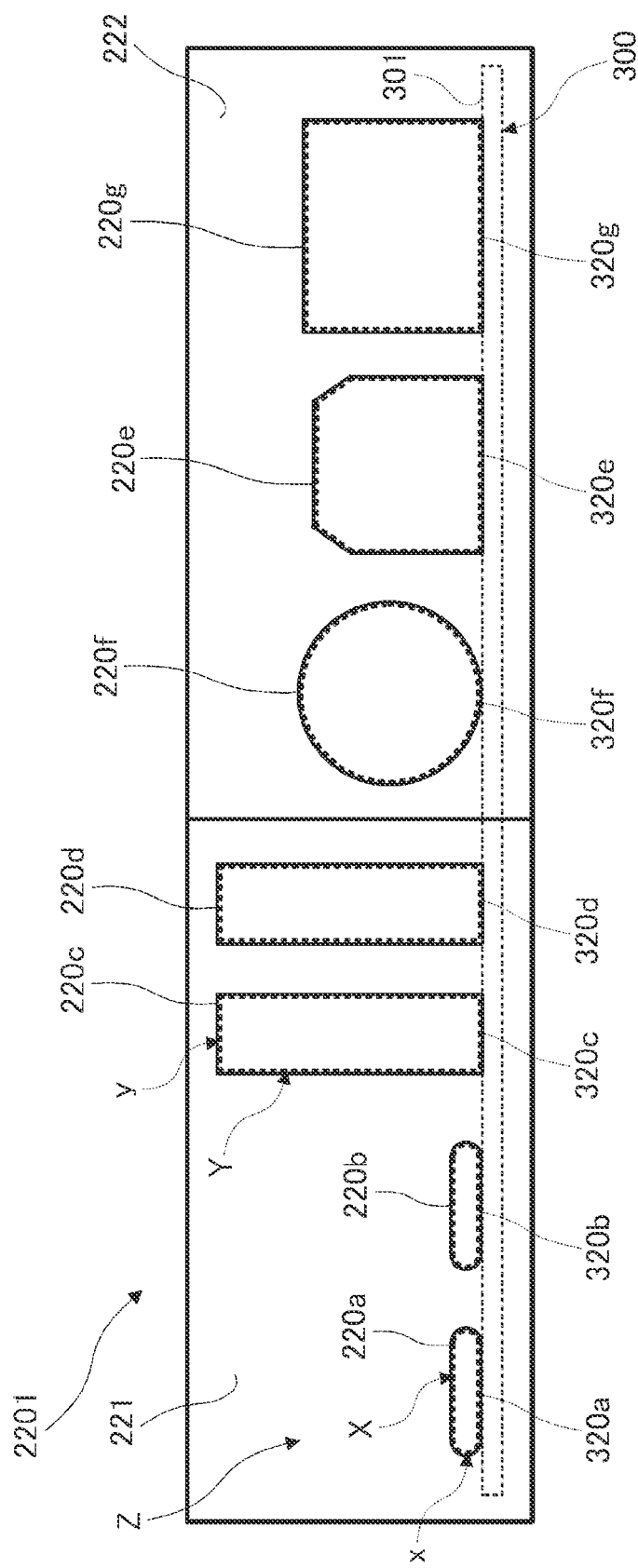
FIG. 25 is a plan view of a first connector surface and a second connector surface of Modification Example 1.

Modification Example 1 of the connector section 220 of the present embodiment will be described with reference to FIG. 25. A configuration example of a connector section 2201 in Modification Example 1 will be described. In describing Modification Example 1, the same configurations as those in the present embodiment will be given the same reference numerals, and the description thereof will be omitted or simplified. FIG. 25 is a plan view of the first connector surface 221 and the second connector surface 222 of the connector section 220 of Modification Example 2.

The arrangement of the plurality of connectors provided on the second connector surface 222 of the connector section 2201 of Modification Example 1 is different from that of the present embodiment, and the positions of the USB-Type-B receptacle connector 320e and the power supply connector 320f are different. Specifically, in the present embodiment, the power supply connector 320f is arranged between the DK receptacle connector 320g and the USB-Type-B receptacle connector 320e. In Modification Example 1, the USB-Type-B receptacle connector 320e is arranged between the DK receptacle connector 320g and the power supply connector 320f.

Since the USB-Type-B receptacle connector 320e has less concern about erroneous insertion than the DK receptacle connector 320g, and thus such an arrangement may be used. In other words, even in a state where it is difficult to visually recognize or in a fumbling state, the user can correctly recognize the position of the USB-Type-B receptacle connector 320e, and thus there is less concern about erroneous insertion into the DK receptacle connector 320g.

2-2. Modification Example 2

Figure 26:
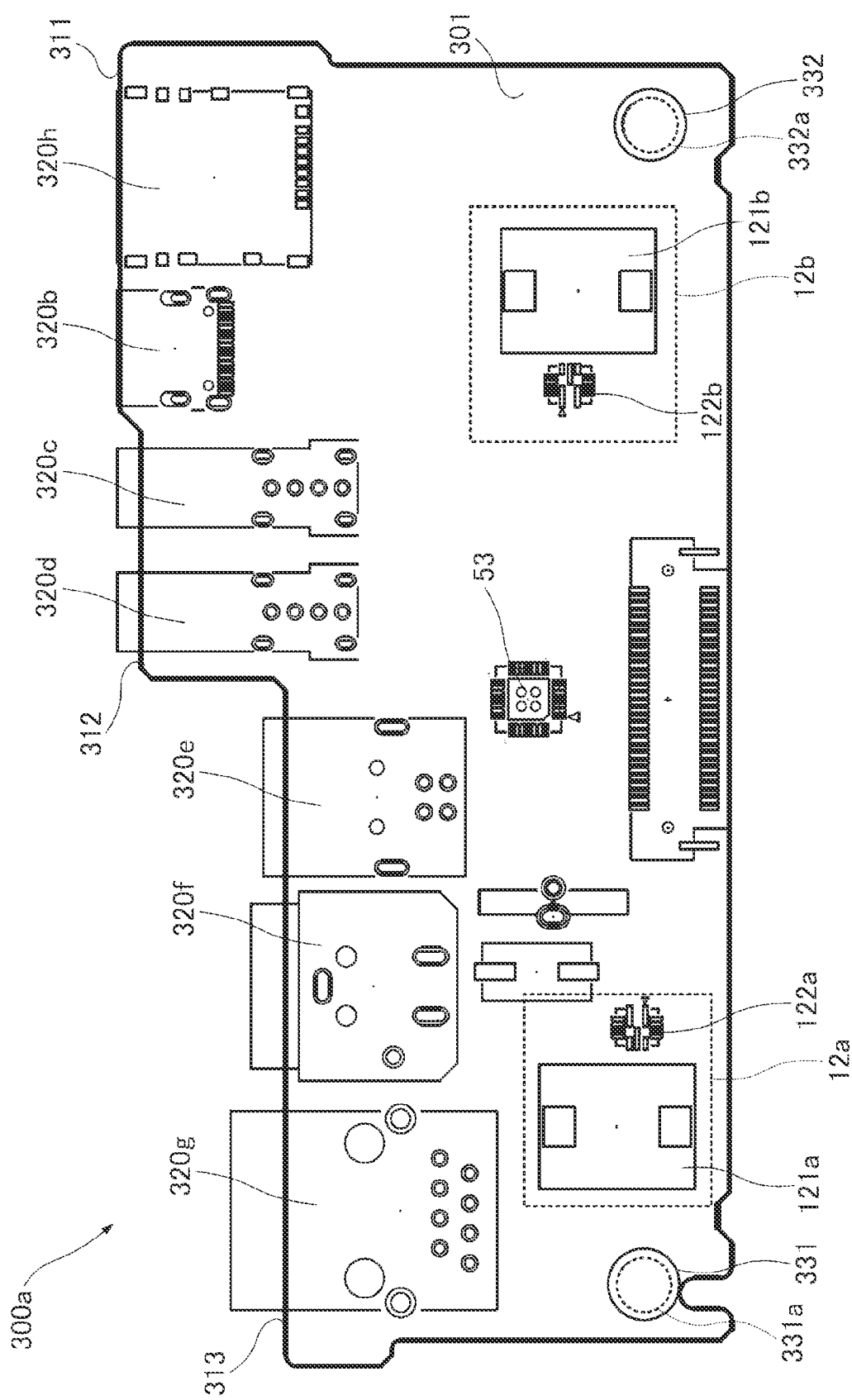
FIG. 26 is a schematic view of a substrate of Modification Example 2.

Modification Example 2 of the substrate 300 of the present embodiment will be described with reference to FIG. 26. A configuration example of a substrate 300a in Modification Example 2 will be described. In describing Modification Example 2, the same configurations as those in the present embodiment will be given the same reference numerals, and the description thereof will be omitted or simplified. FIG. 26 is a schematic view of the substrate 300a of Modification Example 2.

Unlike the present embodiment, the substrate 300a of Modification Example 2 is provided with a slot 320h. Specifically, on the substrate 300 of the present embodiment, the USB-Type-C receptacle connector 320a is arranged, but the substrate 300a of Modification Example 2 has the slot 320h into which a memory card can be inserted instead of the USB-Type-C receptacle connector 320a. The slot 320h is controlled by the CPU 31 via the system bus 41, and the data on the memory card is rewritten. For example, the slot 320h corresponds to an SD card, a micro SD card, or the like.

By operating the smart device 3a coupled to the USB-Type-C interface 60a, the user can store the accounting information in the memory card. Further, the smart device 3a can cause the printing apparatus 2 to execute printing based on the data stored in the memory card. For example, the printing apparatus 2 can print accounting information and the like stored in a memory card.

Further, unlike the present embodiment, the second power supply circuit 12b may supply electric power to the USB-Type-C receptacle connector 320b. In this case, the USB-Type-C receptacle connector 320b can also be used as a connector that correspond to USB PD.

3. ELECTRONIC DEVICE

An electronic device 500 according to the present embodiment will be described with reference to FIG. 27.

Figure 27:
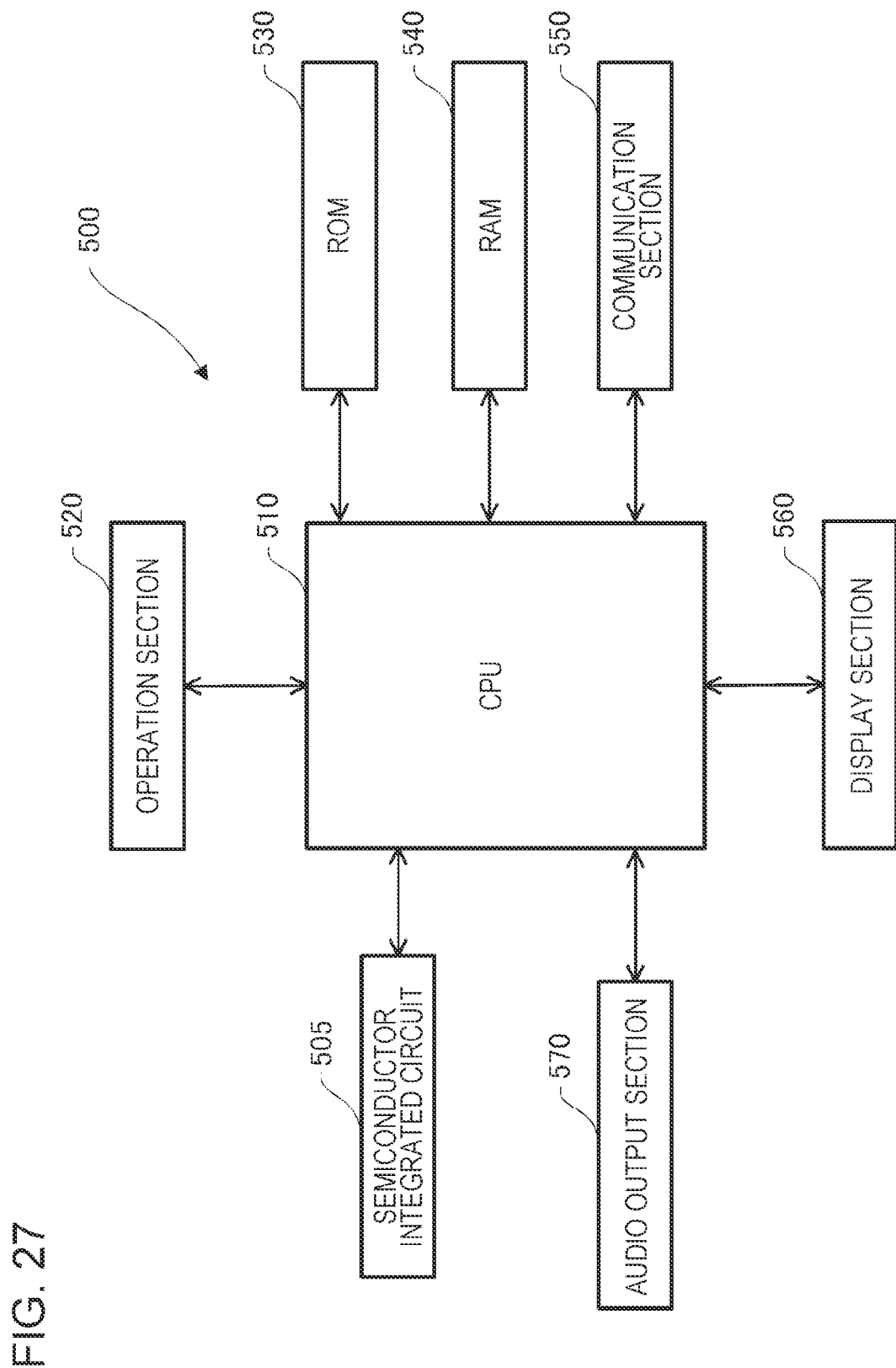
FIG. 27 is a view illustrating a schematic configuration of an electronic device.

FIG. 27 is a functional block diagram illustrating a schematic configuration of the electronic device 500 of the present embodiment.

The electronic device 500 may include a semiconductor integrated circuit 505, a CPU 510, an operation section 520, a ROM 530, a RAM 540, a communication section 550, a display section 560, and an audio output section 570. The electronic device 500 may have a configuration in which some of these elements are omitted or changed, or other elements are added.

The semiconductor integrated circuit 505 performs various processing in response to a command from the CPU 510. For example, the semiconductor integrated circuit 505 corrects the input data or converts the data format in response to a command from the CPU 510.

The CPU 510 performs various arithmetic processing and control processing using data and the like supplied from the semiconductor integrated circuit 505 according to a program stored in the ROM 530 and the like. For example, the CPU 510 performs various data processing according to the operation signal supplied from the operation section 520, controls the communication section 550 for data communication with the outside, generates an image signal for displaying various images on the display section 560, and generates an audio signal for outputting various audio to the audio output section 570.

The operation section 520 is, for example, an input device including an operation key, a button switch, and the like, and outputs an operation signal corresponding to the operation by the user to the CPU 510. The ROM 530 stores programs, data, and the like for the CPU 510 to perform various arithmetic processing and control processing. Further, the RAM 540 is used as a work area of the CPU 510, and temporarily stores programs and data read from the ROM 530, data input using the operation section 520, calculation results obtained by the CPU 510 executing the program, and the like.

The communication section 550 is composed of, for example, an analog circuit and a digital circuit, and performs data communication between the CPU 510 and the external device. The display section 560 includes, for example, a liquid crystal display (LCD) and displays various types of information based on a display signal supplied from the CPU 510. Further, the audio output section 570 includes, for example, a speaker and the like, and outputs audio based on an audio signal supplied from the CPU 510.

As described above, the electronic device 500 may be, for example, a printing apparatus provided with the printing section 20 that performs printing on the medium P. Further, for example, the electronic device 500 includes a projector, an electronic dictionary, an electronic game device, a mobile terminal such as a mobile phone, a digital still camera, a digital video camera, a television, a recorder, a security monitor, a head mount display, a personal computer, a network device, a car navigation device, a measuring device, a medical device (for example, an electronic thermometer, a blood pressure manometer, a blood glucose monitoring system, an electrocardiogram measuring device, an ultrasonic diagnostic device, and an electronic endoscope), and the like.

The USB-Type-C receptacle connector 320a is an example of the first receptacle connector. The external device 10a is an example of the first external device. The DK receptacle connector 320g is an example of the second receptacle connector. The cash drawer 270 is an example of the second external device. The USB-Type-B receptacle connector 320e is an example of the third receptacle connector. The external device 10e is an example of the third external device. The USB-Type-A receptacle connector 320c is an example of the fourth receptacle connector. The external device 10c is an example of the fourth external device. The plug 401a of the USB-Type-C cable 400a is an example of the plug of the USB-Type-C cable.

The embodiments and the modification examples have been described above, but the present disclosure is not limited to the embodiments, and can be implemented in various aspects without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments and modification examples.

According to an aspect, there is provided a printing apparatus including: a printing section that performs printing on a medium; a control section that controls drive of the printing section; a power supply connector that supplies electric power to the control section; a first receptacle connector that is electrically coupled to a first external device and configured to cause the first external device to communicate with the control section; and a second receptacle connector that is electrically coupled to a second external device and configured to cause the second external device to communicate with the control section, in which the first receptacle connector is a USB-Type-C receptacle connector, the second receptacle connector is a LAN or DK receptacle connector, a plug of a USB-Type-C cable is configured to be physically inserted into the second receptacle connector, the plug is configured not to be physically inserted into the power supply connector, an insertion port of the first receptacle connector is arranged along a first connector surface, and an insertion port of the second receptacle connector is arranged along a second connector surface different from the first connector surface.

According to this printing apparatus, when the user couples the first external device and the second external device, the user can recognize the first connector surface and the second connector surface different from the first connector surface by touching with hands without visual observation. There is a concern that the plug of the USB-Type-C cable is erroneously inserted into the second receptacle connector, but the user can recognize the first connector surface on which the insertion port of the first receptacle connector is arranged and the second connector surface on which the insertion port of the second receptacle connector is arranged, and thus the concern that the plug of the USB-Type-C cable is erroneously inserted into the second receptacle connector is reduced. As a result, it is possible to reduce the concern about malfunction of the second external device, the concern about damage to the second external device and the second receptacle connector, and the like.

In the printing apparatus according to the aspect, a medium discharge port for discharging the medium may further be provided, and a user may not visually recognize the power supply connector, the first receptacle connector, and the second receptacle connector in a state where the medium discharge port is visually recognizable.

According to this printing apparatus, the user can confirm the contents printed on the medium while visually recognizing the medium discharged from the medium discharge port. Further, when the user can visually recognize the medium discharge port, the power supply connector, the first receptacle connector, and the second receptacle connector cannot be visually recognized, and thus the user can perform printing without caring about the wiring coupled to each connector.

In the printing apparatus according to the aspect, a main body case for accommodating the printing section, and a medium discharge port for discharging the medium may further be provided, the medium discharge port may be arranged on a first case surface of the main body case, and the power supply connector, the first receptacle connector, and the second receptacle connector may be arranged on a first main body frame surface inside the main body case, which is different from the first case surface.

According to this printing apparatus, the medium discharge port, the power supply connector, the first receptacle connector, and the second receptacle connector are arranged on different surfaces, and thus the medium to be printed and discharged from the medium discharge port is smoothly discharged from the medium discharge port without coming into contact with the cable coupled to each connector.

In the printing apparatus according to the aspect, the second connector surface and the first connector surface may be parallel to each other.

According to this printing apparatus, the first connector surface and the second connector surface different from the first connector surface are formed to be parallel to each other, and accordingly, when the user touches the first connector surface and the second connector surface with hands, the user can easily recognize the first connector surface and the second connector surface. Accordingly, the concern about erroneous insertion of the plug of the USB-Type-C cable is reduced.

In the printing apparatus according to the aspect, an insertion port of the power supply connector may be circular, the first receptacle connector and the second receptacle connector may be rectangular, a circular connector may not be arranged on the first connector surface, and a rectangular connector may be arranged on the second connector surface.

According to this printing apparatus, when the user touches with hands, the shape of the power supply connector is different from that of the first receptacle connector and the second receptacle connector, and thus the user can correctly recognize the power supply connector with extremely low concern about erroneous insertion. As a result, the user can correctly recognize the first connector surface and the second connector surface, and thus the concern about erroneous insertion of the plug of the USB-Type-C cable is reduced.

In the printing apparatus according to the aspect, a third receptacle connector that is electrically coupled to a third external device and configured to cause the third external device to communicate with the control section may further be provided, the third receptacle connector may be a USB-Type-B receptacle connector, the plug may be configured to be physically inserted into the third receptacle connector, and an insertion port of the third receptacle connector may be arranged along the second connector surface.

According to this printing apparatus, the third receptacle connector with a concern about erroneous insertion of the plug of the USB-Type-C cable is arranged along the second connector surface which is different from the first connector surface on which the first receptacle connector is arranged. Therefore, the concern about erroneous insertion of the plug of the USB-Type-C cable is reduced. As a result, it is possible to reduce the concern about malfunction of the third external device, the concern about damage to the third external device and the third receptacle connector, and the like.

In the printing apparatus according to the aspect, the insertion port of the third receptacle connector may be smaller than the insertion port of the second receptacle connector, and the third receptacle connector may be arranged between the first receptacle connector and the second receptacle connector.

According to this printing apparatus, the third receptacle connector with less concern about the erroneous insertion of the plug of the USB-Type-C cable than the second receptacle connector is arranged between the first receptacle connector and the second receptacle connector, and thus the concern about erroneous insertion into the second receptacle connector can be reduced.

In the printing apparatus according to the aspect, the third receptacle connector may be arranged between the second receptacle connector and the power supply connector.

According to this printing apparatus, the third receptacle connector with less concern about the erroneous insertion of the plug of the USB-Type-C cable than the second receptacle connector is arranged between the second receptacle connector and the power supply connector, and thus the concern about erroneous insertion of the plug of the USB-Type-C cable into the second receptacle connector can be reduced. As a result, it is possible to reduce the concern about malfunction of the second external device, the concern about damage to the second external device and the second receptacle connector, and the like.

In the printing apparatus according to the aspect, a fourth receptacle connector that is electrically coupled to a fourth external device and configured to cause the fourth external device to communicate with the control section may further be provided, the fourth receptacle connector may be a USB-Type-A receptacle connector, and a long side of the insertion port of the first receptacle connector and a long side of an insertion port of the fourth receptacle connector may be in different directions from each other.

According to this printing apparatus, the first receptacle connector and the fourth receptacle connector are arranged such that the long side direction of the first receptacle connector and the long side direction of the fourth receptacle connector are different from each other, and thus it is possible to reduce the concern about erroneous insertion of the plug of the USB-Type-C cable. As a result, it is possible to reduce the concern about malfunction of the fourth external device, the concern about damage to the fourth external device and the fourth receptacle connector, and the like.

In the printing apparatus according to the aspect, the plug is configured to be physically inserted into the fourth receptacle connector, the insertion port of the fourth receptacle connector may be smaller than the insertion port of the second receptacle connector, and the fourth receptacle connector may be arranged between the first receptacle connector and the second receptacle connector.

According to this printing apparatus, the fourth receptacle connector with less concern about the erroneous insertion of the plug of the USB-Type-C cable than the second receptacle connector is arranged between the first receptacle connector and the second receptacle connector, and thus the concern about erroneous insertion of the plug of the USB-Type-C cable into the second receptacle connector can be reduced. As a result, it is possible to reduce the concern about malfunction of the second external device, the concern about damage to the second external device and the second receptacle connector, and the like.

In the printing apparatus according to the aspect, the insertion port of the first receptacle connector and the insertion port of the fourth receptacle connector may be arranged along the first connector surface.

According to this printing apparatus, the fourth receptacle connector with a concern about erroneous insertion of the plug of the USB-Type-C cable is arranged along the first connector surface on which the first receptacle connector is arranged. Therefore, the concern about erroneous insertion of the plug of the USB-Type-C cable is reduced while suppressing increase in size of the apparatus.

In the printing apparatus according to the aspect, the fourth receptacle connector may be arranged between the first receptacle connector and the third receptacle connector.

According to this printing apparatus, the fourth receptacle connector with less concern about the erroneous insertion of the plug of the USB-Type-C cable than the third receptacle connector is arranged between the first receptacle connector and the third receptacle connector, and thus the concern about erroneous insertion of the plug of the USB-Type-C cable into the second receptacle connector can be reduced. As a result, it is possible to reduce the concern about malfunction of the third external device, the concern about damage to the third external device and the third receptacle connector, and the like.

In the printing apparatus according to the aspect, the power supply connector may be arranged between the first receptacle connector and the second receptacle connector.

According to this printing apparatus, since the power supply connector into which the plug of the USB-Type-C cable is not erroneously inserted is arranged between the first receptacle connector and the second receptacle connector, and thus the user can correctly recognize the positions of the first receptacle connector and the second receptacle connector. Therefore, the plug of the USB-Type-C cable can be correctly inserted into the first receptacle connector without being erroneously inserted into the second receptacle connector. As a result, it is possible to reduce the concern about malfunction of the second external device, the concern about damage to the second external device and the second receptacle connector, and the like.

What is claimed is:

1. A printing apparatus comprising:
a printing head that performs printing on a medium;
a controller that controls drive of the printing head;
a power supply connector that supplies electric power to the controller;
a first receptacle connector that is electrically coupled to a first external device and configured to cause the first external device to communicate with the controller; and
a second receptacle connector that is electrically coupled to a second external device and configured to cause the second external device to communicate with the controller, wherein
the first receptacle connector is a USB-Type-C receptacle connector,
the second receptacle connector is a LAN or DK receptacle connector,
a plug of a USB-Type-C cable has a size and/or shape that allows physical insertion of the plug of the USB-Type-C cable into the second receptacle connector and prohibits the physical insertion of the plug of the USB-Type-C cable into the power supply connector,
an insertion port of the first receptacle connector is arranged along a first connector surface, and
an insertion port of the second receptacle connector is arranged along a second connector surface, the first connector surface and the second connector surface being offset relative to each other to form a step therebetween.

2. The printing apparatus according to claim 1, further comprising:
a medium discharge port for discharging the medium, wherein
a user does not visually recognize the power supply connector, the first receptacle connector, and the second receptacle connector in a state where the medium discharge port is visually recognizable.

3. The printing apparatus according to claim 1, further comprising:
a main body case for accommodating the printing head; and
a medium discharge port for discharging the medium, wherein
the medium discharge port is arranged on a first case surface of the main body case, and
the power supply connector, the first receptacle connector, and the second receptacle connector are arranged on a first main body frame surface inside the main body case, which is different from the first case surface.

4. The printing apparatus according to claim 1, wherein the second connector surface is parallel to the first connector surface.

5. A printing apparatus comprising:
a printing head that performs printing on a medium;
a controller that controls drive of the printing head;
a power supply connector that supplies electric power to the controller;
a first receptacle connector that is electrically coupled to a first external device and configured to cause the first external device to communicate with the controller; and
a second receptacle connector that is electrically coupled to a second external device and configured to cause the second external device to communicate with the controller, wherein
the first receptacle connector is a USB-Type-C receptacle connector,
the second receptacle connector is a LAN or DK receptacle connector,
a plug of a USB-Type-C cable has a size and/or shape that allows physical insertion of the plug of the USB-Type-C cable into the second receptacle connector and prohibits the physical insertion of the plug of the USB-Type-C cable into the power supply connector,
an insertion port of the first receptacle connector is arranged along a first connector surface,
an insertion port of the second receptacle connector is arranged along a second connector surface different from the first connector surface,
an insertion port of the power supply connector is circular,
the first receptacle connector and the second receptacle connector are rectangular,
a circular connector is not arranged on the first connector surface, and
a rectangular connector is arranged on the second connector surface.

6. The printing apparatus according to claim 1, further comprising:
a third receptacle connector that is electrically coupled to a third external device and configured to cause the third external device to communicate with the controller, wherein
the third receptacle connector is a USB-Type-B receptacle connector,
the plug of the USB-Type-C cable has the size and/or shape that allows the physical insertion of the plug of the USB-Type-C cable into the third receptacle connector, and
an insertion port of the third receptacle connector is arranged along the second connector surface.

7. The printing apparatus according to claim 6, wherein
the insertion port of the third receptacle connector is smaller than the insertion port of the second receptacle connector, and
the third receptacle connector is arranged between the first receptacle connector and the second receptacle connector.

8. The printing apparatus according to claim 6, wherein
the third receptacle connector is arranged between the second receptacle connector and the power supply connector.

9. The printing apparatus according to claim 6, further comprising:
a fourth receptacle connector that is electrically coupled to a fourth external device and configured to cause the fourth external device to communicate with the controller, wherein
the fourth receptacle connector is a USB-Type-A receptacle connector, and
a long side of the insertion port of the first receptacle connector and a long side of an insertion port of the fourth receptacle connector are in different directions from each other.

10. The printing apparatus according to claim 9, wherein
the plug of the USB-Type-C cable has the size and/or shape that allows the physical insertion of the plug of the USB-Type-C cable into the fourth receptacle connector,
the insertion port of the fourth receptacle connector is smaller than the insertion port of the second receptacle connector, and
the fourth receptacle connector is arranged between the first receptacle connector and the second receptacle connector.

11. The printing apparatus according to claim 9, wherein
the insertion port of the first receptacle connector and the insertion port of the fourth receptacle connector are arranged along the first connector surface.

12. The printing apparatus according to claim 9, wherein
the fourth receptacle connector is arranged between the first receptacle connector and the third receptacle connector.

13. The printing apparatus according to claim 1, wherein
the power supply connector is arranged between the first receptacle connector and the second receptacle connector.

* * * * *